United States Patent
Wang

(10) Patent No.: US 8,038,456 B1
(45) Date of Patent: *Oct. 18, 2011

(54) TAMPER PREVENTION SYSTEM HAVING A SHROUD TO PARTIALLY COVER A RELEASE MECHANISM

(75) Inventor: Hua Wang, Mill Creek, WA (US)

(73) Assignee: Leviton Manufacturing Co., Inc, Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/886,740

(22) Filed: Sep. 21, 2010

Related U.S. Application Data

(63) Continuation-in-part of application No. 12/851,865, filed on Aug. 6, 2010.

(60) Provisional application No. 61/327,493, filed on Apr. 23, 2010.

(51) Int. Cl.
  *H01R 13/627* (2006.01)
  *G02B 6/38* (2006.01)

(52) U.S. Cl. .......... 439/172; 385/56

(58) Field of Classification Search .......... 439/172, 439/352, 353, 350, 367; 385/53, 58, 135
  See application file for complete search history.

(56) References Cited

U.S. PATENT DOCUMENTS

| | | | |
|---|---|---|---|
| 3,860,316 A | 1/1975 | Hardesty | |
| 5,420,951 A | 5/1995 | Marazzi et al. | |
| 5,481,634 A | 1/1996 | Anderson et al. | |
| 5,538,438 A | 7/1996 | Orlando | |
| 5,638,474 A | 6/1997 | Lampert et al. | |
| 5,647,043 A | 7/1997 | Anderson et al. | |
| 5,719,977 A | 2/1998 | Lampert et al. | |
| 5,923,805 A | 7/1999 | Anderson et al. | |
| 6,019,521 A | 2/2000 | Manning et al. | |
| 6,179,477 B1 | 1/2001 | De Marchi | |
| 6,398,576 B1 | 6/2002 | Hwang et al. | |
| 6,443,627 B1 | 9/2002 | Anderson et al. | |
| 6,565,262 B2 | 5/2003 | Childers et al. | |
| 6,752,538 B1 | 6/2004 | Bates, III | |
| 6,761,488 B2 | 7/2004 | Weigel | |
| 7,037,129 B2 | 5/2006 | Lo et al. | |
| 7,311,544 B1 | 12/2007 | Berta | |
| 7,354,291 B2 | 4/2008 | Caveney et al. | |
| 7,390,203 B2 | 6/2008 | Murano et al. | |
| 7,410,377 B2 | 8/2008 | Wharton | |
| 7,438,584 B2 | 10/2008 | Caveney et al. | |

(Continued)

FOREIGN PATENT DOCUMENTS

DE 102007036620 A1 2/2009

(Continued)

OTHER PUBLICATIONS

Advanced Fiber Products Ltd.—"Locking Keyed Uni-Body LC Connectors" V 6 4-10-1, www.afpgco.com.

*Primary Examiner* — Chandrika Prasad
(74) *Attorney, Agent, or Firm* — Turocy & Watson, LLP

(57) ABSTRACT

Apparatuses, devices, systems, and methods are provided for prevention of tampering with cables and associated systems. In one aspect, an anti-tamper adapter is provided that can inhibit or prohibit cable tampering for existing cables. In a further aspect, dummy plugs or blocking plugs can employ disclosed anti-tamper adapters to facilitate blocking ports or outlets that are intended to remain undisturbed for a period of time. The provided embodiments can economically and flexibly facilitate cable tamper prevention in a wide array of cable technologies.

30 Claims, 40 Drawing Sheets

U.S. PATENT DOCUMENTS

| | | |
|---|---|---|
| 7,465,180 B2 | 12/2008 | Kusuda et al. |
| 7,510,335 B1 | 3/2009 | Su et al. |
| 7,530,824 B2 | 5/2009 | Bolain |
| 7,578,690 B2 | 8/2009 | Caveney et al. |
| 7,632,125 B2 | 12/2009 | Irwin et al. |
| 7,651,361 B2 | 1/2010 | Henry et al. |
| 2006/0040564 A1 | 2/2006 | Morrison et al. |
| 2009/0007609 A1 | 1/2009 | Obenshain |
| 2009/0263993 A1 | 10/2009 | Bolain |

FOREIGN PATENT DOCUMENTS

| | | |
|---|---|---|
| EP | 1 450 189 | 8/2004 |
| EP | 1 913 660 | 10/2008 |
| GB | 200903326 | 4/2009 |
| GB | 200915728 | 10/2009 |
| GB | 200917235 | 11/2009 |
| GB | 2463332 A | 3/2010 |
| GB | 09033263.7 | 3/2010 |
| GB | 201001423 | 3/2010 |
| GB | 2468188 A | 9/2010 |
| GB | 201016420 | 11/2010 |
| GB | 2472159 A | 1/2011 |
| WO | WO 2007/016794 | 2/2007 |
| WO | W02007/001679 | 4/2007 |
| WO | 2010097602 A1 | 9/2010 |
| WO | 2010097603 A1 | 9/2010 |

TAMPER PREVENTION SYSTEM HAVING A SHROUD TO PARTIALLY COVER A RELEASE MECHANISM

CROSS-REFERENCE TO RELATED APPLICATIONS

This application is a continuation-in-part of U.S. patent application Ser. No. 12/851,865, filed on Aug. 6, 2010, and entitled CABLE TAMPER PREVENTION, which application in turn claims priority to U.S. Provisional Patent Application Ser. No. 61/327,493, filed on Apr. 23, 2010, and entitled CABLE TAMPER PREVENTION, the entireties of which applications are hereby incorporated by reference.

FIELD OF THE INVENTION

The subject disclosure is directed to cable tamper prevention and, more specifically, to apparatuses, systems, and methods pertaining to preventing tampering with communications cables and associated systems.

BACKGROUND OF THE INVENTION

Racks, frames, cabinets and the like (referred to herein as "racks" or "equipment racks") support equipment components such as computer and other electronic equipment units, e.g., servers, communications switches, patch panels, enclosures and the like. The equipment components can include patch panels, equipment units, equipment face panels, and the like extending between the vertical members along the front side of the rack. These panels can have slots and other openings for mounting of patch blocks of outlets, adapters, or other devices or to allow access to control portions of the equipment components. For example, a patch panel typically comprises a connecting hardware system (e.g., arrays of outlets, ports, or adapters, etc.) that facilitates cable termination, connection, and cabling administration via the use and administration of standard-conforming adapters or plugs.

These connections are made by cables, cords, or other categories of wires (referred to hereinafter as "cables"). Interconnect cables are primarily used as intra-equipment jumpers or patch cords and are generally available in standard lengths and colors. For example, some typical applications include patching active electronics to nearby patch panels, cable cross-connection on distribution frames, and connecting work area outlets to terminal equipment. Patch cords typically comprise a length of cable with a plug or outlet on one, or both ends.

In addition, these racks can support a vast array of equipment components including patch panels and other equipment having many ports connected to various types of cables. For instance, the equipment components can be used for telephony, networking, and other communication related applications using, for example, fiber and copper cables. As a result, the associated computer networks and services can provide a wide array of efficient computing capabilities throughout a large work area, while providing mission critical services essential to the function of an organization alongside less essential services.

Due to the sensitive nature of the equipment components housed in these racks, ideally, the racks can be located in access-restricted areas to prevent undesired access by unauthorized personnel. At the same time, racks located in restricted access areas can be arranged in such a way to provide easy access to the patch panels, equipment units, equipment face panels, and the like to expose arrays of outlet ports to maintenance personnel. However, even in such restricted access areas the equipment components and associated connections can be subject to inadvertent tampering (e.g., removal of the wrong cable, etc.).

In other situations, economic or other considerations can dictate that such access to the outlet ports are not as strictly controlled (e.g., a temporary development setup, a startup company lacking financial resources to implement rigorous access controls, equipment racks located near office or common areas, etc.). As a result, access to such connections can be poorly controlled and subject to casual tampering with equipment component connections by unauthorized personnel as well as inadvertent tampering.

In yet other situations, special administrative controls can be implemented that require heightened awareness of potentially affected equipment when performing maintenance in restricted access areas. For example, when mission critical equipment components are collocated with non-essential equipment components, system administrators can desire implementing special administrative or logistical controls for performing maintenance in such areas. Accordingly, to prevent inadvertent interruption of essential services associated with the connection of mission critical equipment components when performing maintenance on non-essential equipment components, system administrators can require, e.g., physical separation of different classes of equipment components, two-party verification of equipment components and/or connections prior to commencing work, special color coding, etc. However, such administrative measures can be costly and can still be subject to human error.

Thus, in either situation, ensuring physical security to prevent unauthorized tampering with the equipment components and associated connections can be a challenge either due to cost considerations, manpower considerations, space considerations, etc. For example, while some methods to prevent cable and connection tampering have been described, still other methods focus on the use of electronic or software based connection-specific alarms. However, such methods are merely reactive rather than proactive. That is, while such connection-specific alarms can alert personnel to unexpected connection interruption due to tampering or other causes, the methods do not effectively prevent tampering. In other examples, where a mechanism notifies system administrators for a network and records events when an enclosure, cover, or door is opened or removed, such mechanisms can fail to address inadvertent tampering or unintended disconnection of essential equipment components by authorized personnel.

In still other outlet-based tamper prevention devices, conventional devices can require proprietary outlets or plugs, re-termination of an existing patch cable, excessive manpower required for installation or assembly, and/or excessive manpower for removal re-termination if such devices are no longer desired or warranted. In addition, in still other outlet-based tamper prevention devices, if such devices are not reusable, then the use thereof can be a significant cost factor in attempting to thwart tampering with equipment components and associated connections.

Although the above-identified methods or devices can work for their intended purposes, such methods or devices do not effectively address the considerations as described (e.g., cost, proprietary outlets or plugs, ease and flexibility of use, manpower requirements, raising awareness of mission critical connections, proactive prevention of tampering, inefficient use of costly equipment rack space, etc.). It is thus desired to provide enhanced cable anti-tamper devices, systems, and methodologies for cable tamper prevention that improve upon these and other deficiencies of conventional tamper prevention systems.

SUMMARY OF THE INVENTION

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In various embodiments, the disclosed subject matter provides apparatuses, devices, systems, and methodologies for prevention of tampering with cables and associated systems. In one aspect, an anti-tamper adapter is provided that can inhibit or prohibit cable tampering for existing cables. In further aspects, the provided embodiments can economically and flexibly facilitate cable tamper prevention in a wide array of cable technologies.

Thus, in various embodiments, cable tamper prevention systems are provided that can be adapted to accept an existing or standard communications plug in a reversible manner. The provided systems can inhibit actuation of the release mechanism when the standard communications plug is attached to an associated outlet. In other non-limiting implementations, a dummy plug or blocking plug can be adapted to employ disclosed apparatuses, devices, systems, and methodologies for tamper prevention that can facilitate blocking ports or outlets that are intended to remain undisturbed for a period of time.

Further embodiments of the disclosed subject matter provide cable anti-tamper adapters having a resilient catch in a channel of an adapter body that reversibly engages a recess in a plug. In an aspect, the resilient catch can limit plug travel in the adapter body in a reversible manner to allow removal of the plug for reuse of an associated cable without the cable anti-tamper adapter.

In yet other embodiments, methodologies for cable tamper prevention can include locking a plug into an anti-tamper adapter (e.g., reversibly or otherwise) to align a portion of the anti-tamper adapter that inhibits actuation of a release mechanism associated with the plug.

These and other additional features of the disclosed subject matter are described in more detail below.

BRIEF DESCRIPTION OF THE DRAWINGS

The devices, components, assemblies, structures, and methodologies of the disclosed subject matter are further described with reference to the accompanying drawings in which.

DETAILED DESCRIPTION OF ILLUSTRATIVE EMBODIMENTS

Overview

As used herein, the term "equipment component" is intended to refer to equipment components (e.g., enclosures, equipment units, patch panels, multimedia units, servers, communications switches, recording and playback devices, home computer and networking devices), whether rack-mountable or standalone (e.g., not rack-mountable) that can benefit from one or more embodiments of the disclosed subject matter. Additionally, as used herein, the terms "integrated" and "integrating" are intended to refer to the act of incorporating, forming, or uniting otherwise separate component parts into a whole. Moreover, the terms "plug," "standard communications plug," "blocking plug," and "dummy plug" are typically used herein to denote that a dummy or blocking plug can be a facsimile of a "plug" or "standard communications plug" that can comprise features and spatial relations that provide a form complementary to an outlet associated with the "plug." That is, a "dummy plug" or a "blocking plug" can comprise the minimum features that allow it to be plugged into an outlet associated with the "plug" in addition to having features which allow the "dummy plug" or "blocking plug" to employ disclosed apparatuses, devices, systems, and methodologies for tamper prevention. Accordingly, it can be understood that in some contexts, the terms "plug," "blocking plug," and "dummy plug" can be used interchangeably.

While a brief overview is provided, copper cables, and associated outlets, plugs, patch panels etc., as well as fiber optic cables, and associated outlets, adapters, patch panels etc., are described herein for the purposes of illustration and not limitation. In addition to copper cables etc., and fiber optic cables etc., the non-limiting terms "cable" and "plug" are intended to encompass any of a family of technologies designed to connect and transfer signals or electrical current between and/or among equipment components (e.g., power cables, patch cables, cords, patch cords, etc.). Additionally, while Registered Jack (RJ) type outlets and plugs (e.g., RJ-45, RJ-11, etc.) are described herein for the purpose of illustrating various non-limiting implementations, it should be appreciated that the disclosed subject matter is not so limited. For example, one skilled in the art can appreciate that the illustrative embodiments can have application with respect to other cable, plug, and outlet technologies.

As described in the background, conventional cable tamper prevention devices and methods suffer from drawbacks associated with excessive cost, use of proprietary outlets or plugs, difficulty and inflexibility of use, excessive manpower, reactive efforts to address tampering, inefficient use of costly equipment rack space, etc. These and other drawbacks can be appreciated upon review of FIGS. 1-6, which provide additional context surrounding the embodiments of the disclosed subject matter.

Figure 1:
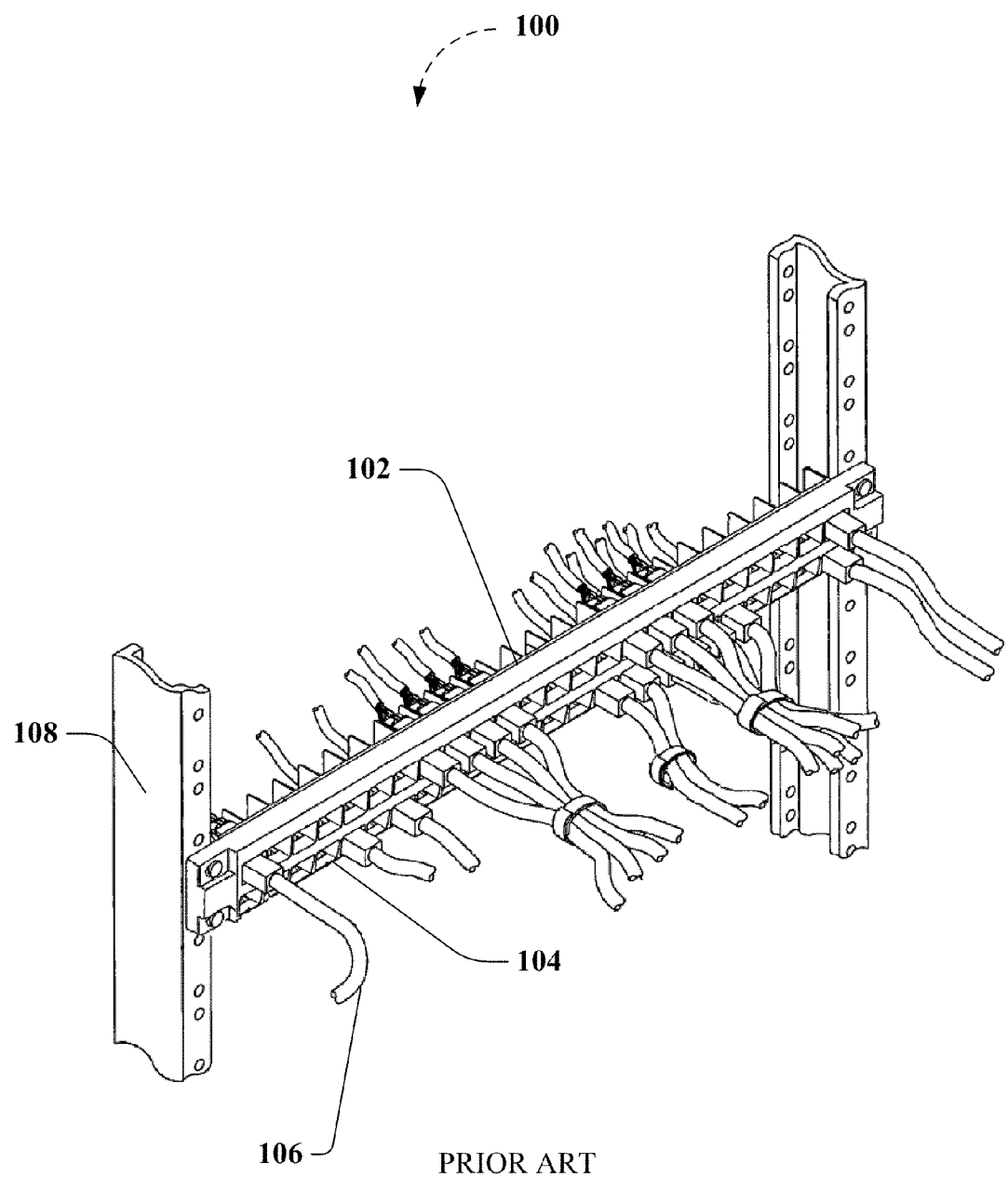
FIG. 1 depicts a front perspective view of an exemplary prior art patch panel, outlets, and patch cables in an equipment rack suitable for use with exemplary embodiments of the disclosed subject matter.

For example, FIG. 1 depicts a front perspective view 100 of an exemplary one rack unit (1RU) patch panel 102, outlets 104, and patch cables 106 in an equipment rack 108 suitable for use with exemplary embodiments of the disclosed subject matter. Typically, racks located in restricted access areas can be arranged in such a way to provide easy access to the patch panel 102, equipment units, equipment face panels, and the like to expose arrays of outlets 104 or ports to maintenance personnel. As can be seen in FIG. 1, the close proximity of adjacent outlets 104 can provide an opportunity for inadvertent tampering that can cause unwanted service interruption. In less restricted areas, patch panel 102 can provide similar access, but can be further subject to unauthorized tampering due to less strictly controlled physical access to areas containing rack 108. As a result, various embodiments of the disclosed subject matter, can provide an additional measure of cable tampering prevention for outlets 104 and attached patch cables 106, for example, whether the tampering is inadvertent (e.g., wrong outlet 104 is mistakenly selected for disconnection) or otherwise (e.g., intentional unauthorized access of outlets 104 and attached patch cables 106).

Figure 2:
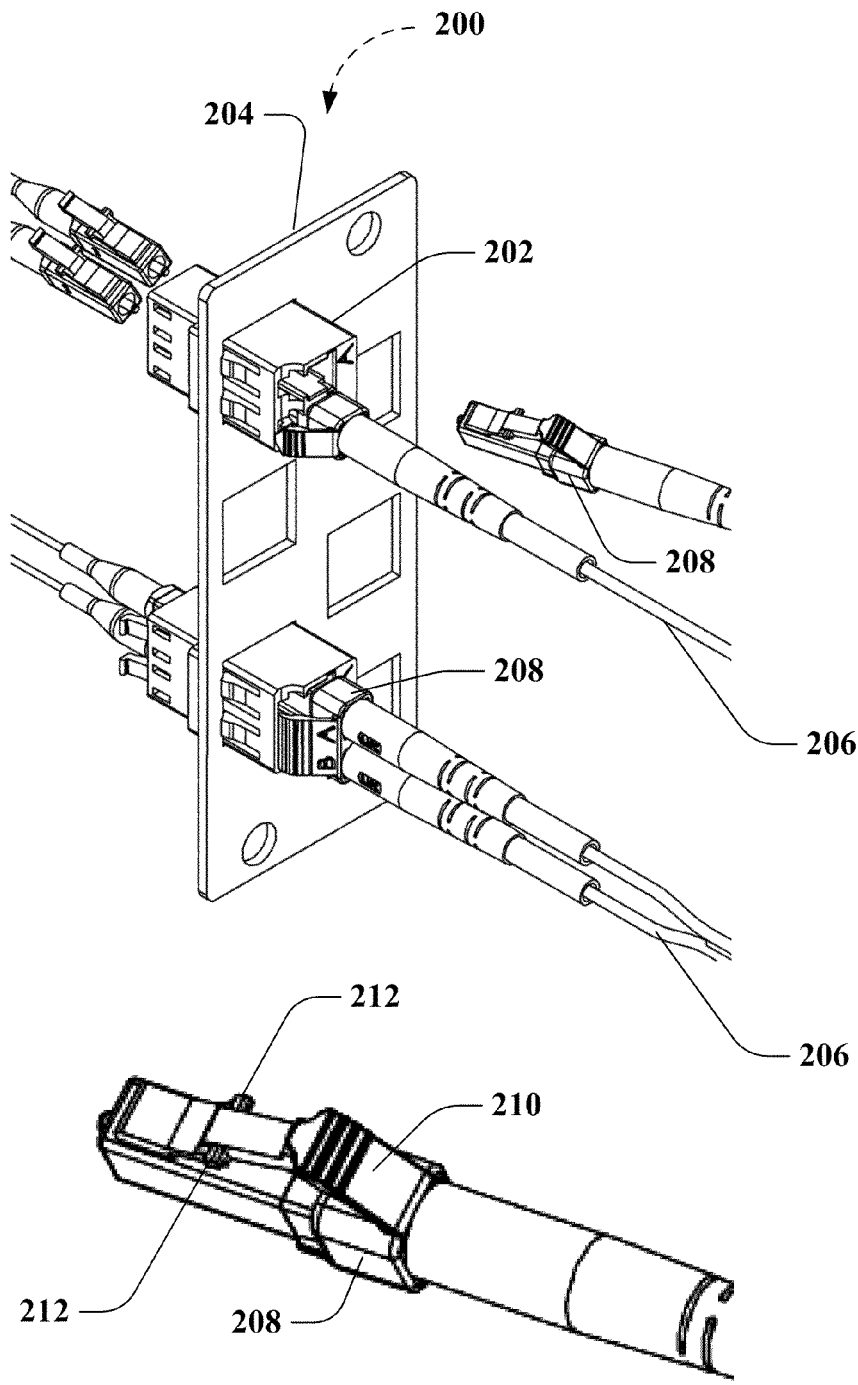
FIG. 2 illustrates an exemplary prior art fiber optic adapter panel, adapters, and patch cables suitable for use with further embodiments of the disclosed subject matter.

FIG. 2 illustrates an exemplary fiber optic adapter panel, adapters, and patch cables suitable for use with further embodiments of the disclosed subject matter. For instance, FIG. 2 depicts an exemplary Lucent Connector (LC) fiber optic adapter plate assembly 200 in which details of the attachment of adapter 202 to adapter panel 204 and fiber optic cable 206 to fiber optic adapter 202 are shown to further illustrate the close proximity with which different connections can be made. As can be seen in FIG. 2, fiber optic cable 206, terminated with plug 208 comprising resilient latch 210, can be plugged into and retained in fiber optic adapter 202 by virtue of latch protrusions 212 that mate to and engage with corresponding recesses (not shown) in fiber optic adapter 202 as plug 208 is inserted into fiber optic adapter 202. Typically, until such time as resilient latch 210 is depressed or otherwise manipulated to disengage latch protrusions 212 from the corresponding recesses in fiber optic adapter 202, fiber optic cable 206 will remain connected to fiber optic adapter 202. However, due to the close proximity of adjacent fiber optic adapters 202 (or outlets 104 of FIG. 1), such connections are subject to inadvertent tampering (e.g., wrong fiber optic adapter 202 is mistakenly selected for disconnection).

Figure 3:
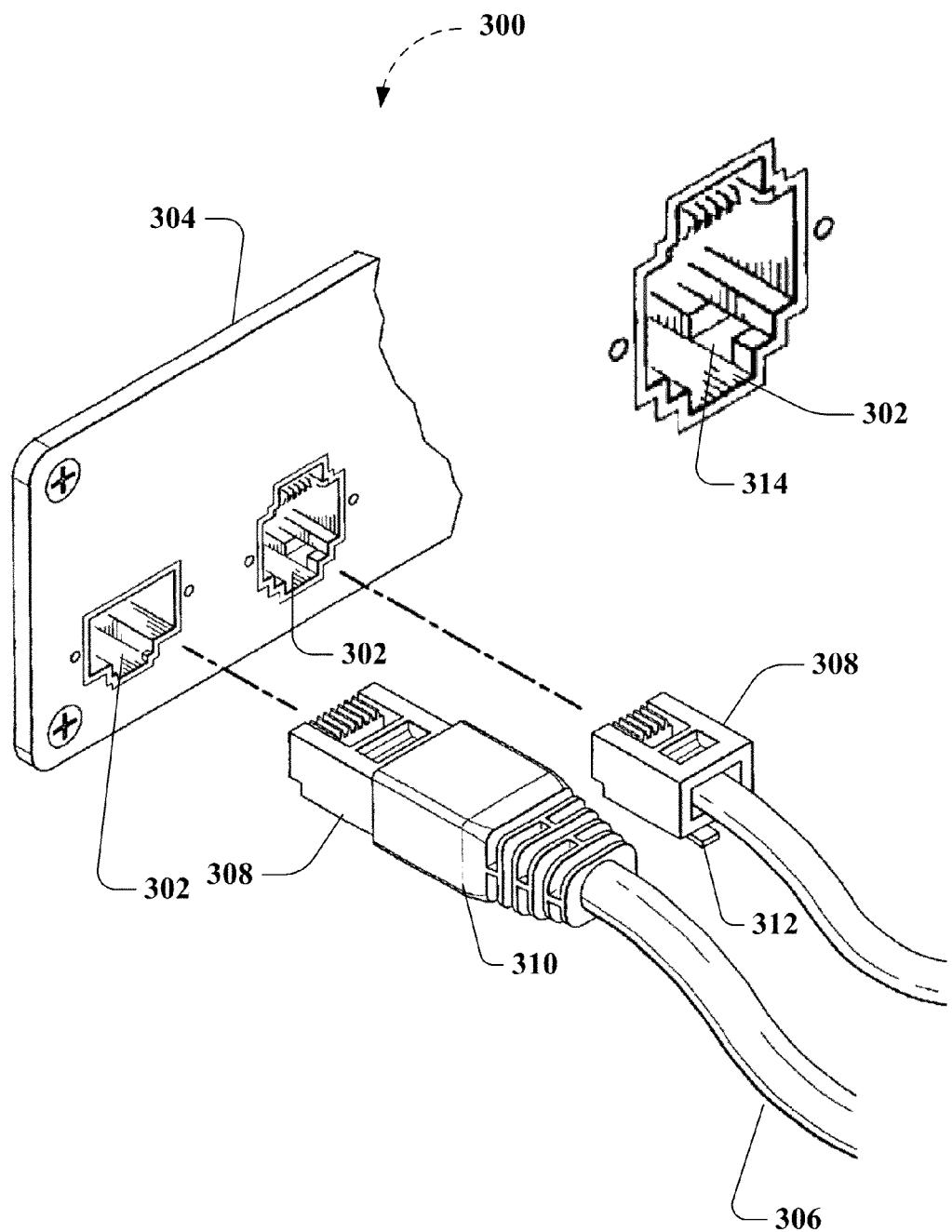
FIG. 3 illustrates an exemplary prior art Registered Jack (RJ) type equipment panel, outlets, and patch cables suitable for use with embodiments as described herein.

FIG. 3 illustrates 300 an exemplary RJ type equipment panel, outlets, and patch cables suitable for use with embodiments as described herein, in which details of the attachment of outlet 302 to equipment panel 304 and patch cable 306 to outlet 302 are depicted. FIG. 3 depicts an RJ-45 plug 308 with shroud 310 adjacent to an RJ-11 plug 308. As can be seen in FIG. 3, patch cable 306, terminated with plug 308 comprising resilient latch 312, can be plugged into and retained to outlet 302 by virtue of latch protrusions (e.g., a shoulder) (not shown) that mate to and engage with corresponding recesses 314 in outlet 302 as plug 308 is inserted into outlet 302. As described above, until such time as resilient latch 312 is depressed or otherwise manipulated to disengage latch protrusions from the corresponding recesses 314 in outlet 302, patch cable 306 will remain connected to outlet 302. As further described above, due to the close proximity of adjacent outlets 302 (or outlets 104 of FIG. 1), such connections are subject to inadvertent tampering (e.g., wrong outlet 302 is mistakenly selected for disconnection).

Figure 4:
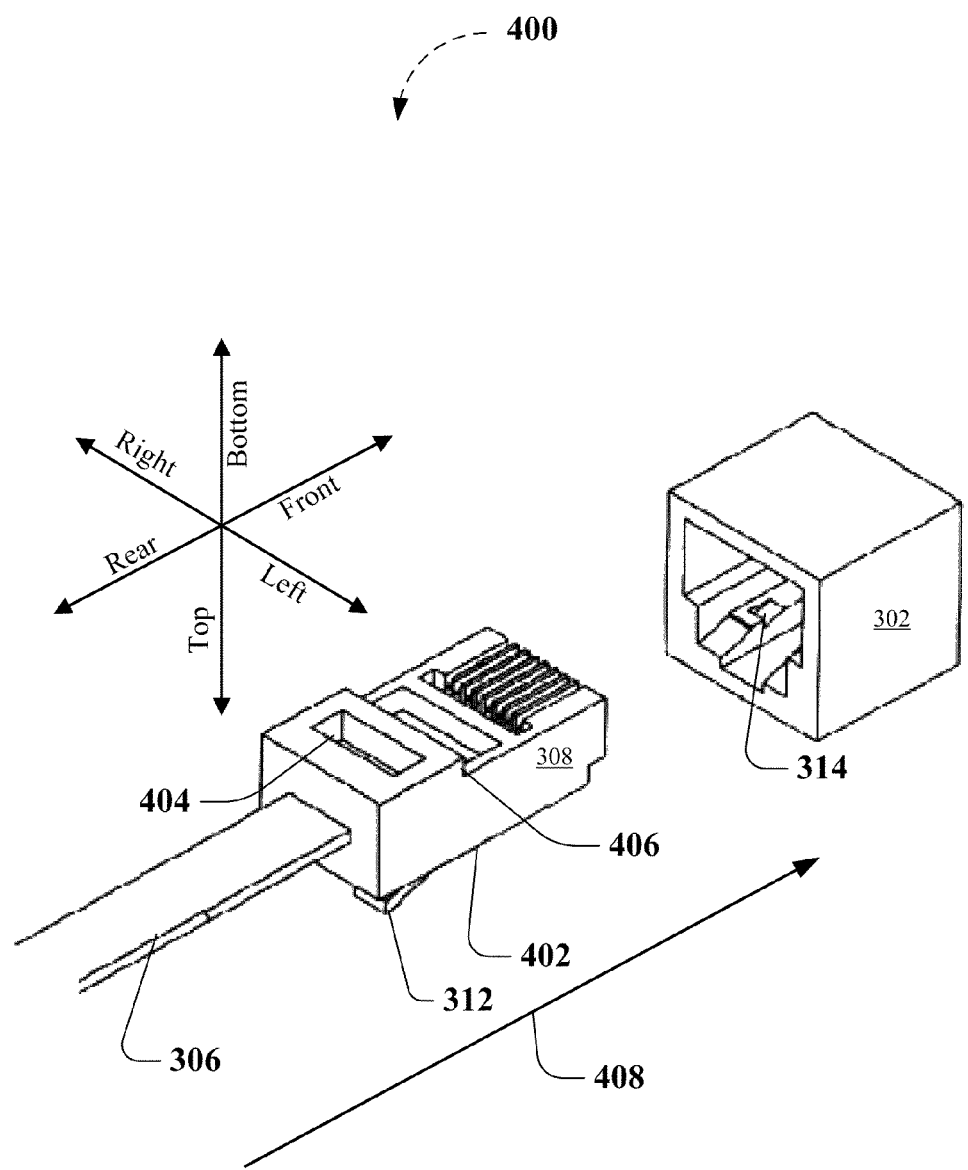
FIGS. 4-6 depict perspective and plan views of an RJ-45 plug and associated connector illustrating an exemplary application of disclosed embodiments.

FIG. 4 depicts a perspective view of an RJ-45 plug 308 and associated outlet 302 illustrating an exemplary application of disclosed embodiments, in which details of patch cable 306 and outlet 302 are shown as described above regarding FIG. 3. As can be seen in FIG. 4, which depicts a conventional RJ-45 plug 308, the plug 308 can comprise a plug body 402 having standardized external dimensions, as well as a recess 404 molded into plug body 402 and/or formed during patch cable 306 termination, and shoulder 406. According to convention, the direction of insertion (e.g., direction of normal insertion) or connection of plug 308 into outlet 302 is in the direction indicated at 408. In addition, plug 308 can be described as having a front portion (e.g., facing outlet 302) facing the direction of insertion 408 and a rear portion (opposite the front portion), where FIG. 4 depicts plug 308 as being viewed from the rear of the plug 308 as indicated. According to the orientation given in FIG. 4, FIG. 5 depicts plan views of an RJ-45 plug 308, and FIG. 6 depicts perspective views of an RJ-45 plug 308 further illustrating applications of disclosed embodiments.

Figure 5:
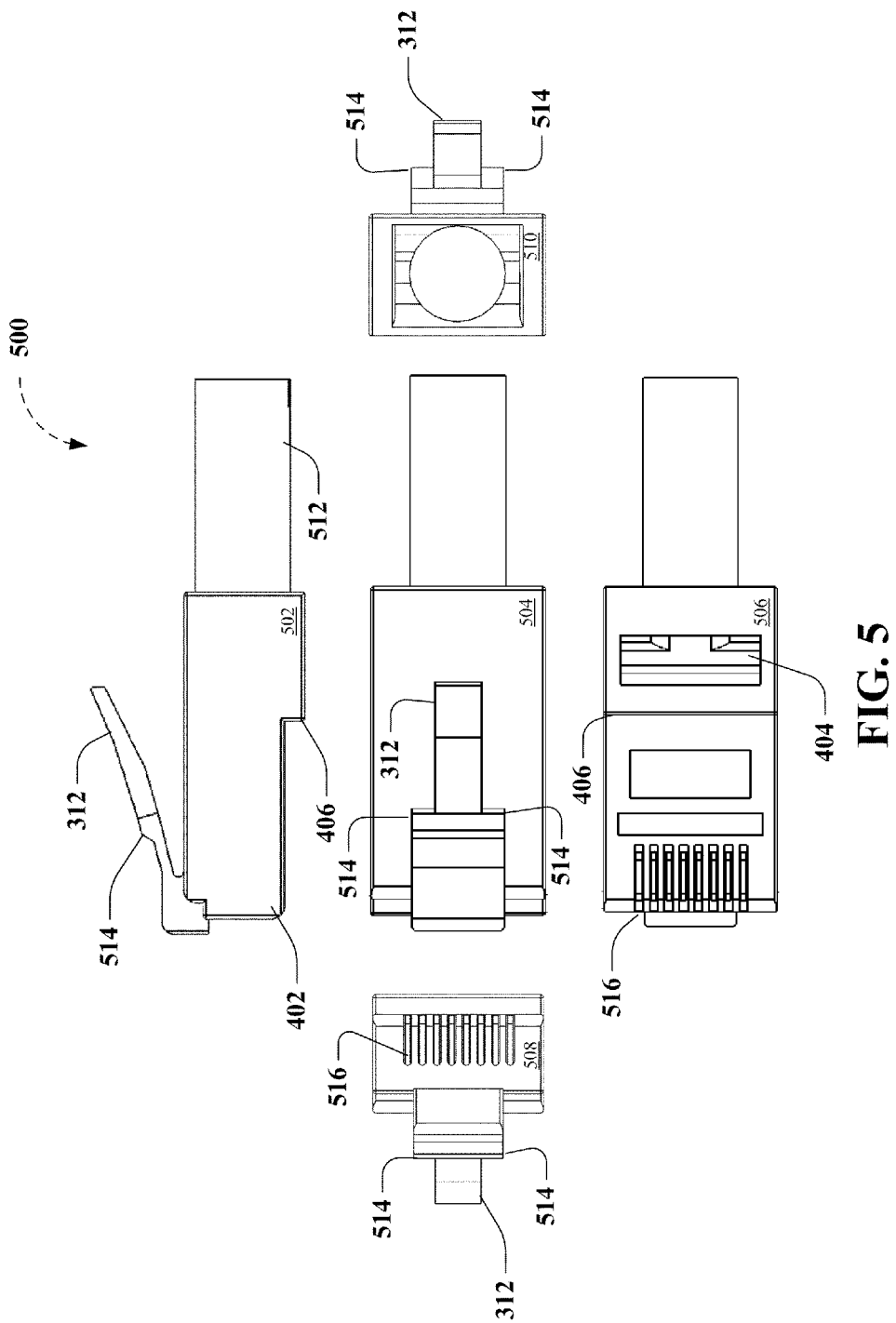
Figure 6:
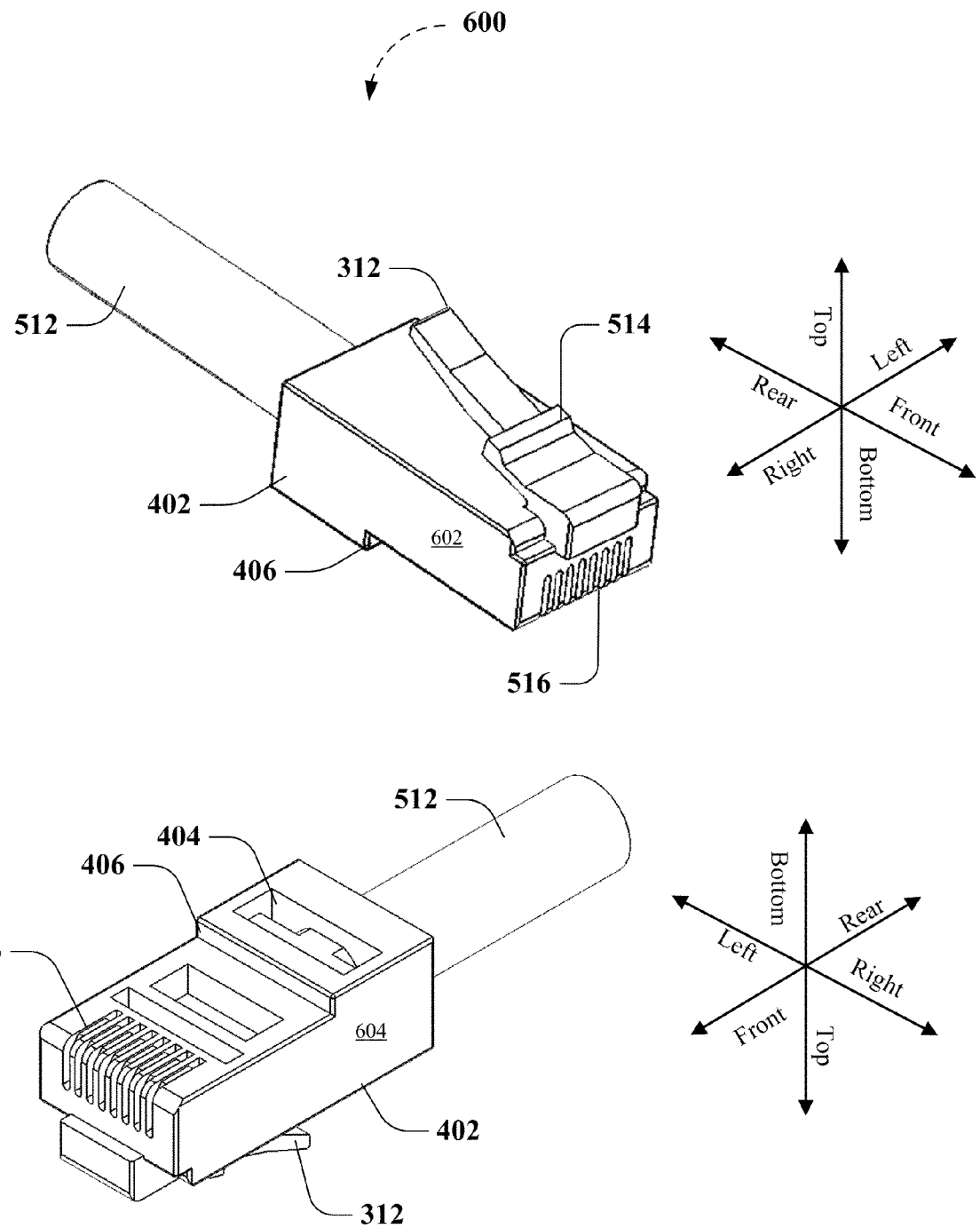

For instance, FIG. 5 depicts a left side view 502, a top view 504, a bottom view 506, a front end view 508, and a rear end view 510. As described, plug 308 can comprise a plug body 402 having standardized external dimensions, as well as a recess 404 molded into plug body 402 and/or formed during patch cable 306 termination, and a shoulder 406. In addition, plug 308 can comprise a length of cable 512 to form patch cable 306, for example. In addition, a resilient latch 312 that, when plug 308 is plugged into outlet 302, latch protrusions 514 (e.g., a shoulder) can mate to and engage with corresponding recesses 314 in outlet 302 as plug 308 is inserted into outlet 302. FIG. 5 also depicts an array 516 of conductors that engage a corresponding array of conductors in outlet 302 to provide communication signal paths.

Thus, an RJ-45 outlet 302 can receive an RJ-45 plug 308 connecting conductors of cable 512 through the array 516 of conductors to the corresponding array of conductors in outlet 302 to provide communication signal paths to an equipment component utilizing outlet 302. As described above, until such time as resilient latch 312 is depressed or otherwise manipulated to disengage latch protrusions 514 (e.g., a shoulder) from the corresponding recesses 314 in outlet 302, patch cable 306 will remain connected to outlet 302. As further described above, due to the close proximity of adjacent outlets 302 (or outlets 104 of FIG. 1, adjacent fiber optic adapters 202 of FIG. 2, etc.), such connections are subject to inadvertent tampering (e.g., wrong outlet 302 is mistakenly selected for disconnection, etc.). FIG. 6 depicts perspective views of an RJ-45 plug 308 as viewed from the top right front 602 and the bottom right front 604 according to the orientations given.

Having provided an overview of cable tamper prevention problems and solutions, in various embodiments, the disclosed subject matter provides cable tamper prevention apparatuses, systems, and methodologies for cable tamper prevention. In one non-limiting aspect, the disclosed subject matter improves upon conventional cable tamper prevention methodologies by proactively inhibiting cable tampering while avoiding the drawbacks associated proprietary plugs and outlets.

As described above, copper cabling, outlets, patch panels, plugs, RJ type plugs, fiber optic cabling, connectors, patch panels, adapters, etc., are described, or depicted herein for the purposes of illustration and not limitation. Thus, variations of the disclosed embodiments as suggested by the disclosed apparatuses, systems and methodologies are intended to be encompassed within the scope of the subject matter disclosed herein. For example, the various embodiments of the apparatuses, systems, and methodologies of the disclosed subject matter can include additional existing or as yet developed types of cabling, plugs, and outlets or adapters.

As a further example, while RJ-45 plugs 308 have been depicted for illustration and not limitation, various equipment component connections and patch cables (e.g., such as fiber optic, audio, video, power, etc.) that include retention mechanisms between the plug and outlet are intended to be encompassed within the scope of the subject matter disclosed herein. Moreover, as further described below regarding FIG. 37, for example, a dummy or blocking plug adapted to the form of a standard plug (e.g., such as an RJ-Type, fiber optic, audio, video, power, etc.) outlet or complementary to an outlet associated with the plug can employ disclosed apparatuses, devices, systems, and methodologies for tamper prevention that can facilitate blocking ports that are intended to remain undisturbed for a period of time. In addition, variations encompassed within the scope of the disclosed subject matter can include separation of component parts into subassemblies or further integration of some components or parts into assemblies, variation in the location, number, and/or arrangement of components or parts, etc.

Exemplary Cable Tamper Prevention

Figure 7:
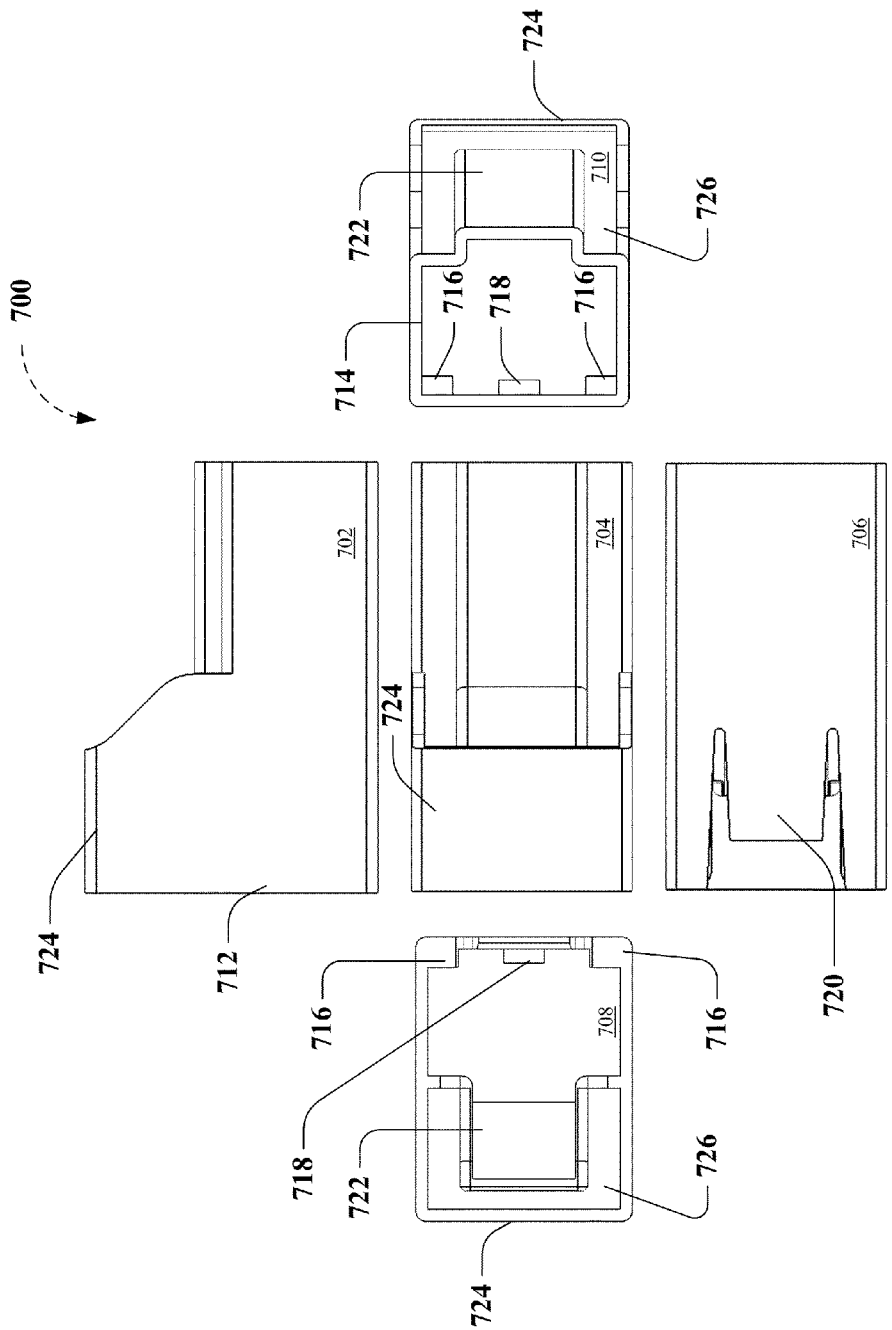
FIG. 7 depicts views of an exemplary embodiment of an anti-tamper adapter suitable for use with RJ-type plugs as described herein.
Figure 8:
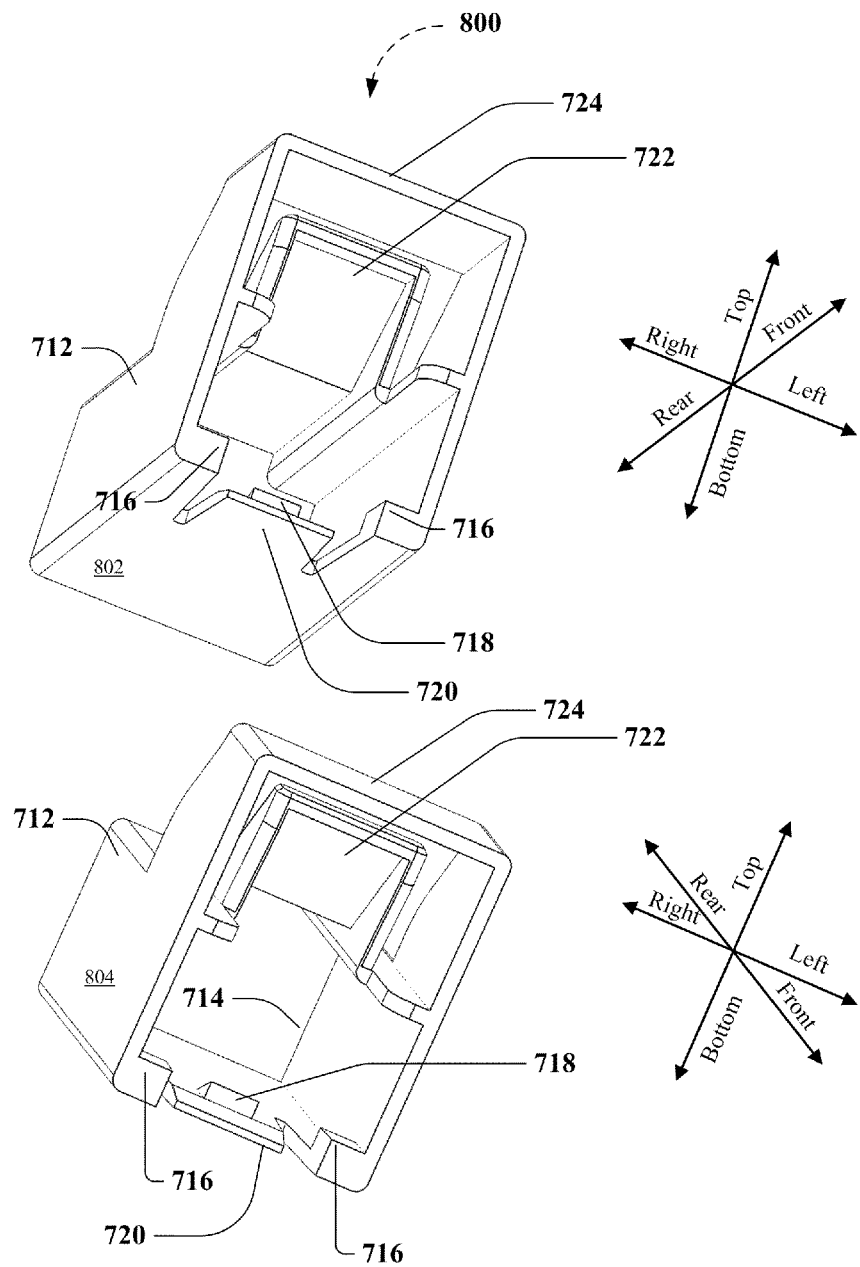
FIGS. 8-9 depict perspective views of a non-limiting implementation of an anti-tamper adapter suitable for use with RJ-type plugs.
Figure 9:
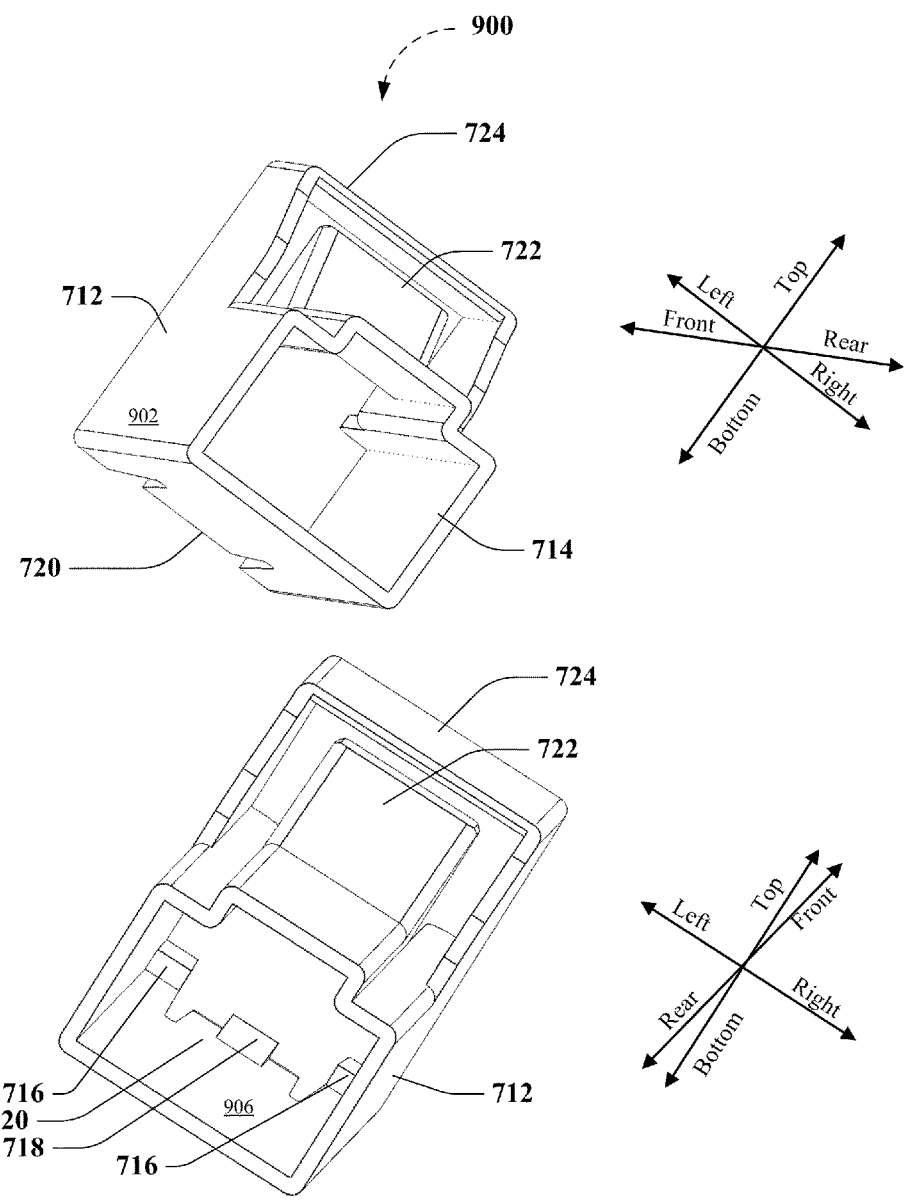
Figure 10:
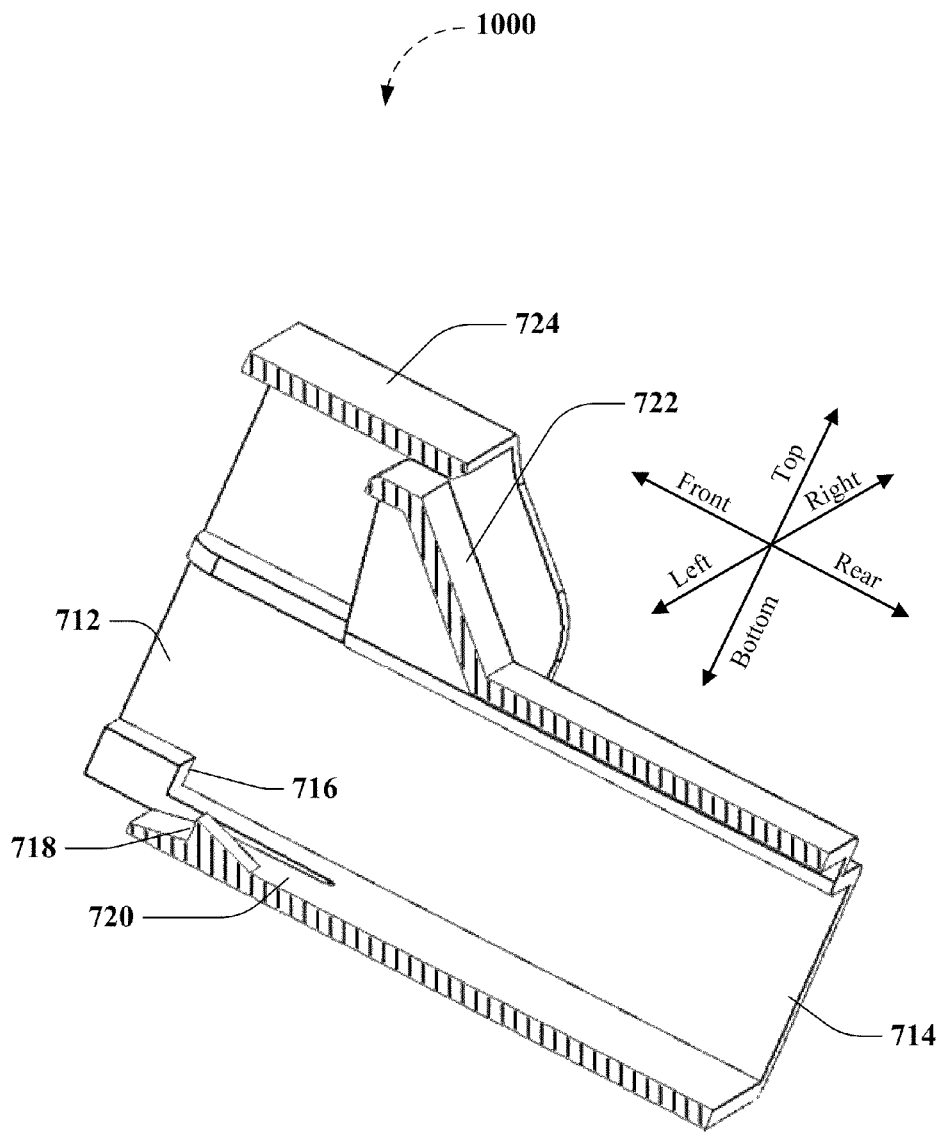
FIG. 10 depicts a cross-section of a perspective view for exemplary embodiments of an anti-tamper adapter suitable for use with RJ-type plugs as described herein.

In view of the above described deficiencies, various embodiments of the disclosed subject matter can facilitate cable tamper prevention without requiring re-termination of existing cables. For example, FIG. 7 depicts views of an exemplary embodiment of an anti-tamper adapter or apparatus 700 suitable for use with RJ-type plugs 308 as described herein. For instance, FIG. 7 depicts a left side view 702, a top view 704, a bottom view 706, a front end view 708, and a rear end view 710 of anti-tamper adapter 700 according to the orientation as described with regard to FIGS. 4-6. FIGS. 8-9 depict perspective views 802 (front right bottom), 804 (front right top), 902 (rear left bottom), and 904 (rear right top) of a non-limiting implementation of an anti-tamper adapter 700 suitable for use with RJ-type plugs 308 (or suitably adapted dummy or blocking plugs). In addition, FIG. 10 depicts a cross-section 1000 of a perspective view for exemplary embodiments of an anti-tamper adapter 700 suitable for use with RJ-type plugs 308 (or suitably adapted dummy or blocking plugs) as described herein.

According to various embodiments, the disclosed subject matter provides an anti-tamper adapter 700 comprising a body 712 having a channel at least partially defined by a rear opening 714 in the body 712 (e.g., at the rear portion of the channel). The body 712 can accept a plug 308 (e.g., a standardized communications plug, an existing plug, for example, that has been terminated, an RJ type plug, a fiber optics plug, other plug, dummy plug, or blocking plug, etc.). Note that the rear portion can be sized to allow the plug 308 to pass into the body 712 in a direction coincident with a direction of normal insertion of the plug 308 into an associated outlet 302. For example, plug 308 is normally inserted from the front of plug 308 toward the outlet 302. In a similar direction (e.g., in a direction coincident with a direction of normal insertion), front of plug 308 can be inserted into body 712 at the rear portion of the channel.

According to an aspect, body 712 can comprise one or more shoulder(s) or protrusion(s) 716 that can extend into the channel located proximate the front portion of the channel (e.g., the portion of the body 712 opposite the rear portion). The one or more shoulder(s) or protrusions 716 can limit plug 308 travel in the direction coincident with the direction of normal insertion. For instance, shoulders 716 can engage shoulder 406 of plug 308 as plug 308 is inserted into body 712. Thus, the one or more shoulder(s) or protrusion(s) 716 in the channel can limit the maximum travel of plug 308 into body 712 in the direction of normal insertion.

In a further aspect, body 712 can comprise one or more resilient catches or protrusion(s) 718 in the channel that can reversibly engage one or more recesses 404 in plug 308. Accordingly, resilient catches or protrusion(s) 718 can limit plug 308 travel within the body 712 at least in the direction opposite the direction of normal insertion. For instance, as plug 308 is inserted into body 712, resilient catches or protrusion(s) 718 can extend outward from the channel, allowing one or more recesses 404 to be positioned under the resilient catches or protrusion(s) 718. As the one or more recesses 404 pass under the one or more resilient catches or protrusion(s) 718, the one or more resilient catches or protrusion(s) 718 can at first spring away from the channel, and then can return to a resting position in the one or more recesses 404 of plug 308.

As a result, the one or more resilient catches or protrusion(s) 718, in conjunction with the one or more recesses 404 of plug 308, can reversibly or releasably lock or fix the plug 308 into a predetermined position in the anti-tamper adapter 700. Thus, in cooperation with the one or more shoulder(s) or protrusion(s) 716, or standing alone with the one or more recesses 404 of plug 308, the one or more resilient catches or protrusion(s) 718 can reversibly or releasably lock or fix the plug 308 into a predetermined position in the anti-tamper adapter 700. Consequently, various embodiments can advantageously be retrofitted to existing plugs (e.g., plugs 308, 208, etc.) without requiring re-termination of existing patch cables.

As a further advantage, various embodiments of the exemplary anti-tamper adapter 700 can be removed and reused due, in part, to the reversible or releasable manner of locking or fixing to the existing plug 308. For example, once it is determined that tamper prevention via anti-tamper adapter 700 is no longer desired, the anti-tamper adapter 700 can be unlocked and removed from plug 308 leaving the plug 308 in its original unaltered condition. As a further example, by manipulating the one or more resilient catches or protrusion(s) 718 out of the one or more recesses 404 of plug 308, the plug 308 can be moved from its predetermined position in the anti-tamper adapter 700, and the plug 308 can be removed from the anti-tamper adapter 700 in the opposite direction from which it was inserted into body 712 (e.g., the direction opposite the direction of normal plug 308 insertion). Preferably, various embodiments of the disclosed subject matter can facilitate disconnecting the plug 308 from the outlet 302 so as to provide access to the front of plug 308 and anti-tamper adapter 700 before allowing the above described manipulation (e.g., without destroying or otherwise rendering useless the anti-tamper adapter 700) of the one or more resilient catches or protrusion(s) 718.

As can be seen from FIGS. 7-10, for example, the one or more resilient catches or protrusion(s) 718 are depicted, for purposes of illustration and not limitation, as catches or protrusion(s) 718, formed on a semi-rigid arm 720 molded into body 712, and extending into the channel. However, other mechanisms for reversibly or releasably locking or fixing the plug 308 into a predetermined position in the anti-tamper adapter 700 are contemplated by the disclosed subject matter. For instance, various embodiments employing similar reversibly or releasably locking or fixing functions can include screws, spring ball and detent, and other means of reversibly or releasably locking or fixing plug 308 into a predetermined position in the anti-tamper adapter 700.

In addition, for various permanent, semi-permanent, or disposable embodiments of anti-tamper adapter 700, catches or protrusion(s) 718 can be formed in a manner giving the catches or protrusion(s) 718 less resilience (e.g., via rigid structures, adhesives, etc.). In such exemplary non-limiting embodiments, it can be appreciated that attempts to remove plug 308 from anti-tamper adapter 700 can result in potentially irretrievable damage to one or more of the plug 308 or the anti-tamper adapter 700. Thus, the various embodiments as described herein are intended to encompass a wide range of variations suitable for particular design considerations.

Referring again to FIG. 7, anti-tamper adapter 700 can further comprise a plug release guard or release shroud 722 located on the body 712 (e.g., a molded body, etc.) proximate to the front portion of the channel. The plug release guard or release shroud 722 can at least partially surround a plug release or release mechanism (not shown), e.g., resilient latch 210 or 312, of the plug 308. Thus, plug release guard or release shroud 722 can inhibit or prevent access and/or inhibit or prevent actuation of the plug release or release mechanism (e.g., resilient latch 210 or 312) of the plug 308 (or plug 208 of fiber optic cable 206) when the plug 308 is inserted into the associated outlet (e.g., outlet 202 or 302), by for example, the close proximity of the plug release guard or release shroud 722 (or housing 724 as further described below) to the surface of a panel (204 or 304) supporting the plug 308 attached outlet (e.g., outlet 202 or 302). This close proximity can prevent normal access (e.g., without a tool or key as described herein) to one or more sides of the plug release or release mechanism (e.g., resilient latch 210 or 312) of the plug 308 (or plug 208 of fiber optic cable 206). As a result, various embodiments of the anti-tamper adapter 700 can facilitate cable tamper prevention (e.g., either inadvertent or intentional) of a plug 308 (or plug 208 of fiber optic cable 206) fitted with an embodiment of anti-tamper adapter 700 when the plug 308 (or plug 208 of fiber optic cable 206) is connected or inserted into an associated outlet (e.g., outlet 302 or 202 for fiber optic cable 206, etc.).

As mentioned above, anti-tamper adapter 700 can further comprise a housing 724 on body 712 that at least partially surrounds the plug release guard or release shroud 722 or release mechanism (not shown), e.g., resilient latch 210 or 213, of the plug 308. Thus, housing 724 can inhibit or prevent access and/or inhibit or prevent actuation of the plug release or release mechanism (e.g., resilient latch 210 or 312) of the plug 308 (or plug 208 of fiber optic cable 206) when the plug 308 is inserted into the associated outlet (e.g., outlet 202 or 302). For instance, the housing 724 can be positioned relative to the plug release guard or release shroud 722, such that it at least partially surrounds the plug release guard or release shroud 722.

In addition, the housing can further shroud the plug release or release mechanism (e.g., resilient latch 210 or 312) to prevent or inhibit actuation (e.g., prevent or inhibit normal actuation) of the release mechanism when the plug 308 (e.g., a standard communications plug such as a fiber optic plug, and RJ type plug, or communications cable plug, audio plug, video plug, etc.) is attached to an associated outlet (e.g., outlet 302 or 202 for fiber optic cable 206, etc.). Moreover, housing 724 can be located relative to plug release guard or release shroud 722, so as to comprise an access aperture (e.g., 726 of front and rear end views 708 and 710, respectively) between the housing 724 and the plug release guard or release shroud 722 that can permit a removal tool or key (described below) to be positioned proximate to the plug release or release mechanism (e.g., resilient latch 210 or 312) of the plug 308 (or plug 208 of fiber optic cable 206), when the removal tool (described below) is inserted into the cable anti-tamper adapter 700. It can be understood that other arrangements or access apertures suitable for permitting a removal tool (described below) to be positioned proximate to the plug release or release mechanism (e.g., resilient latch 210 or 312) of the plug 308 can be contemplated upon consideration of the disclosed subject matter, for example, regarding FIGS. 23-24 below.

Accordingly, as described above, the close proximity of housing 724 to the surface of a panel (204 or 304) supporting the plug 308 attached outlet (e.g., outlet 202 or 302) can prevent normal access (e.g., without a tool or key as described herein) to one or more sides of the plug release or release mechanism (e.g., resilient latch 210 or 312) of the plug 308 (or plug 208 of fiber optic cable 206). As a result, various embodiments of the anti-tamper adapter 700 can facilitate cable tamper prevention (e.g., either inadvertent or intentional) of a plug 308 (or plug 208 of fiber optic cable 206) fitted with an embodiment of anti-tamper adapter 700 when the plug 308 (or plug 208 of fiber optic cable 206) is connected or inserted into an associated outlet (e.g., outlet 302 or 202 for fiber optic cable 206). In further non-limiting embodiments as described below, dummy plugs or blocking plugs can be adapted to employ an embodiment of anti-tamper adapter 700 to facilitate blocking ports or outlets that are intended to remain undisturbed for a period of time.

Thus, in various aspects, the disclosed subject matter provides cable tamper prevention apparatuses (e.g., anti-tamper adapter 700) that can advantageously provide cost-effective tamper prevention with or without the use of proprietary outlets or plugs, while offering ease and flexibility of use, and without excessive manpower requirements (e.g., two party verification of connection during maintenance, rigorous access controls, etc.). As additional advantages, the various embodiments can be employed to complement reactive efforts to address tampering (e.g., connection or enclosure based alarms) and can allow more efficient use of costly equipment rack space, for example, where mission critical service connection can be located in close proximity to less essential service connections.

In a further aspect, various embodiments of anti-tamper adapter 700 can be comprised of a rigid or semi-rigid material, such as a moldable plastic or polymer, in addition to more rigid materials such, for example, as metals or ceramics. For instance, a molded plastic anti-tamper adapter 700 can include one or more of a molded body 712, a plug release guard or release shroud 722, and/or a housing 724. In yet another aspect, plug release guard or release shroud 722, and/or a housing 724, as well as other components (e.g., 716, 718, etc.), can be molded integral to molded body 712 or separately and subsequently attached or integrated as desired. In a further aspect, the moldable plastic or polymer can be selected based on a color scheme according to an intended use of the anti-tamper adapter 700 (e.g., a standardized color scheme), for example, to signify mission critical service connections, etc.

Figure 11:
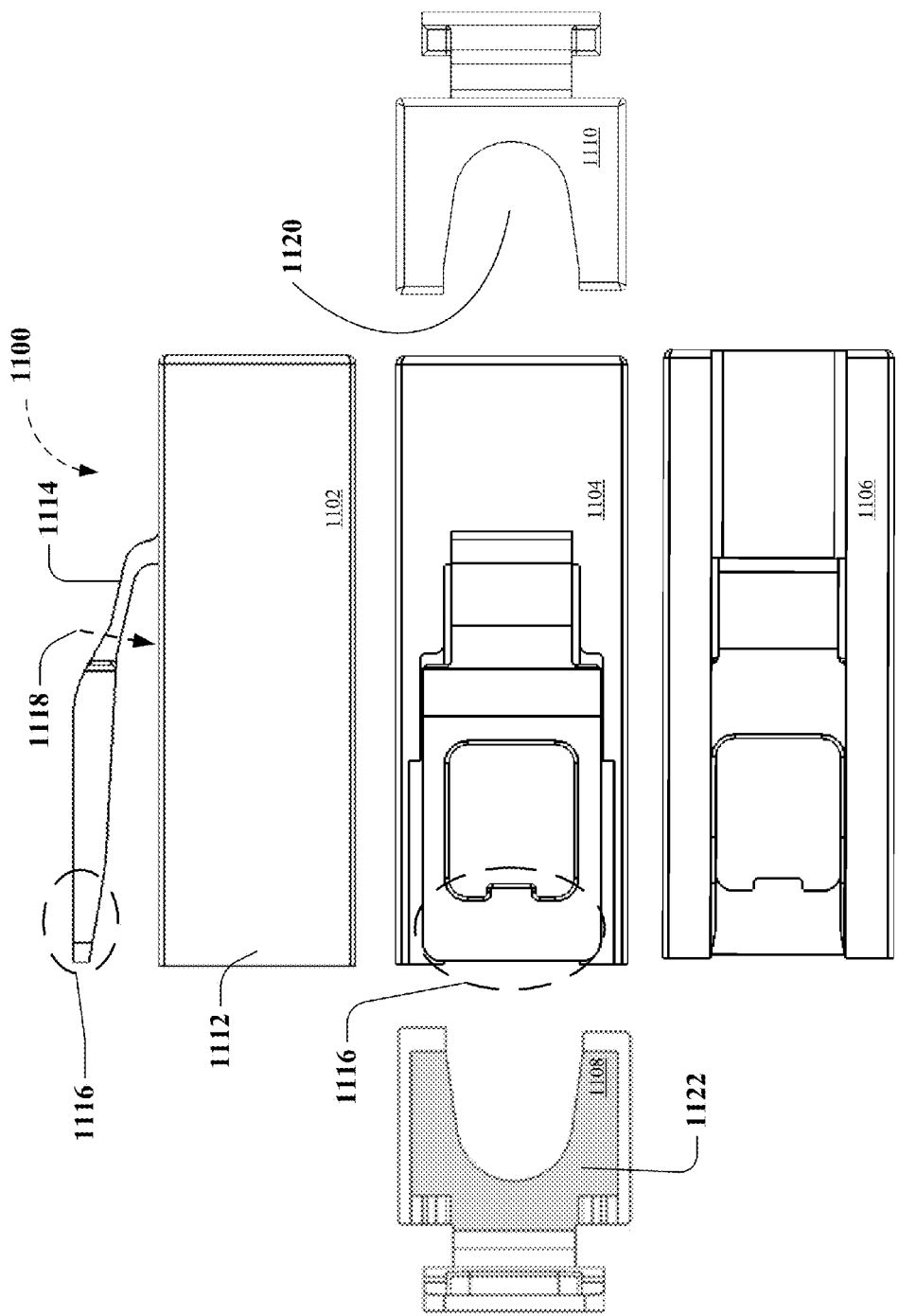
FIG. 11 depicts views of an exemplary non-limiting removal tool or key for disconnecting a connected RJ-type plug using exemplary embodiments of an anti-tamper adapter as described herein.
Figure 12:
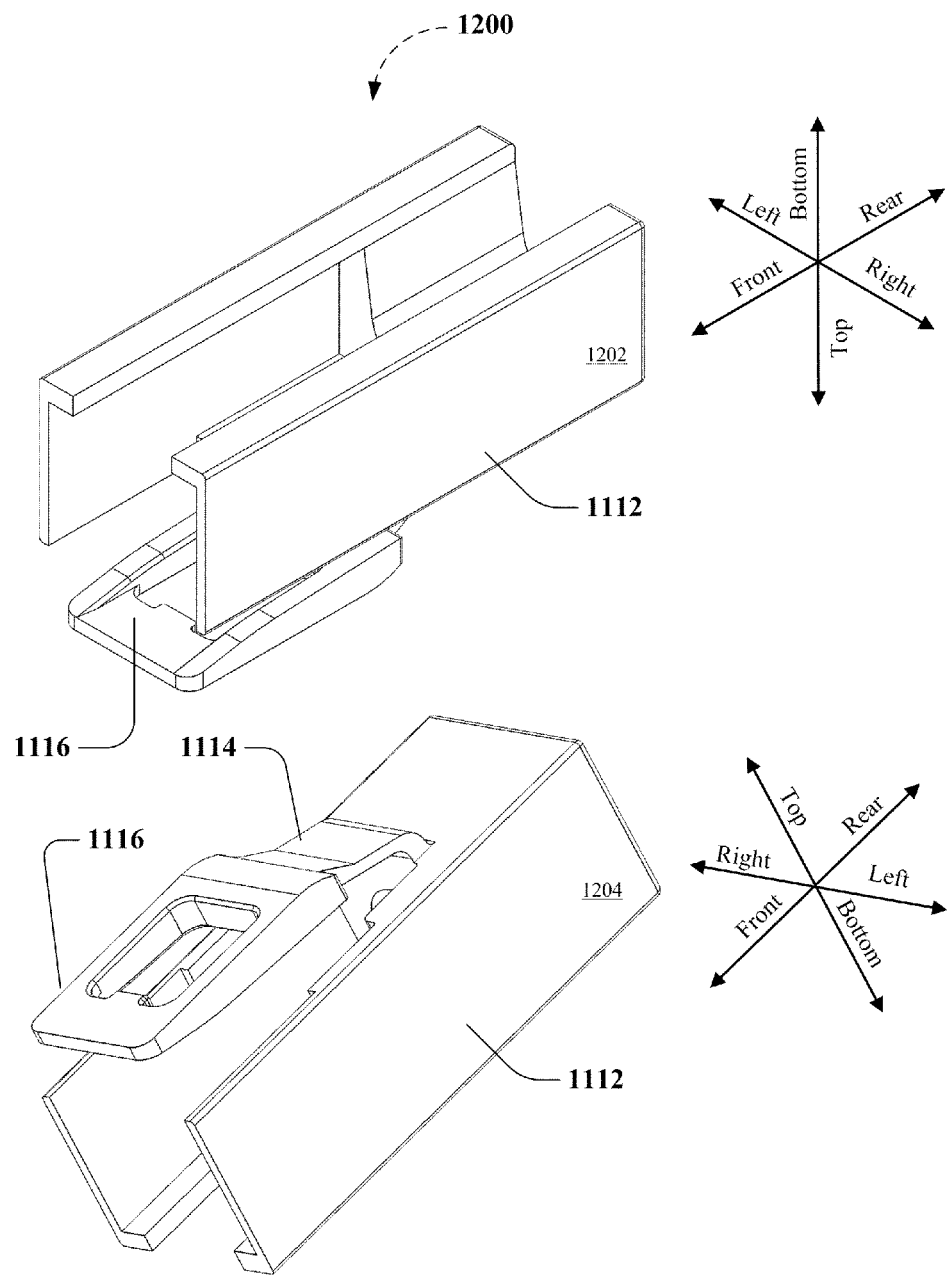
FIGS. 12-13 depict perspective views illustrating further aspects of an exemplary removal tool or key for disconnecting a connected RJ-type plug using embodiments of an anti-tamper adapter as described herein.
Figure 13:
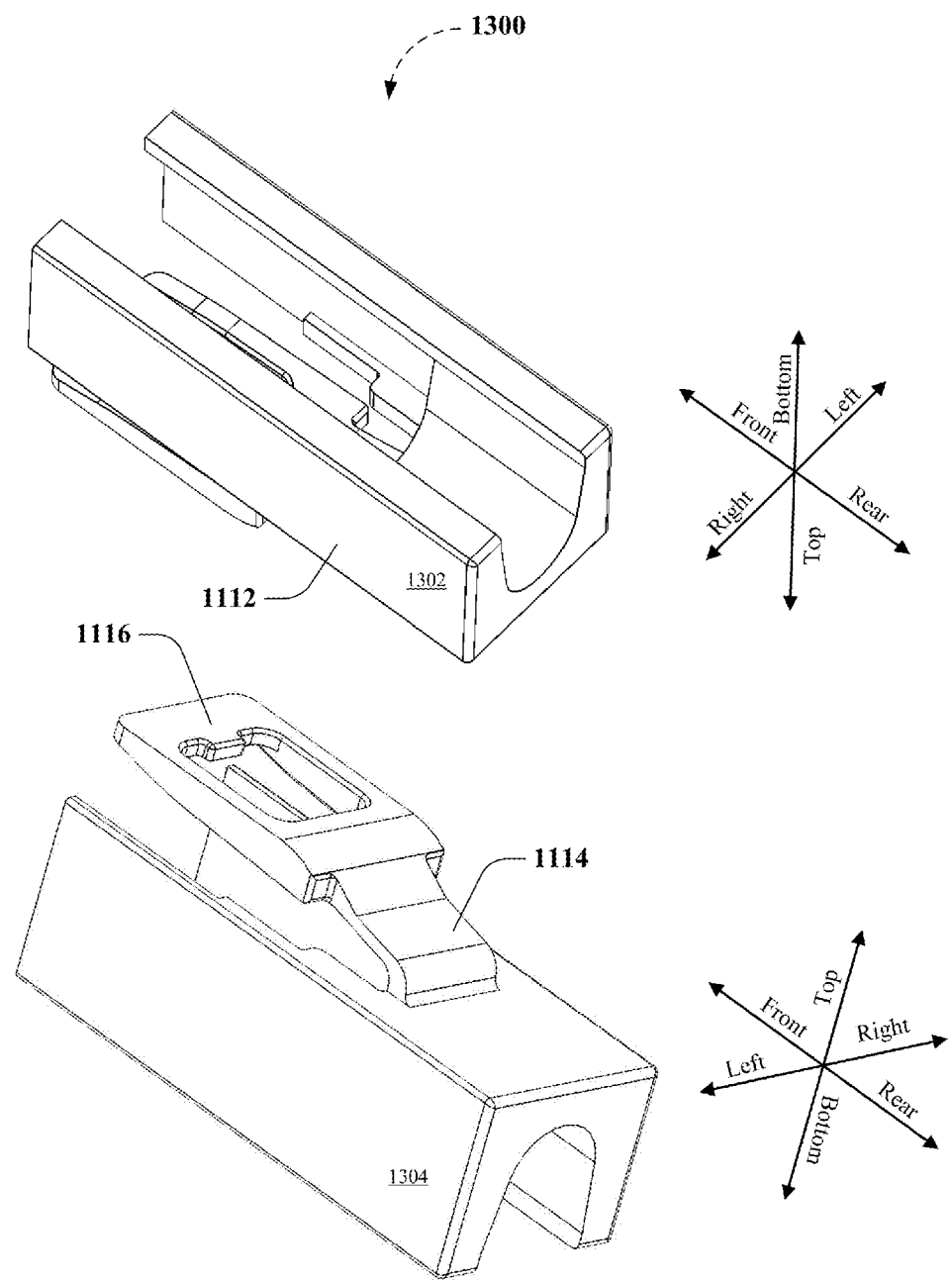
Figure 14:
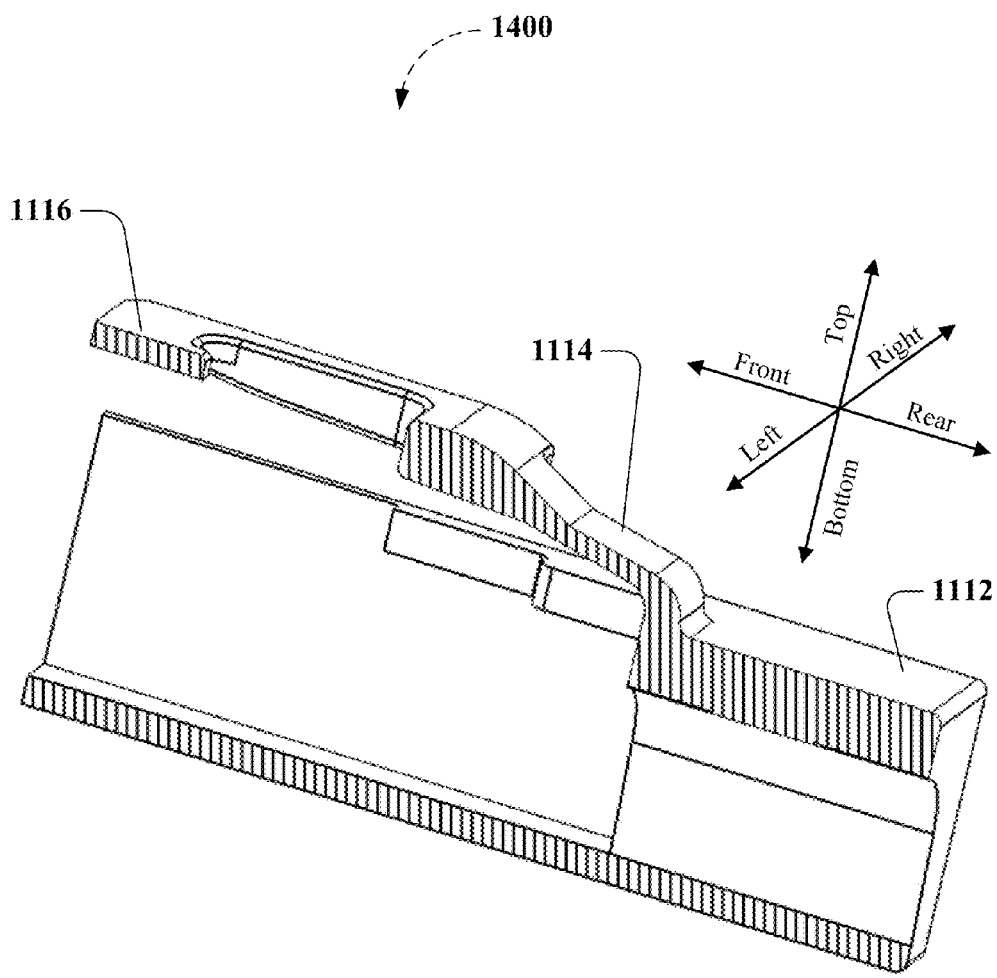
FIG. 14 depicts a cross-sectional perspective view of a removal tool or key for disconnecting a connected RJ-type plug using an exemplary anti-tamper adapter of the disclosed subject matter.

FIG. 11 depicts views of an exemplary non-limiting removal tool or key for disconnecting a connected RJ-type plug using exemplary embodiments of an anti-tamper adapter as described herein. For instance, FIG. 11 depicts a left side view 1102, a top view 1104, a bottom view 1106, a front end view 1108, and a rear end view 1110 of exemplary non-limiting removal tool or key 1100 according to the orientation as described with regard to FIGS. 4-6. FIGS. 12-13 depict perspective views 1202 (front right bottom), 1204 (front left top), 1302 (rear right bottom), and 1304 (rear left top) illustrating further aspects of an exemplary removal tool or key 1100 for disconnecting a connected RJ-type plug using embodiments of an anti-tamper adapter 700 as described herein. Additionally, FIG. 14 depicts a cross-sectional perspective view 1400 of a removal tool or key 1100 for disconnecting a connected RJ-type plug (e.g., plug 308) using an exemplary anti-tamper adapter 700 of the disclosed subject matter.

According to various embodiments, the disclosed subject matter provides a removal tool or key 1100 comprising a body 1112. According to an aspect, as described above, body 1112 can be comprised of a rigid or semi-rigid material, such as a moldable plastic or polymer, in addition to more rigid materials such as metals or ceramics. For example, removal tool or key 1100 (e.g., a molded plastic removal tool or key 1100) can include one or more of a molded body 1112 and a plug release arm 1114 that permits a plug release region 1116 of the removal tool or key 1100 to be placed in proximity to a plug release or release mechanism (e.g., resilient latch 210 or 312) of the plug 308 (or plug 208 of fiber optic cable 206) when the removal tool or key 1100 is inserted into an access aperture 726 on a anti-tamper adapter 700 as described above.

For instance, the removal tool or key 1100 can permit the plug release region 1116 to enter through the access aperture 726 created by plug release guard or release shroud 722 and housing 724, whereas normal means (e.g., manual manipulation) to actuate a plug release or release mechanism (e.g., resilient latch 210 or 312) of the plug 308 (or plug 208 of fiber optic cable 206) would be inhibited or prevented when the plug 308 (or plug 208 of fiber optic cable 206) is connected to outlet 302 (or 202) by one or more of the plug release guard or release shroud 722 and housing 724. Thus, plug release arm 1114 can permit a plug release region 1116 of plug release arm 1114 to selectively manipulate the plug release or release mechanism (e.g., resilient latch 210 or 312) of the plug 308 (or plug 208 of fiber optic cable 206), for example, when the plug release arm 1114 is manipulated in a direction orthogonal to the direction of normal insertion of plug 308 as described above.

For instance, plug release arm 1114 can comprise a resilient length of a semi-rigid material as described herein. Thus, application of a force in the direction indicated by 1118 (e.g., a direction orthogonal to the direction of normal insertion of plug 308) would cause plug release region 1116 of plug release arm 1114 to move downward toward body 1112. As further described below, this motion, in conjunction with the proximity of plug release region 1116 to a plug release or release mechanism (e.g., resilient latch 210 or 312), can cause selective manipulation of the plug release or release mechanism (e.g., resilient latch 210 or 312) of the plug 308 (or plug 208 of fiber optic cable 206) having an attached anti-tamper adapter 700. Accordingly, this selective manipulation of plug release or release mechanism (e.g., resilient latch 210 or 312) with removal tool or key 1100 can allow removal or disconnection of the plug 308 (or plug 208 of fiber optic cable 206) having an attached anti-tamper adapter 700.

Referring again to FIG. 11, in a further aspect, exemplary non-limiting implementations of removal tool or key 1100 can comprise a channel 1120 (e.g., empty region indicated at 1120 on rear end view 1110) formed in body 1112. Channel 1120 can, in various aspects, accommodate a cable (e.g., fiber optic, copper, coaxial, etc.) to be used as a guide for placing the removal tool or key 1100 in position prior to using to disconnecting or removing plug 308 (or plug 208 of fiber optic cable 206) having an attached anti-tamper adapter 700 from a outlet 302 (or 202). Advantageously, the channel 1120 can be left open on the bottom of body 1112 of removal tool or key 1100 to allow easy installation on anti-tamper adapter 700 of removal tool or key 1100.

According to a further aspect, various non-limiting implementations of body 1112 can comprise a cavity 1122 (e.g., indicated as shaded region 1122 on front end view 1108), that accepts exemplary embodiments of anti-tamper adapter 700. For instance, cavity 1122 can be sized appropriately (e.g., larger than the relevant outer dimensions of anti-tamper adapter 700 body 712) to receive body 712 of anti-tamper adapter 700, when embodiments of removal tool or key 1100 are placed in position for selectively manipulating the plug release or release mechanism (e.g., resilient latch 210 or 312) of the plug 308 (or plug 208 of fiber optic cable 206) having an attached anti-tamper adapter 700. In that regard, the cavity 1122, acting in conjunction with relevant outer dimensions of anti-tamper adapter 700 body 712, can act as a guide for positioning removal tool or key 1100 to be placed in position for selectively manipulating the plug release or release mechanism (e.g., resilient latch 210 or 312) of the plug 308 (or plug 208 of fiber optic cable 206).

In still other aspects, as described above, various embodiments of removal tool or key 1100 can be comprised of a rigid or semi-rigid material, such as a moldable plastic or polymer, in addition to more rigid materials such as metals or ceramics. For example, a molded plastic removal tool or key 1100 can include one or more of a molded body 1112, a plug release arm 1114, and/or a plug release region 1116 of plug release arm 1114. In yet another aspect, plug release arm 1114 and/or plug release region 1116 of plug release arm 1114 can be formed separately from molded body 1112 and subsequently attached or integrated as desired. In a further aspect, the moldable plastic or polymer can be selected based on a color scheme according to an intended use of the removal tool or key 1100 (e.g., a standardized color scheme), for example, to signify mission critical service connections, etc.

In yet other aspects of the disclosed subject matter, due to the complementary structures of anti-tamper adapter 700 and removal tool or key 1100, complementary variations in the shapes of anti-tamper adapter 700 body 712, removal tool or key 1100 body 1112, and/or complementary variations in the access aperture 726 and plug release arm 1114 (and/or plug release region 1116 of plug release arm 1114), and the like, can be exploited to further effect cable tamper prevention or control schemes. For instance, a first complementary structure (e.g., level 1 or other designation) of anti-tamper adapter 700 and removal tool or key 1100 can be used for a first level of cable tamper prevention or control. In this instance, a level 1 removal tool or key 1100 can be, for example, generally issued to technicians having relatively low expertise, responsibility, and/or situational awareness for work on systems designated as level 1 and employing a level 1 anti-tamper adapter 700 having a complementary structure to a level 1 removal tool or key 1100.

As a further example, a second complementary structure (e.g., level 2 or other designation) of anti-tamper adapter 700 and removal tool or key 1100 can be used for a second level of cable tamper prevention or control. At this level of control, a level 2 removal tool or key 1100 can be issued on a more restricted basis to technicians having relatively higher expertise (or supervisors having responsibility over critical systems, for example), responsibility, and/or situational awareness for work on systems designated as level 2 (e.g., mission critical service connections) and employing anti-tamper adapter 700 having a complementary structure to a level 2 removal tool or key 1100.

It can be understood that such variations in cable tamper prevention or control schemes are limitless as a result of the flexibility afforded by various non-limiting implementations as described herein. For instance, with minor variations in mold dimensions, such variations of complementary structure can be made possible, without undue expense that would be required for cable tamper prevention systems employing proprietary outlets and plugs. For example, consider the expense and inventory requirements for the exemplary two-level tamper prevention and control scheme using proprietary outlets and plugs. Moreover, with the ability to implement the various non-limiting embodiments as described herein on existing connections without having to cut and re-terminate cables, as well as the ability to remove and reuse various implementations of anti-tamper adapters 700, various implementations of the disclosed subject matter can avoid the tradeoff of having to dedicate cables using proprietary outlets and plugs or spend extra man-hours and expense to cut and re-terminate cables that change tamper prevention and control designation (e.g., level 1 to level 2, tamper prevention desired to not desired, etc.).

Figure 15:
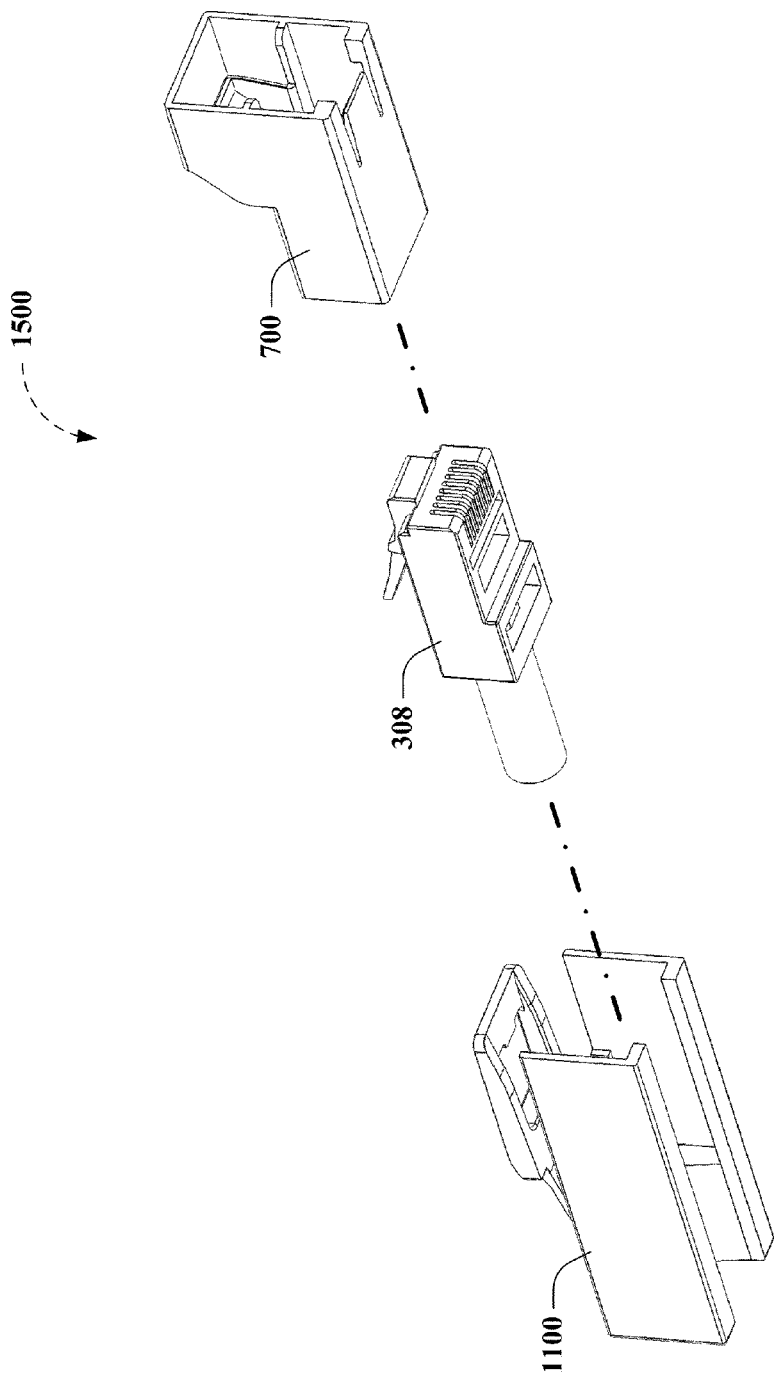
FIG. 15 illustrates an exploded view of an RJ-type plug and exemplary embodiments of an anti-tamper adapter and removal tool or key for disconnecting a connected RJ-type plug as described herein.

While FIGS. 7-10 and 11-14 describe various non-limiting implementations of anti-tamper adapters 700 and removal tool or key 1100, respectively, further aspects of the disclosed embodiments and details of operation are described with regard to FIGS. 15-22. For example, FIG. 15 illustrates an exploded view of an RJ-type plug (e.g., plug 308) and exemplary embodiments of an anti-tamper adapter 700 and removal tool or key 1100 for disconnecting the connected RJ-type plug (e.g., plug 308) as described herein. For instance, in an exemplary cable tamper prevention system, FIG. 15 depicts the relative positioning of exemplary components as described herein. Thus, an exemplary anti-tamper adapter 700 can be placed over plug 308 by inserting the front of plug 308 into the rear portion of anti-tamper adapter 700.

As previously described, anti-tamper adapter 700 can facilitate fixing (e.g., releasably, reversibly, or otherwise) the longitudinal position of the plug 308 within the channel of body 712 of the anti-tamper adapter 700. The fixed longitudinal position allows the front of plug 308 to extend from the front portion of anti-tamper adapter 700 to allow plug 308 (e.g., a standard communications plug such as a fiber optic plug, and RJ type plug, or communications cable plug, audio plug, video plug, etc.) to be attached to an associated outlet (e.g., outlet 302 or 202 for fiber optic cable 206, etc.). According to various embodiments, until such time as it is desired to remove plug 308 from outlet 302, the anti-tamper adapter 700 can inhibit or prevent access and/or inhibit or prevent actuation of the plug release or release mechanism (e.g., resilient latch 210 or 312) of the plug 308 (or plug 208 of fiber optic cable 206) when the plug 308 is inserted into the associated outlet (e.g., outlet 202 or 302).

According to further embodiments, when it is desired to remove plug 308 from outlet 302, the anti-tamper adapter 700 can permit access to removal tool or key 1100 to permit selective manipulation or actuation of the plug release or release mechanism (e.g., resilient latch 210 or 312) of the plug 308 (or plug 208 of fiber optic cable 206) when the plug 308 is inserted into the associated outlet (e.g., outlet 202 or 302). As can be seen in FIG. 15, various non-limiting implementations of the removal tool or key 1100 can be positioned on anti-tamper adapter 700 from the rear of anti-tamper adapter 700.

Thus, access aperture (e.g., 726 of front and rear end views 708 and 710, respectively) between the housing 724 and the plug release guard or release shroud 722 of exemplary anti-tamper adapter 700 can permit removal tool or key 1100 to be positioned proximate to the plug release or release mechanism (e.g., resilient latch 210 or 312) of the plug 308 (or plug 208 of fiber optic cable 206), when the removal tool (described below) is inserted into the cable anti-tamper adapter 700. Accordingly, in various non-limiting embodiments of removal tool or key 1100, plug release arm 1114 can permit a plug release region 1116 of plug release arm 1114 to selectively manipulate the plug release or release mechanism (e.g., resilient latch 210 or 312) of the plug 308 (or plug 208 of fiber optic cable 206) when the plug release arm 1114 is manipulated in a direction orthogonal to the direction of normal insertion of plug 308 as described above.

Figure 16:
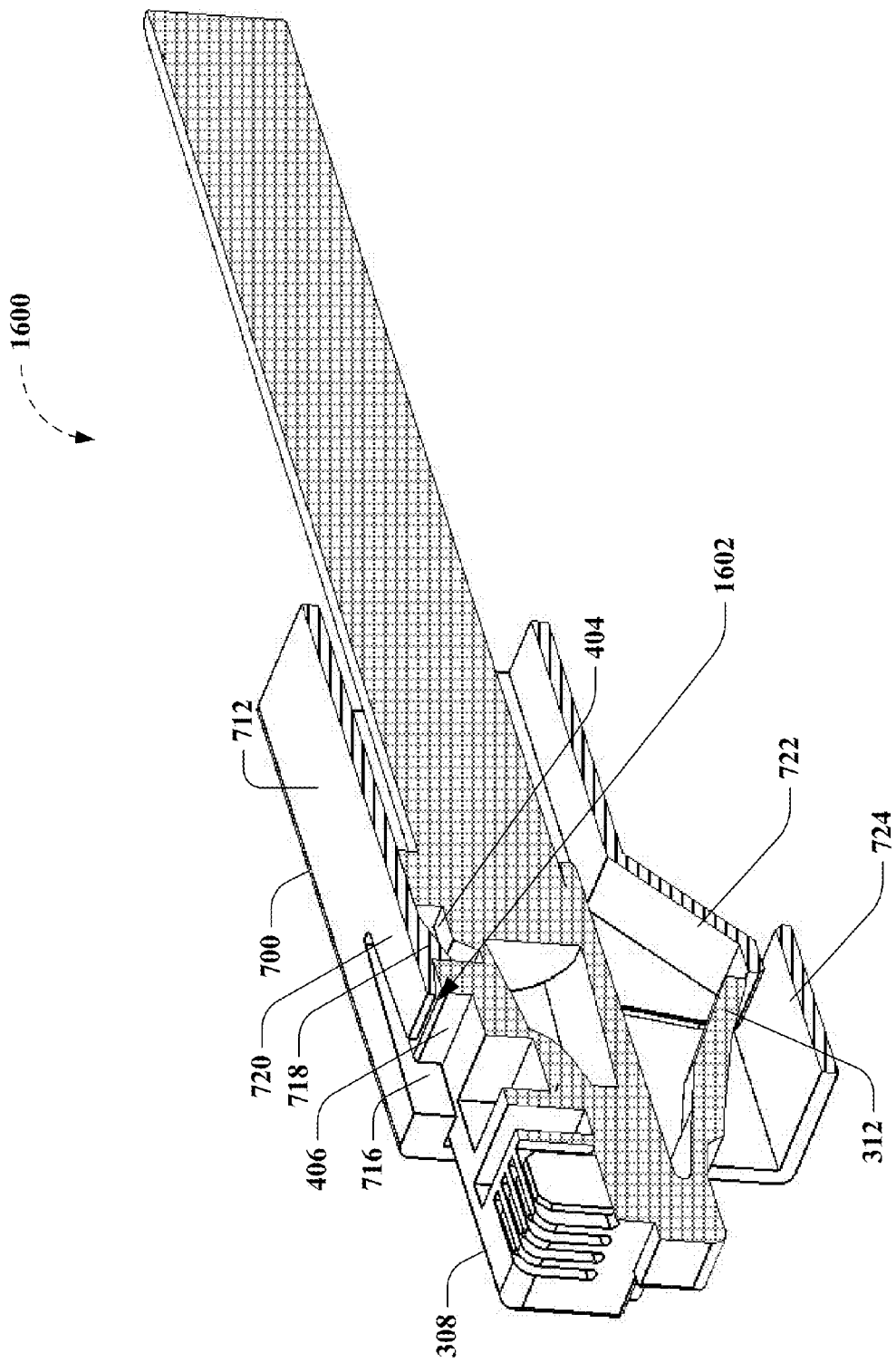
FIG. 16 illustrates a cross-sectional perspective view of an RJ-type plug depicting various aspects of an installed anti-tamper adapter.

FIG. 16 illustrates a cross-sectional perspective view 1600 of an RJ-type plug (e.g., plug 308) depicting various aspects of an installed embodiment of anti-tamper adapter 700. As described above, shoulder(s) or protrusion(s) 716 can extend into the channel located proximate the front portion of the channel (e.g., the portion of the body 712 opposite the rear portion). The one or more shoulder(s) or protrusion(s) 716 can limit plug 308 travel in the direction coincident with the direction of normal insertion. For instance, shoulders or protrusion(s) 716 can engage shoulder 406 of plug 308 as plug 308 is inserted into body 712 of exemplary anti-tamper adapter 700. Thus, the one or more shoulder(s) or protrusion (s) 716 in the channel can limit the maximum travel of plug 308 into body 712 in the direction of normal insertion (e.g., in a direction toward the front of the plug 308).

As further described above, body 712 of exemplary anti-tamper adapter 700 can comprise one or more resilient catches or protrusion(s) 718 in the channel that can reversibly engage one or more recesses 404 in plug 308. Accordingly, resilient catches or protrusion(s) 718 can limit plug 308 travel within the body 712 at least in the direction opposite the direction of normal insertion. As a result, the one or more resilient catches or protrusion(s) 718, in conjunction with the one or more recesses 404 of plug 308, can reversibly or releasably lock or fix the plug 308 into a predetermined position (e.g., in a predetermined longitudinal position) in the exemplary anti-tamper adapter 700.

Thus, in cooperation with the one or more shoulder(s) or protrusion(s) 716, or standing alone with the one or more recesses 404 of plug 308, the one or more resilient catches or protrusion(s) 718 can reversibly or releasably lock or fix the plug 308 into a predetermined position (e.g., a predetermined longitudinal position) in the exemplary anti-tamper adapter 700. For instance, it can be noted from FIG. 16 that, without the use of the one or more shoulder(s) or protrusion(s) 716, it can be possible to slide the exemplary anti-tamper adapter 700 in a direction toward the rear of plug 308 if only relying on the ramped profile of the one or more resilient catches or protrusion(s) 718.

Thus, it can be understood that for embodiments without the one or more shoulder(s) or protrusion(s) 716, further non-limiting embodiments of anti-tamper adapter 700 can comprise alternative profiles (e.g., non-ramped) of the one or more resilient catches or protrusion(s) 718 to reversibly or releasably lock or fix the plug 308 into a predetermined position (e.g., a predetermined longitudinal position) in the exemplary anti-tamper adapter 700. Additionally, or alternatively, as described above, implementations of anti-tamper adapter 700 can employ other mechanisms for locking or fixing the plug 308 into a predetermined position (e.g., a predetermined longitudinal position) in the anti-tamper adapter 700 (e.g., reversibly, releasably, or otherwise) as contemplated by the disclosed subject matter.

In further non-limiting implementations, as described above, for various permanent, semi-permanent, or disposable embodiments of anti-tamper adapter 700, catches or protrusion(s) 718 can be formed in a manner giving the catches or protrusion(s) 718 less resilience. In such exemplary non-limiting embodiments, it can be appreciated that attempts to remove plug 308 from anti-tamper adapter 700 can result in potentially irretrievable damage to one or more of the plug 308 or the anti-tamper adapter 700.

In addition, as further described above, the anti-tamper adapter can be removed and reused due, in part, to the reversible or releasable manner of locking or fixing to the existing plug 308. For example, once it is determined that tamper prevention via anti-tamper adapter 700 is no longer desired, the exemplary anti-tamper adapter 700 can be unlocked and removed from plug 308 leaving the plug 308 in its original unaltered condition. As a further example, by manipulating the one or more resilient catches or protrusion(s) 718 out of the one or more recesses 404 of plug 308, the plug 308 can be moved from its predetermined position in the anti-tamper adapter 700, and the plug 308 can be removed from the anti-tamper adapter 700 in the opposite direction from which it was inserted into body 712 (e.g., the direction opposite the direction of normal plug 308 insertion).

For instance, it can be noted from FIG. 16, that the crevice formed at 1602 between exemplary anti-tamper adapter 700 and plug 308 can accept a screwdriver, a shim, or other prying or wedging device. By prying or wedging at location 1602, the one or more resilient catches or protrusion(s) 718 can be lifted out of the one or more recesses 404 of plug 308, thereby allowing removal of the exemplary anti-tamper adapter 700 (e.g., moving exemplary anti-tamper adapter 700 in a direction toward the front of plug 308). Preferably, various embodiments of the disclosed subject matter can facilitate disconnecting the plug 308 from the outlet 302 so as to provide access to the front of plug 308 and anti-tamper adapter 700 before allowing the above described manipulation (e.g., without destroying or otherwise rendering useless the anti-tamper adapter 700) of the one or more resilient catches or protrusion(s) 718.

FIG. 16 further depicts relative locations of plug release guard or release shroud 722, housing 724, and resilient latch 312 for an exemplary anti-tamper adapter 700. For instance, although depicted in a cross-sectional perspective view, it can be noted from FIG. 16 that the plug release guard or release shroud 722 can at least partially surround the plug release or release mechanism (e.g., resilient latch 210 or 312) of the plug 308. Accordingly, plug release guard or release shroud 722 can inhibit or prevent access and/or inhibit or prevent actuation of the plug release or release mechanism (e.g., resilient latch 210 or 312) of the plug 308 (or plug 208 of fiber optic cable 206) when the plug 308 is inserted into the associated outlet (e.g., outlet 202 or 302), by, for example, the close proximity of the plug release guard or release shroud 722 (or housing 724 as further described below) to the surface of a panel (204 or 304) supporting the plug 308 attached outlet (e.g., outlet 202 or 302). As can be seen, this close proximity can prevent normal access (e.g., without a tool or key as described herein) to one or more sides of the plug release or release mechanism (e.g., resilient latch 210 or 312) of the plug 308 (or plug 208 of fiber optic cable 206).

In addition, it can be seen in FIG. 16 that housing 724 can inhibit or prevent access and/or inhibit or prevent actuation of the plug release or release mechanism (e.g., resilient latch 210 or 312) of the plug 308 (or plug 208 of fiber optic cable 206) when the plug 308 is inserted into the associated outlet (e.g., outlet 202 or 302). For instance, the housing 724 can be positioned relative to the plug release guard or release shroud 722, such that it at least partially surrounds the plug release guard or release shroud 722. Moreover, the housing 724 can further shroud the plug release or release mechanism (e.g., resilient latch 210 or 312) to prevent actuation (e.g., prevent normal actuation) of the release mechanism when the plug 308 (e.g., a standard communications plug such as a fiber optic plug, and RJ type plug, or communications cable plug, audio plug, video plug, etc.) is attached to an associated outlet (e.g., outlet 302 or 202 for fiber optic cable 206, etc.).

In FIG. 16, it is further apparent that housing 724 can be located relative to plug release guard or release shroud 722, so as to comprise an access aperture (e.g., 726 of front and rear end views 708 and 710, respectively) between the housing 724 and the plug release guard or release shroud 722. Thus, the access aperture can permit an exemplary removal tool or key 1100 to be positioned proximate to the plug release or release mechanism (e.g., resilient latch 210 or 312) of the plug 308 (or plug 208 of fiber optic cable 206), when exemplary removal tool or key 1100 is inserted into the cable anti-tamper adapter 700. As described above, other arrangements or access apertures suitable for permitting a removal tool or key to be positioned proximate to the plug release or release mechanism (e.g., resilient latch 210 or 312) of the plug 308 can be contemplated, for example, regarding FIGS. 23-24 below.

Figure 17:
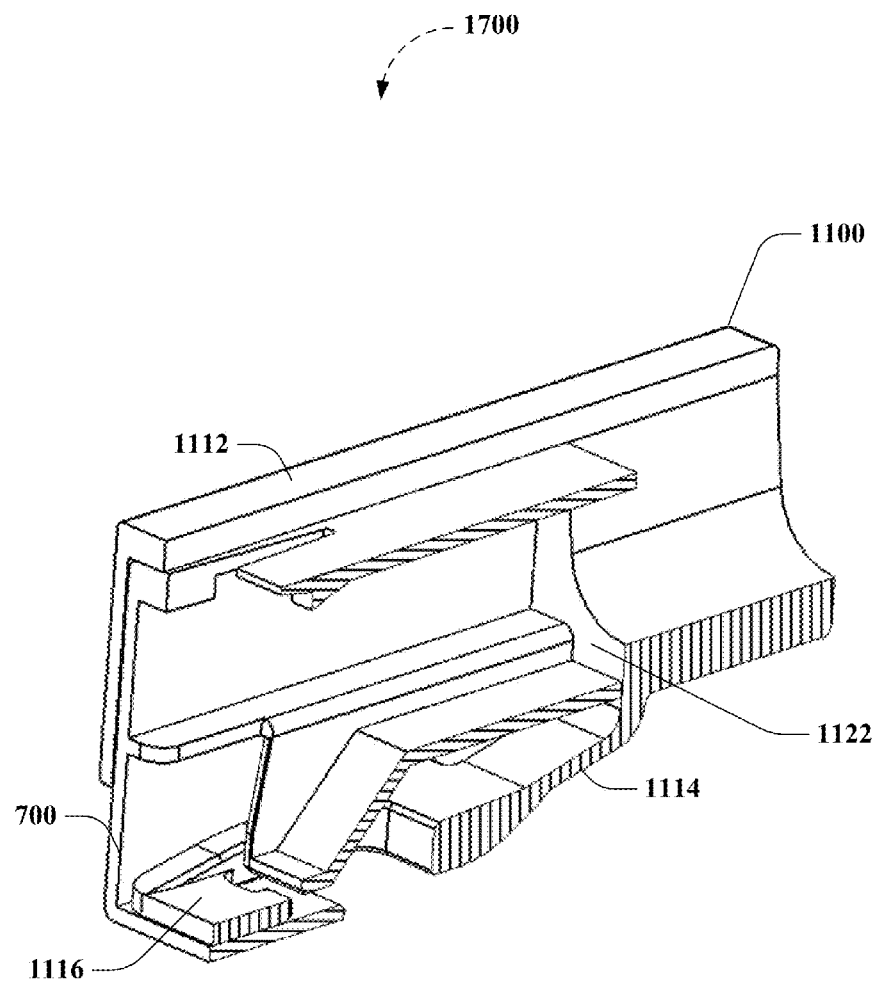
FIG. 17 depicts a cross-sectional perspective view of a disclosed anti-tamper adapter illustrating various aspects of a non-limiting removal tool or key for disconnecting a connected RJ-type plug employing the disclosed anti-tamper adapter.

FIG. 17 depicts a cross-sectional perspective view 1700 of a disclosed anti-tamper adapter 700 illustrating various aspects of a non-limiting removal tool or key 1100 for disconnecting a connected RJ-type plug (e.g., plug 308) employing the disclosed anti-tamper adapter 700. In FIG. 17, it can be seen how various non-limiting implementations of removal tool or key 1100 comprising a body 1112 can comprise a cavity 1122 that can accept exemplary embodiments of anti-tamper adapter 700. Thus, FIG. 17 depicts cavity 1122 as sized appropriately (e.g., larger than the relevant outer dimensions of anti-tamper adapter 700 body 712) to receive body 712 of anti-tamper adapter 700, when embodiments of removal tool or key 1100 are placed in position for selectively manipulating the plug release or release mechanism (e.g., resilient latch 210 or 312) of the plug 308 (or plug 208 of fiber optic cable 206) having an attached anti-tamper adapter 700.

In that regard, the cavity 1122, acting in conjunction with relevant outer dimensions of anti-tamper adapter 700 body 712, can act as a guide for positioning removal tool or key 1100 when it is to be placed in position for selectively manipulating the plug release or release mechanism (e.g., resilient latch 210 or 312) of the plug 308. Also note from relative positioning depicted in FIG. 17 that plug release arm 1114 can permit a plug release region 1116 of plug release arm 1114 to selectively manipulate the plug release or release mechanism (e.g., resilient latch 210 or 312) of the plug 308 (or plug 208 of fiber optic cable 206) when the plug release arm 1114 is manipulated in a direction orthogonal to the direction of normal insertion of plug 308 as described above.

Figure 18:
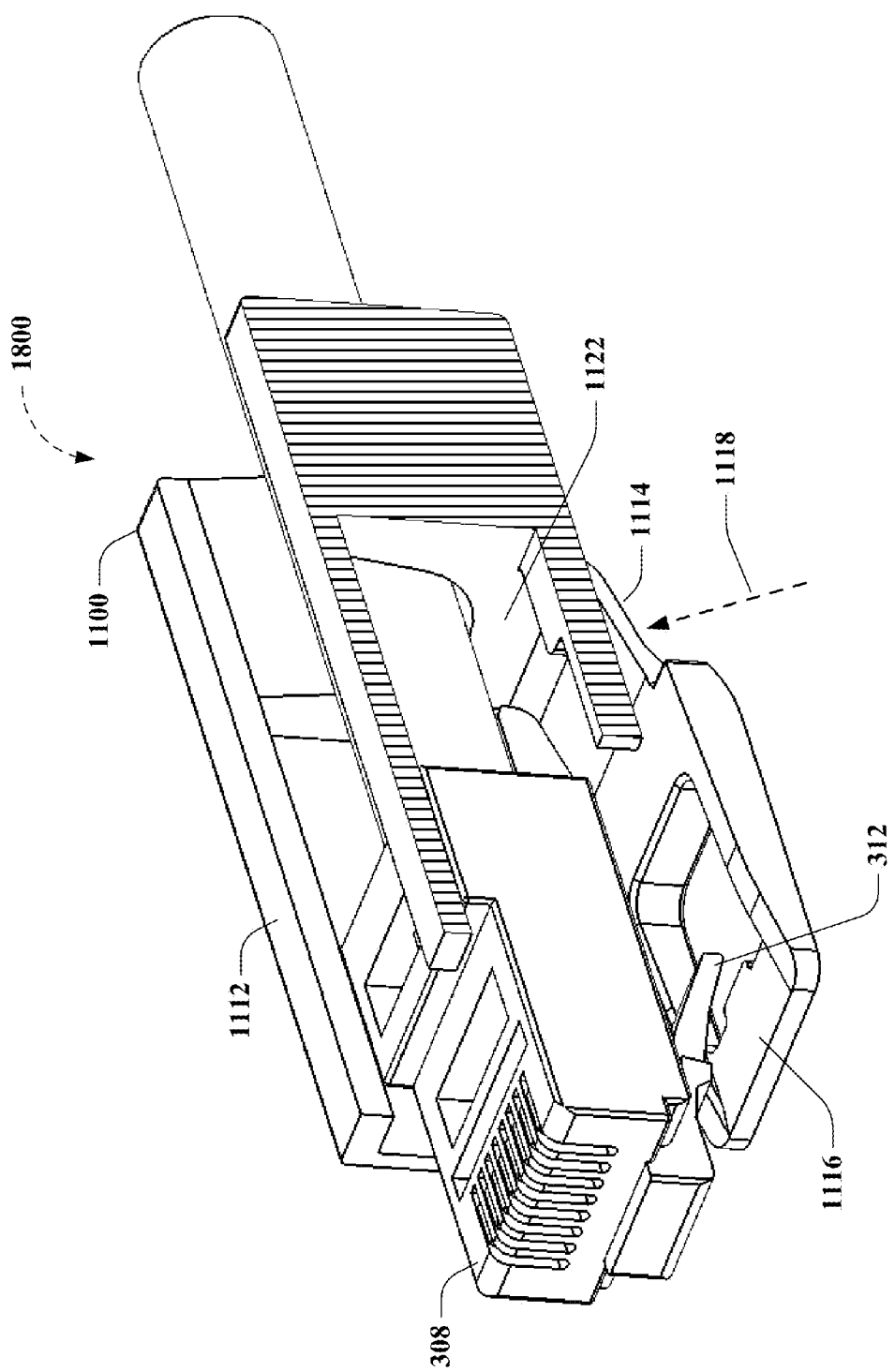
FIG. 18 depicts a cross-sectional perspective view of a non-limiting removal tool or key for disconnecting a connected RJ-type plug employing an exemplary anti-tamper adapter as described herein, where the anti-tamper adapter is omitted for clarity.

For instance, FIG. 18 depicts a cross-sectional perspective view 1800 of a non-limiting removal tool or key 1100 for disconnecting a connected RJ-type plug (e.g., plug 308) employing an exemplary anti-tamper adapter 700 as described herein, where the anti-tamper adapter is omitted for clarity. Note from FIG. 18 that application of a force in the direction indicated by 1118 (e.g., a direction orthogonal to the direction of normal insertion of plug 308) would cause plug release region 1116 of plug release arm 1114 to move upward toward body 1112, engaging and selectively manipulating the plug release or release mechanism (e.g., resilient latch 210 or 312) of the plug 308.

Figure 19:
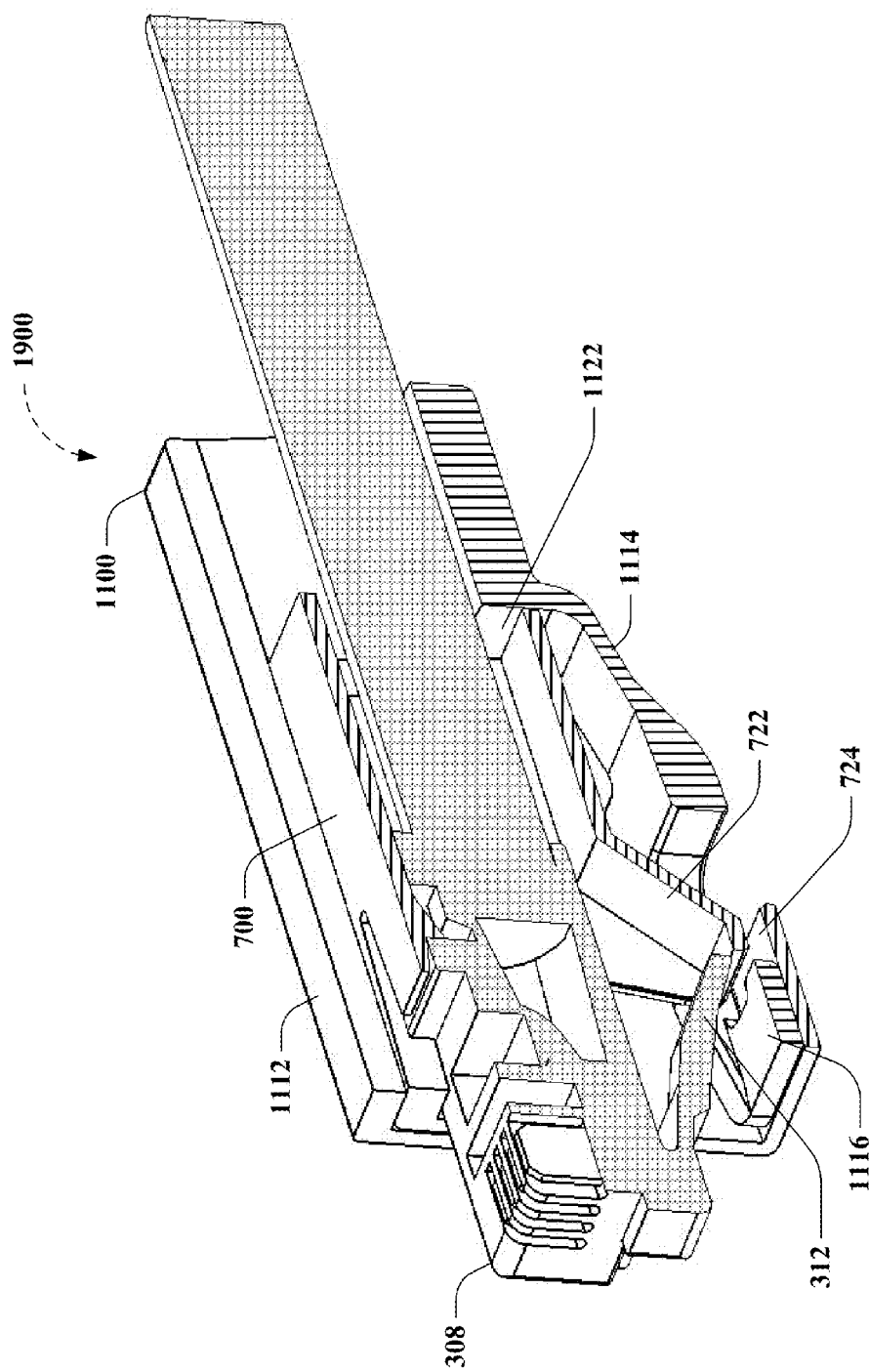
FIG. 19 illustrates a cross-sectional perspective view of an RJ-type plug depicting various aspects of an exemplary anti-tamper adapter and removal tool or key for disconnecting a connected RJ-type plug employing the anti-tamper adapter.
Figure 20:
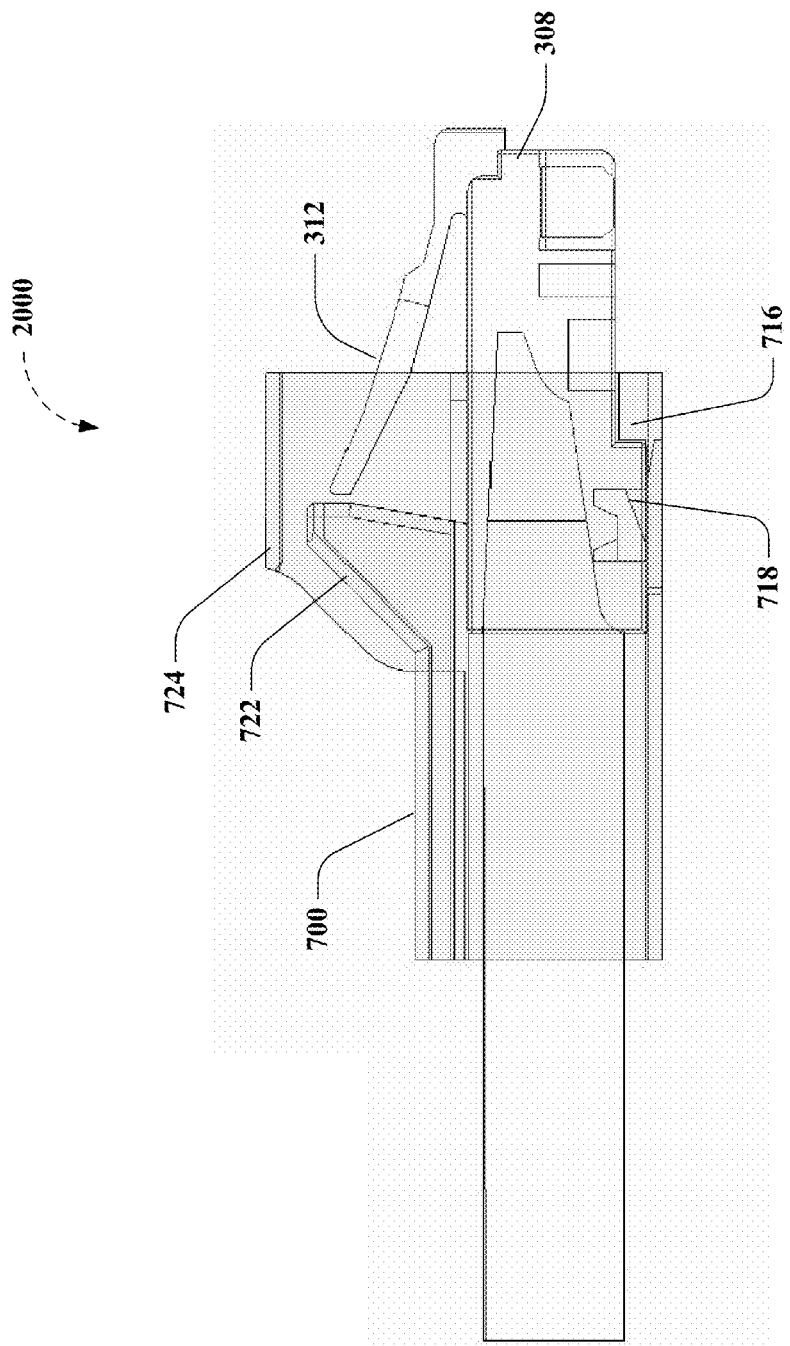
FIGS. 20-21 illustrate further aspects of an RJ-type plug and an exemplary anti-tamper adapter as described herein.
Figure 21:
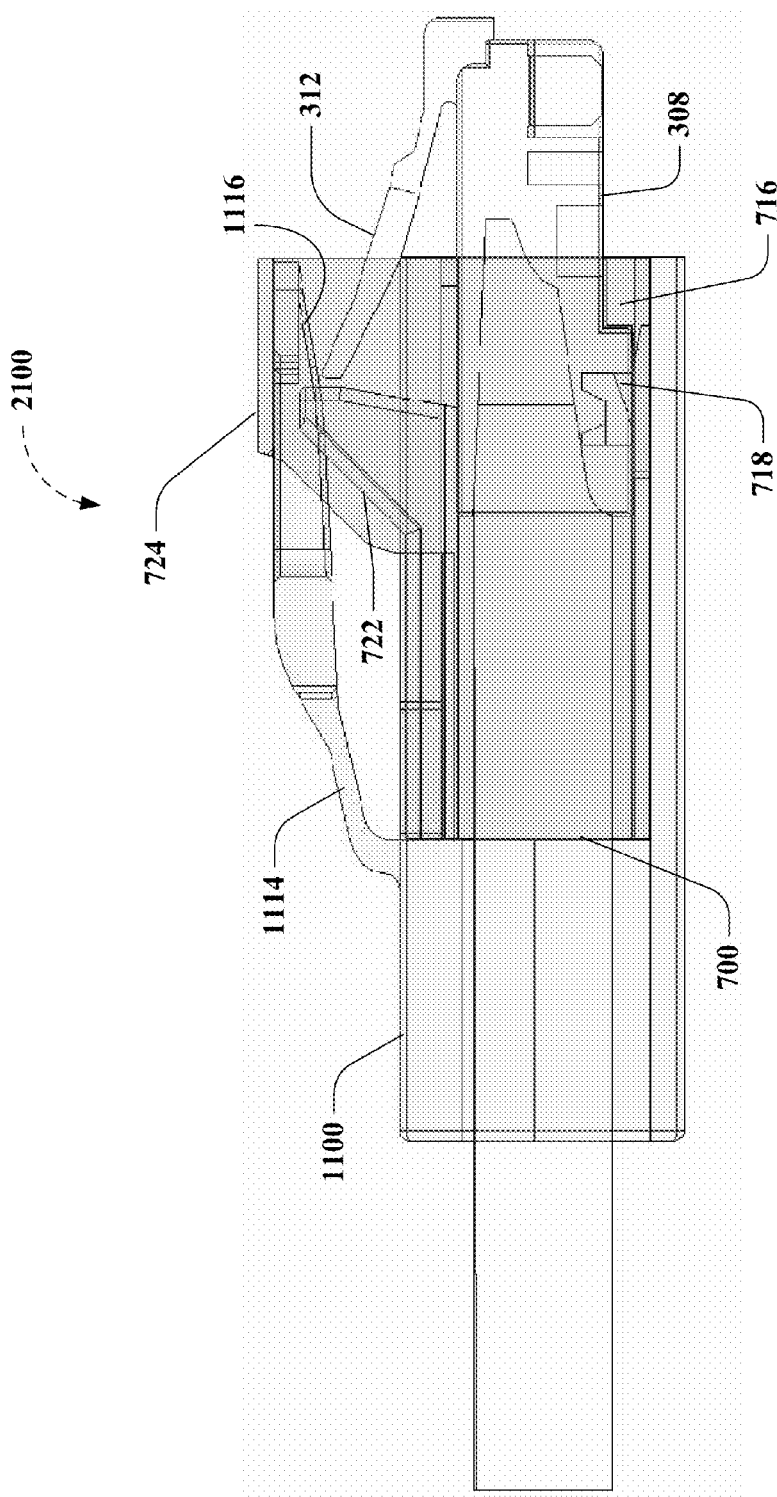
Figure 22:
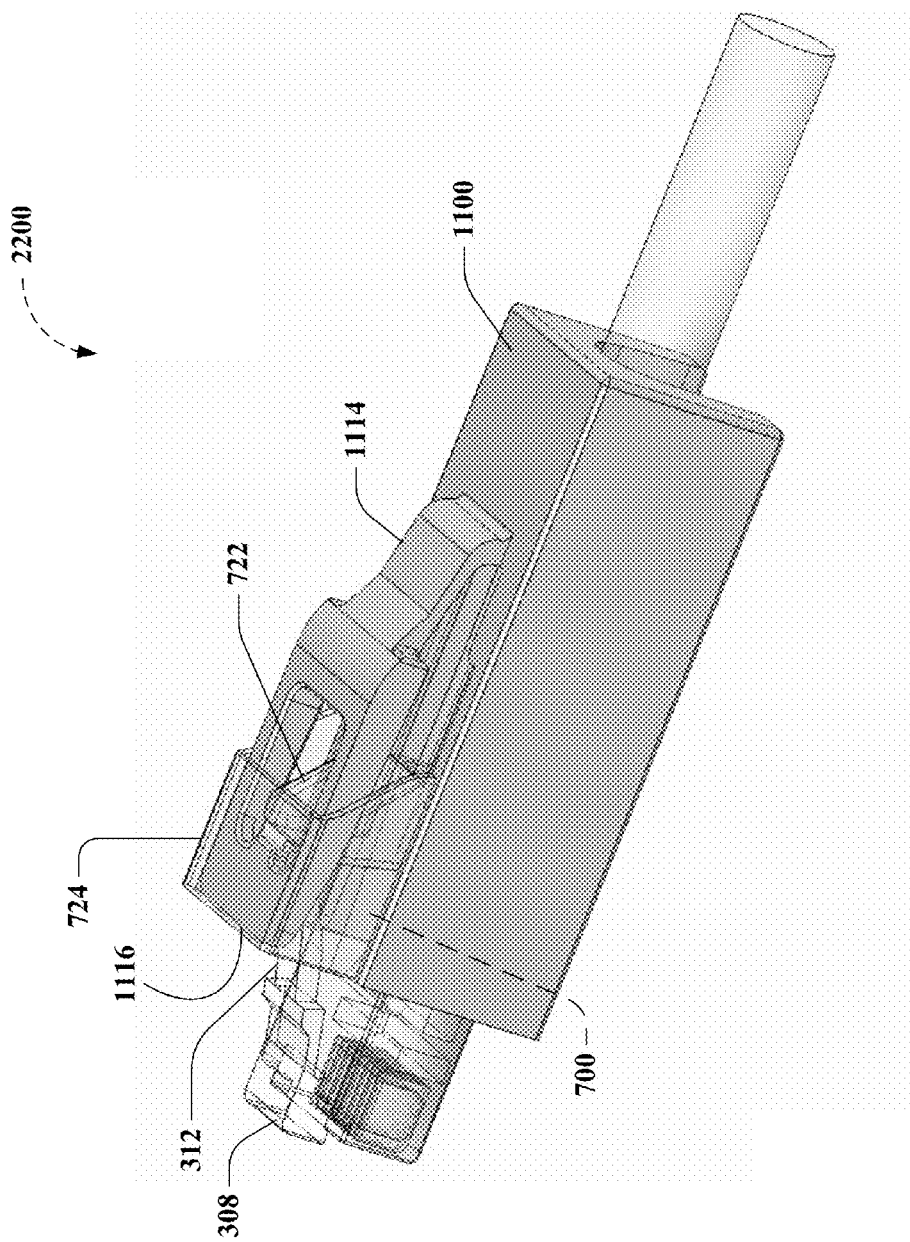
FIG. 22 depicts still further aspects of an RJ-type plug, an exemplary anti-tamper adapter, and removal tool or key for disconnecting a connected RJ-type plug employing the anti-tamper adapter.

As a further example, FIG. 19 illustrates a cross-sectional perspective view 1900 of an RJ-type plug (e.g., plug 308) depicting various aspects of an exemplary anti-tamper adapter 700 and removal tool or key 1100 for disconnecting a connected RJ-type plug (e.g., plug 308) employing the exemplary anti-tamper adapter 700. In addition, FIGS. 20-21 illustrate further aspects of an RJ-type plug (e.g., plug 308) and an exemplary anti-tamper adapter 700 as described herein, in which FIG. 21 depicts exemplary removal tool or key 1100 (omitted in FIG. 20) for disconnecting a connected RJ-type plug (e.g., plug 308) employing the exemplary anti-tamper adapter 700. FIG. 22 depicts still further aspects of an RJ-type plug (e.g., plug 308), an exemplary anti-tamper adapter 700, and an exemplary removal tool or key 1100 for disconnecting a connected RJ-type plug employing the anti-tamper adapter 700.

Figure 23:
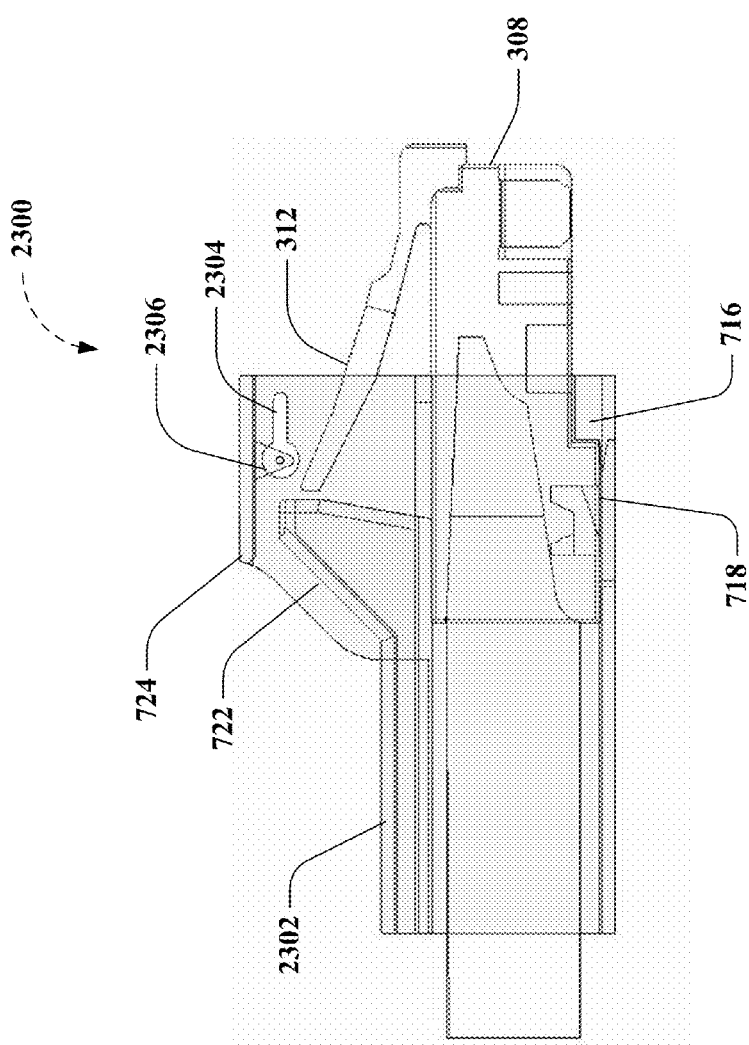
FIG. 23 illustrates further aspects of an exemplary removal tool or key for disconnecting a connected RJ-type plug employing further non-limiting embodiments of the disclosed anti-tamper adapter.

FIG. 23 illustrates further aspects of an exemplary key or tool for disconnecting a connected RJ-type plug (e.g., plug 308) employing further non-limiting embodiments of the disclosed anti-tamper adapter 2302. For example, anti-tamper adapter 2302 can be comprised of essentially the same components as described above. For instance, exemplary anti-tamper adapter 2302 can comprise one or more shoulder(s) or protrusion(s) 716, one or more resilient catches or protrusion(s) 718 that can reversibly engage one or more recesses 404 (not shown) in plug 308, a plug release guard or release shroud 722 that can at least partially surround a plug release or release mechanism (not shown), e.g., resilient latch 210 or 312, of the plug 308, and housing 724 that can perform similar functions as previously described.

In addition, or alternatively, exemplary anti-tamper adapter 2302 can further comprise an access aperture (e.g., keyhole 2304) on a side (e.g., right side) of housing 724 and/or the plug release guard or release shroud 722 that can permit a removal tool or key to be positioned proximate to the plug release or release mechanism (e.g., resilient latch 210 or 312) of the plug 308 (or plug 208 of fiber optic cable 206), when the removal tool or key is inserted into the cable anti-tamper adapter 2302.

For instance, in FIG. 23, exemplary anti-tamper adapter 2302 is depicted comprising keyhole 2304 on the side of housing 724. In various embodiments, keyhole 2304 can permit an appropriately shaped removal tool or key (not shown) to be positioned from the side of housing 724 and proximate to the plug release or release mechanism (e.g., resilient latch 210 or 312) of the plug 308 (or plug 208 of fiber optic cable 206), when the removal tool or key is inserted into the cable anti-tamper adapter 2302.

As further example, the removal tool or key, when inserted into keyhole 2304 can engage a support structure 2306 (e.g., such as a key landing). According to further aspects, support structure 2306 can provide support (e.g., rotational support, leverage, stability, alignment, etc.) for the end of the removal tool or key. Thus, the removal tool or key can be manipulated in a direction to cause the removal tool or key to engage and selectively manipulate or actuate the plug release or release mechanism (e.g., resilient latch 210 or 312) of the plug 308 (or plug 208 of fiber optic cable 206) having an attached anti-tamper adapter 2302. For example, when an appropriately shaped removal tool or key is inserted into keyhole 2304 and rotated clockwise, the removal tool or key can engage and selectively manipulate or actuate the plug release or release mechanism (e.g., resilient latch 210 or 312) of the plug 308 (or plug 208 of fiber optic cable 206) having an attached anti-tamper adapter 2302.

Figure 24:
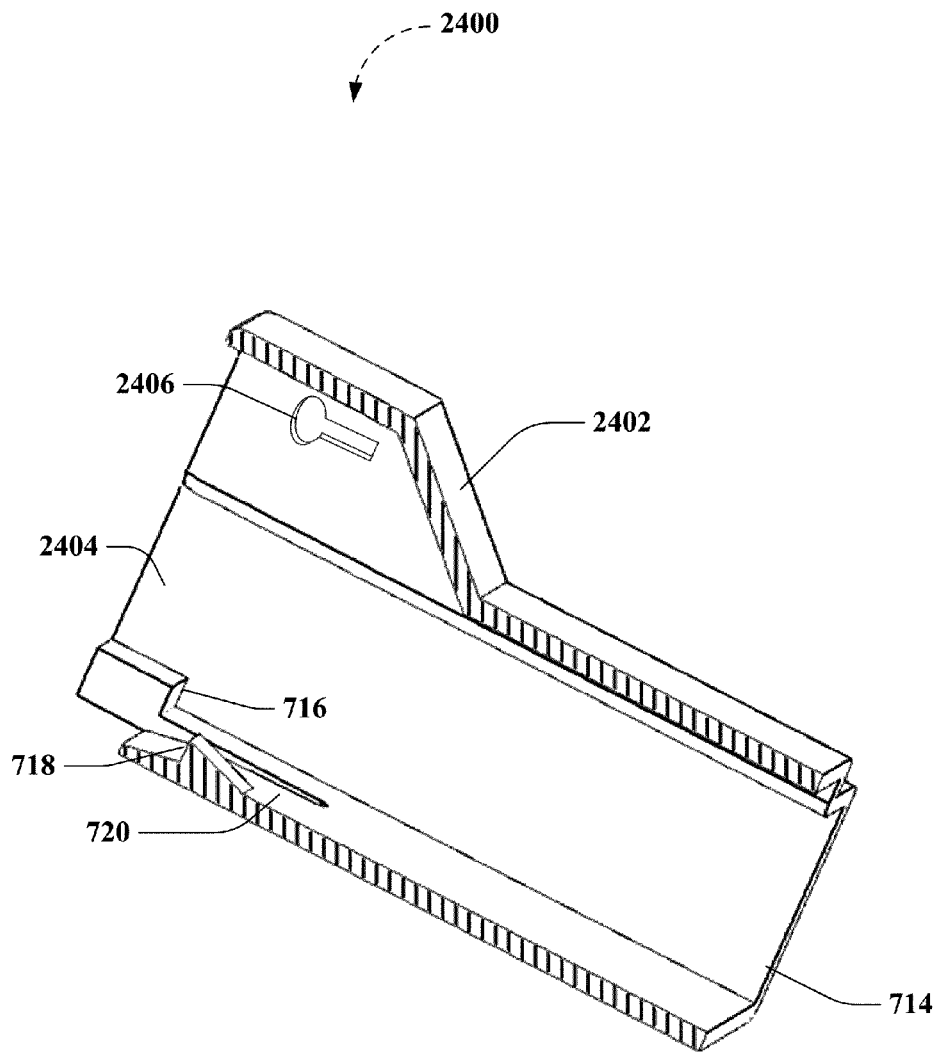
FIG. 24 illustrates additional aspects of an exemplary removal tool or key for disconnecting a connected RJ-type plug and further non-limiting embodiments of an anti-tamper adapter as described herein.

FIG. 24 illustrates additional aspects of an exemplary key or tool for disconnecting a connected RJ-type plug (e.g., plug 308) and further non-limiting embodiments of an anti-tamper adapter 2400 as described herein. For example, anti-tamper adapter 2400 can be comprised of some essentially similar components as described above. For instance, exemplary anti-tamper adapter 2302 can comprise one or more shoulder(s) or protrusion(s) 716, one or more resilient catches or protrusion(s) 718 that can reversibly engage one or more recesses 404 in plug 308 (not shown), etc. However, note from FIG. 24 that exemplary anti-tamper adapter 2400 lacks a housing 724 as previously described. Instead, plug release guard or release shroud 2402 can be extended toward the front portion of the channel in body 2404.

Thus, as compared to anti-tamper adapter 700 having a plug release guard or release shroud 722 that can at least partially surround a plug release or release mechanism (not shown), e.g., resilient latch 210 or 312, of the plug 308, plug release guard or release shroud 2402 of anti-tamper adapter 2400 surrounds substantially more of the plug release or release mechanism (not shown), e.g., resilient latch 210 or 312, of the plug 308. Note further from FIG. 24 that exemplary anti-tamper adapter 2400 can further comprise an access aperture (e.g., a keyhole 2406) on a side (e.g., right side) of the plug release guard or release shroud 2402 that can permit a removal tool or key to be positioned proximate to the plug release or release mechanism (e.g., resilient latch 210 or 312) of the plug 308 (or plug 208 of fiber optic cable 206), when the removal tool or key is inserted into the cable anti-tamper adapter 2400. In addition, while exemplary anti-tamper adapter 2400 can further comprise a support structure (not shown) similar to support structure 2306, such a support structure can be implemented in further non-limiting implementations of exemplary anti-tamper adapter 2400.

Figure 25:
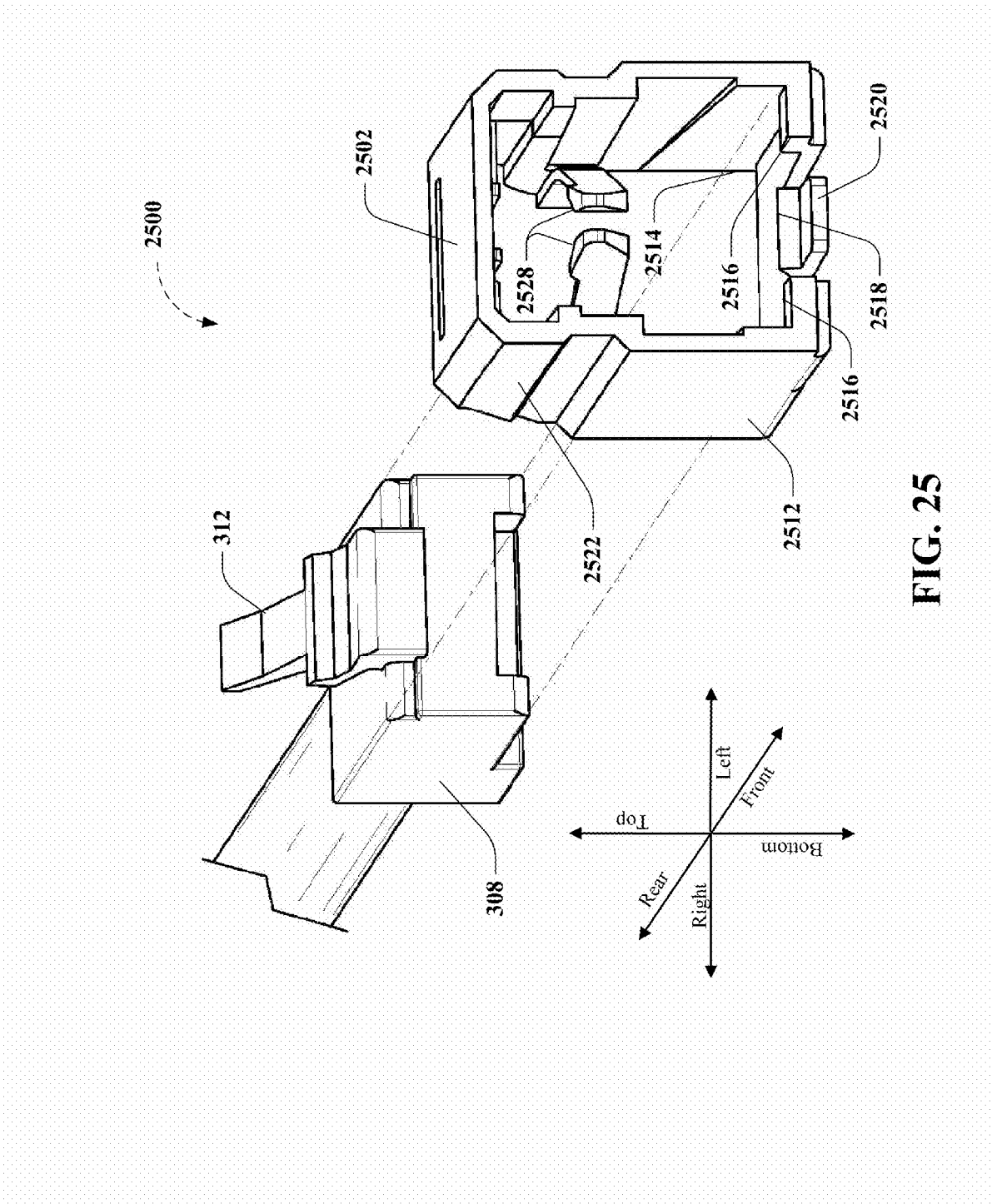
FIG. 25 depicts a perspective view of further non-limiting embodiments of an anti-tamper adapter suitable for use with RJ-type plugs as described herein.
Figure 26:
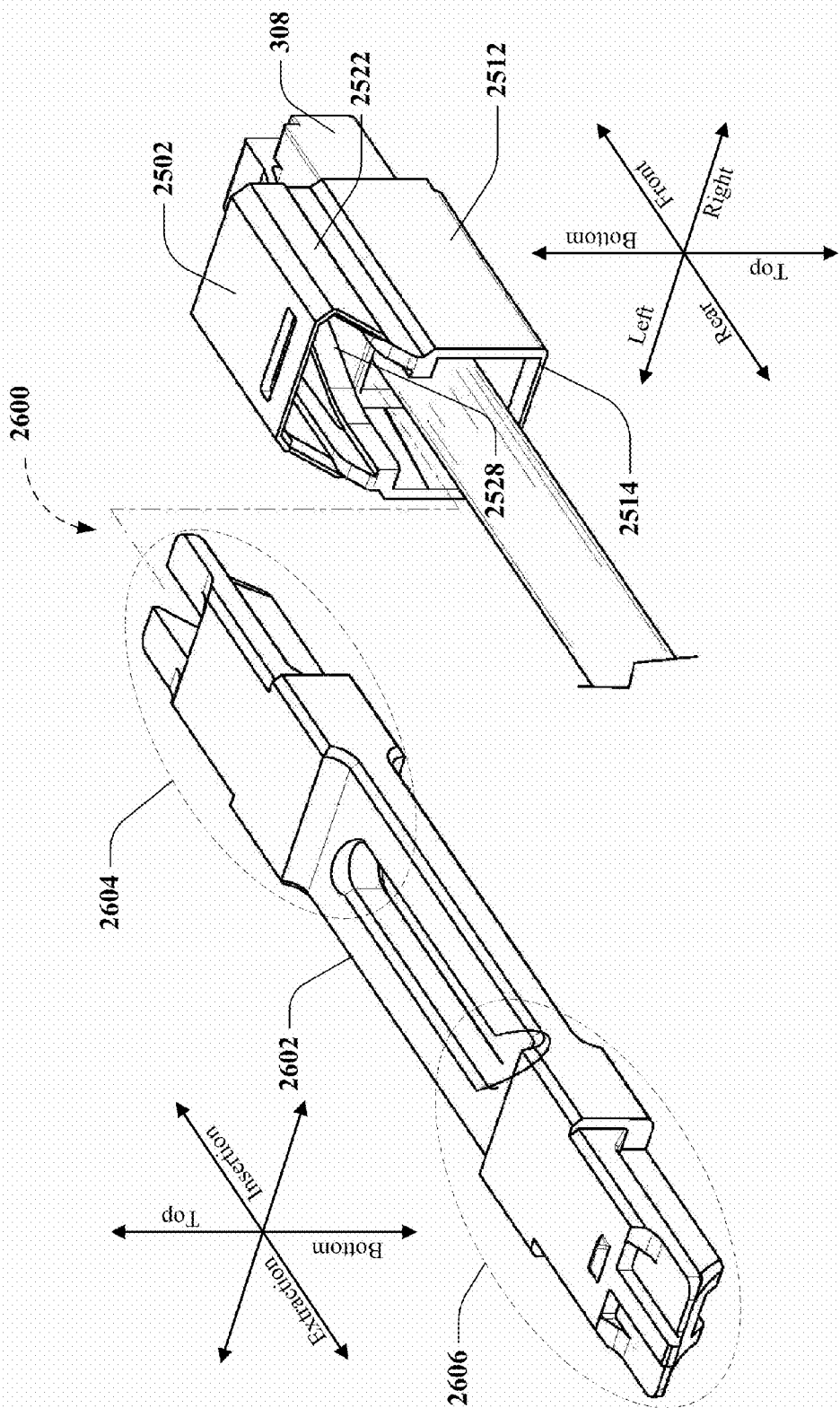
FIG. 26 depicts an exemplary anti-tamper adapter and a further non-limiting embodiment of a removal tool or key for connecting and disconnecting a connected RJ-type plug using exemplary embodiments of an anti-tamper adapter.

FIG. 25 depicts a perspective view 2500 of a further non-limiting embodiment of an anti-tamper adapter 2502 suitable for use with RJ-type plugs 308 (or suitably adapted dummy or blocking plugs) as described herein. FIG. 26 depicts an exemplary anti-tamper adapter 2502 and a further non-limiting embodiment of a removal tool or key 2602 for connecting and disconnecting a connected RJ-type plug 308 using exemplary embodiments of an anti-tamper adapter 2502 as described herein. For instance, FIG. 25 depicts a right front view of anti-tamper adapter 2502 and FIG. 26 depicts a right rear view of anti-tamper adapter 2502 according to the orientation as described with regard to FIGS. 4-6.

According to various embodiments, the disclosed subject matter provides an anti-tamper adapter 2502 comprising a body 2512 having a channel at least partially defined by a rear opening 2514 in the body 2512 (e.g., at the rear portion of the channel). The body 2512 can accept a plug 308 (e.g., a standardized communications plug, an existing plug, for example, that has been terminated, an RJ type plug, a fiber optics plug, other plug, dummy plug, or blocking plug, etc.). Note that the rear portion can be sized to allow the plug 308 to pass into the body 2512 in a direction coincident with a direction of normal insertion of the plug 308 into an associated outlet 302. For example, plug 308 is normally inserted from the front of plug 308 toward the outlet 302. In a similar direction (e.g., in a direction coincident with a direction of normal insertion), front of plug 308 can be inserted into body 2512 at the rear portion of the channel.

According to an aspect, body 2512 can comprise one or more shoulder(s) or protrusion(s) 2516 that can extend into the channel located proximate the front portion of the channel (e.g., the portion of the body 2512 opposite the rear portion). The one or more shoulder(s) or protrusion(s) 2516 can limit plug 308 travel in the direction coincident with the direction of normal insertion. For instance, shoulders 2516 can engage shoulder 406 of plug 308 as plug 308 is inserted into body 2512. Thus, the one or more shoulder(s) or protrusion(s) 2516 in the channel can limit the maximum travel of plug 308 into body 2512 in the direction of normal insertion.

In a further aspect, body 2512 can comprise one or more resilient catches or protrusion(s) 2518 in the channel that can reversibly engage one or more recesses 404 in plug 308. Accordingly, resilient catches or protrusion(s) 2518 can limit plug 308 travel within the body 2512 at least in the direction opposite the direction of normal insertion. For instance, as plug 308 is inserted into body 2512, resilient catches or protrusion(s) 2518 can extend outward from the channel, allowing one or more recesses 404 to be positioned under the resilient catches or protrusion(s) 2518. As the one or more recesses 404 pass under the one or more resilient catches or protrusion(s) 2518, the one or more resilient catches or protrusion(s) 2518 can at first spring away from the channel, and then can return to a resting position in the one or more recesses 404 of plug 308.

As a result, the one or more resilient catches or protrusion(s) 2518, in conjunction with the one or more recesses 404 of plug 308, can reversibly or releasably lock or fix the plug 308 into a predetermined position in the anti-tamper adapter 2502. Thus, in cooperation with the one or more shoulder(s) or protrusion(s) 2516, or standing alone with the one or more recesses 404 of plug 308, the one or more resilient catches or protrusion(s) 2518 can reversibly or releasably lock or fix the plug 308 into a predetermined position in the anti-tamper adapter 2502. Consequently, various embodiments can advantageously be retrofitted to existing plugs (e.g., plugs 308, 208, etc.) without requiring re-termination of existing patch cables.

As described above, various embodiments of the exemplary anti-tamper adapter 2502 can be removed and reused due, in part, to the reversible or releasable manner of locking or fixing to the existing plug 308. For instance, if it is determined that tamper prevention via anti-tamper adapter 2502 is no longer desired, the anti-tamper adapter 2502 can be unlocked and removed from plug 308 leaving the plug 308 in its original unaltered condition. As another example, by manipulating the one or more resilient catches or protrusion(s) 2518 out of the one or more recesses 404 of plug 308, the plug 308 can be moved from its predetermined position in the anti-tamper adapter 2502, and the plug 308 can be removed from the anti-tamper adapter 2502 in the opposite direction from which it was inserted into body 2512 (e.g., the direction opposite the direction of normal plug 308 insertion). Preferably, various embodiments of the disclosed subject matter can facilitate disconnecting the plug 308 from the outlet 302 so as to provide access to the front of plug 308 and anti-tamper adapter 2502 before allowing the above described manipulation (e.g., without destroying or otherwise rendering useless the anti-tamper adapter 2502) of the one or more resilient catches or protrusion(s) 2518.

Figure 29:
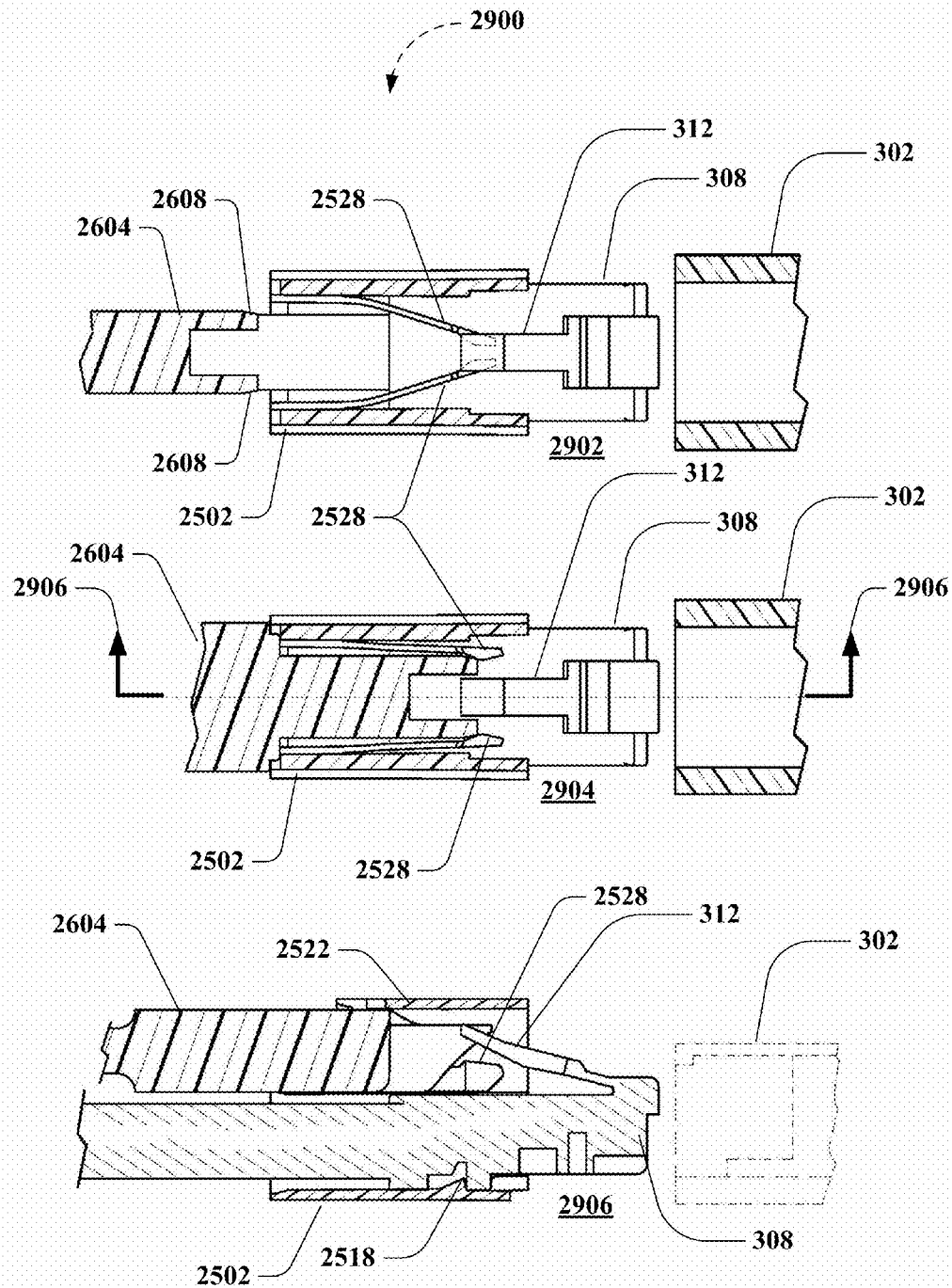
FIG. 29 depicts cross-sectional views for exemplary embodiments of an anti-tamper adapter suitable for use with RJ-type plugs, where the insertion end of the removal tool or key is illustrated at various positions with respect to aspects of an exemplary anti-tamper adapter.
Figure 32:
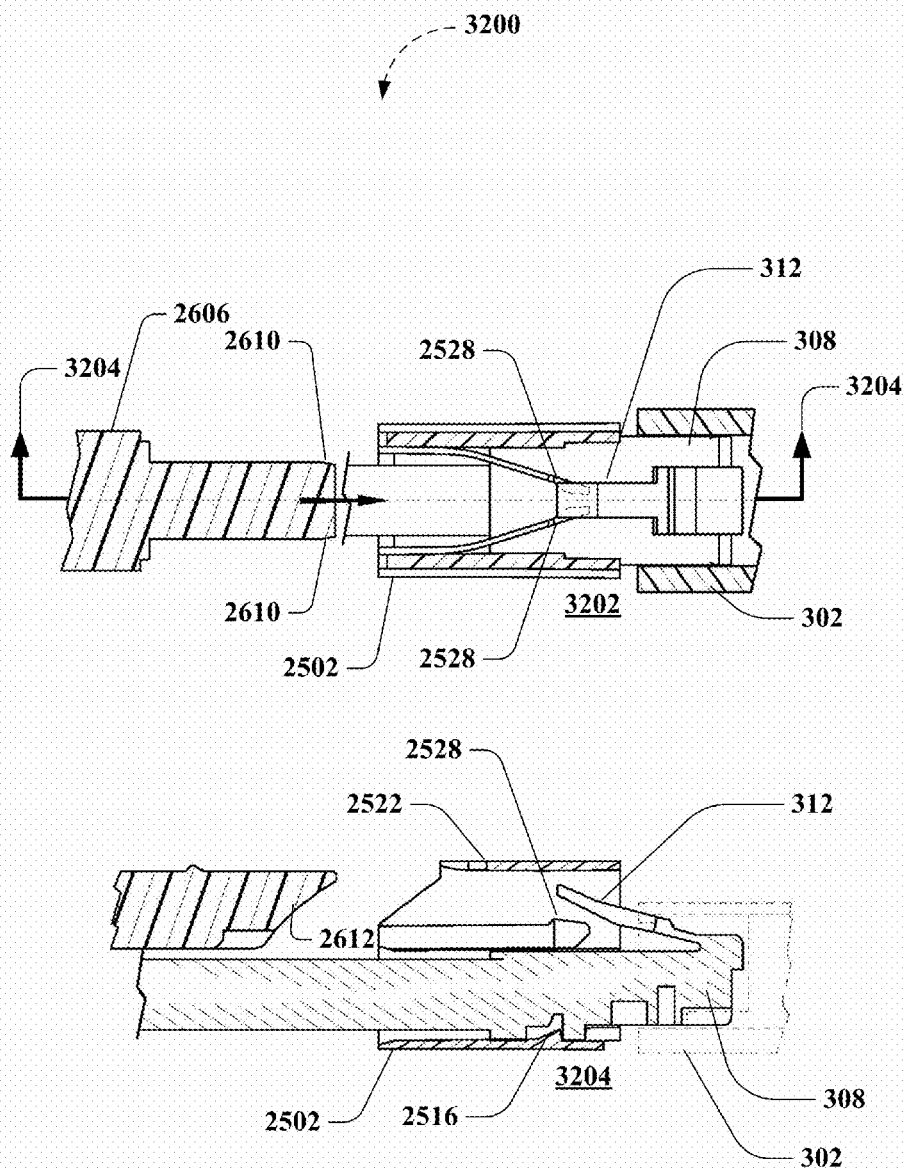
FIG. 32 depicts cross-sectional views for exemplary embodiments of an anti-tamper adapter suitable for use with RJ-type plugs, where the extraction end of the removal tool or key is illustrated at various positions with respect to aspects of an exemplary anti-tamper adapter fitted to an RJ-type plug and connected to an exemplary outlet.

As can be seen from FIGS. 25, 29 and 32, for example, the one or more resilient catches or protrusion(s) 2518 are depicted, for purposes of illustration and not limitation, as catches or protrusion(s) 2518, formed on a semi-rigid arm 2520 molded into body 2512, and extending into the channel. However, other mechanisms for reversibly or releasably locking or fixing the plug 308 into a predetermined position in the anti-tamper adapter 2502 are contemplated by the disclosed subject matter. For instance, various embodiments employing similar reversibly or releasably locking or fixing functions can include screws, spring ball and detent, and other means of reversibly or releasably locking or fixing plug 308 into a predetermined position in the anti-tamper adapter 2502.

In addition, for various permanent, semi-permanent, or disposable embodiments of anti-tamper adapter 2502, catches or protrusion(s) 2518 can be formed in a manner giving the catches or protrusion(s) 2518 less resilience (e.g., via rigid structures, adhesives, etc.). In such exemplary non-limiting embodiments, it can be appreciated that attempts to remove plug 308 from anti-tamper adapter 2502 can result in potentially irretrievable damage to one or more of the plug 308 or the anti-tamper adapter 2502. Thus, the various embodiments as described herein are intended to encompass a wide range of variations suitable for particular design considerations.

Referring again to FIG. 25, anti-tamper adapter 2502 can further comprise a plug release guard or release shroud 2522 located on the body 2512 (e.g., a molded body, etc.) proximate to the front portion of the channel. The plug release guard or release shroud 2522 can at least partially surround a plug release or release mechanism (not shown), e.g., resilient latch 210 or 312, of the plug 308. Thus, plug release guard or release shroud 2522 can inhibit or prevent access and/or inhibit or prevent actuation of the plug release or release mechanism (e.g., resilient latch 210 or 312) of the plug 308 (or plug 208 of fiber optic cable 206) when the plug 308 is inserted into the associated outlet (e.g., outlet 202 or 302), by for example, the close proximity of the plug release guard or release shroud 2522 to the surface of a panel (204 or 304) supporting the plug 308 attached outlet (e.g., outlet 202 or 302). This close proximity can prevent normal access (e.g., without a tool or key as described herein) to one or more sides of the plug release or release mechanism (e.g., resilient latch 210 or 312) of the plug 308 (or plug 208 of fiber optic cable 206).

Note from FIG. 25 that exemplary anti-tamper adapter 2502 lacks a housing such as housing 724 as previously described. Instead, plug release guard or release shroud 2522 can be extended toward the front portion of the channel in body 2512. Thus, as compared to anti-tamper adapter 700 having a plug release guard or release shroud 722 that can at least partially surround a plug release or release mechanism (not shown), e.g., resilient latch 210 or 312, of the plug 308, plug release guard or release shroud 2522 of anti-tamper adapter 2502 surrounds substantially more of the plug release or release mechanism (not shown), e.g., resilient latch 210 or 312, of the plug 308. Moreover, plug release guard or release shroud 2522 can be adapted to comprise an access aperture between the body 2512 and the plug release guard or release shroud 2522 that can permit a removal tool or key (described below) to be inserted and positioned proximate to the plug release or release mechanism (e.g., resilient latch 210 or 312) of the plug 308 (or plug 208 of fiber optic cable 206), when the removal tool (described below) is inserted into the cable anti-tamper adapter 2502. It can be understood that other arrangements or access apertures suitable for permitting a removal tool (described below) to be positioned proximate to the plug release or release mechanism (e.g., resilient latch 210 or 312) of the plug 308 can be contemplated upon consideration of the disclosed subject matter, for example, as described above.

As can be seen in FIG. 25, anti-tamper adapter 2502 can further comprise one or more blocking mechanism(s) 2528 (e.g., blocking arm(s) or blocking tab(s)) adapted to inhibit or prevent normal actuation (e.g., without a tool or key as described herein) of the plug release or release mechanism (e.g., resilient latch 210 or 312) of the plug 308 (or plug 208 of fiber optic cable 206). For instance, anti-tamper adapter 2502 can comprise one or more blocking mechanism(s) 2528 (e.g., blocking arm(s) or blocking tab(s)) located on one or more of plug release guard or release shroud 2522 and/or body 2512 (e.g., a molded body, etc.) proximate to the channel in body 2512. The position of the one or more blocking mechanism(s) 2528 (e.g., blocking arm(s) or blocking tab(s)) in relation to an inserted plug 308 can be determined such that upon insertion of plug 308 (or plug 208 of fiber optic cable 206) into an exemplary anti-tamper adapter 2502, the one or more blocking mechanism(s) 2528 (e.g., blocking arm(s) or blocking tab(s)) can provide an impediment to normal actuation (e.g., without a tool or key as described herein) of the plug release or release mechanism (e.g., resilient latch 210 or 312) of the plug 308.

For instance, by virtue of a close proximity between one or more blocking mechanism(s) 2528 (e.g., blocking arm(s) or blocking tab(s)), the plug release or release mechanism (e.g., resilient latch 210 or 312) of the plug 308, and plug body 402 of plug 308, the one or more blocking mechanism(s) 2528 (e.g., blocking arm(s) or blocking tab(s)) of anti-tamper adapter 2502 can prevent normal actuation of the plug release or release mechanism (e.g., resilient latch 210 or 312) of the plug 308 (or plug 208 of fiber optic cable 206). As a further example, upon insertion of plug 308 into exemplary anti-tamper adapter 2502, one or more blocking mechanism(s) 2528 (e.g., blocking arm(s) or blocking tab(s)) of anti-tamper adapter 2502 can be positioned in the crevice or vertex formed by the plug release or release mechanism (e.g., resilient latch 210 or 312) of the plug 308 and plug body 402 of plug 308. Thus, to allow actuation of the plug release or release mechanism (e.g., resilient latch 210 or 312) of the plug 308, and thus allow removal of a plug 308 with an installed anti-tamper adapter 2502 from an outlet 302, the one or more blocking mechanism(s) 2528 (e.g., blocking arm(s) or blocking tab(s)) can first be repositioned out of crevice or vertex formed by the plug release or release mechanism (e.g., resilient latch 210 or 312) of the plug 308 and plug body 402 of plug 308. As further described below regarding FIGS. 27-33, an exemplary removal tool or key 2602 can be adapted to reposition one or more blocking mechanism(s) 2528 (e.g., blocking arm(s) or blocking tab(s)) for connecting and disconnecting a connected RJ-type plug 308 employing embodiments of anti-tamper adapter 2502.

As a result, various embodiments of the anti-tamper adapter 2502 can facilitate cable tamper prevention (e.g., either inadvertent or intentional) of a plug 308 (or plug 208 of fiber optic cable 206) fitted with an embodiment of anti-tamper adapter 2502 when the plug 308 (or plug 208 of fiber optic cable 206) is connected or inserted into an associated outlet (e.g., outlet 302 or 202 for fiber optic cable 206, etc.). Thus, in various aspects, the disclosed subject matter provides cable tamper prevention apparatuses (e.g., anti-tamper adapter 2502) that can advantageously provide cost-effective tamper prevention with or without the use of proprietary outlets or plugs, while offering ease and flexibility of use, and without excessive manpower requirements (e.g., two party verification of connection during maintenance, rigorous access controls, etc.). As additional advantages, the various embodiments can be employed to complement reactive efforts to address tampering (e.g., connection or enclosure based alarms) and can allow more efficient use of costly equipment rack space, for example, where mission critical service connection can be located in close proximity to less essential service connections.

In a further aspect, various embodiments of anti-tamper adapter 2502 can be comprised of a rigid or semi-rigid material, such as a moldable plastic or polymer, in addition to more rigid materials such, for example, as metals or ceramics. For instance, a molded plastic anti-tamper adapter 2502 can include one or more of a molded body 2512 and/or a plug release guard or release shroud 2522. In yet another aspect, plug release guard or release shroud 2522, as well as other components (e.g., 2516, 2518, etc.), can be molded integral to molded body 2512 or separately and subsequently attached or integrated as desired. In a further aspect, the moldable plastic or polymer can be selected based on a color scheme according to an intended use of the anti-tamper adapter 2502 (e.g., a standardized color scheme), for example, to signify mission critical service connections, etc.

Figure 27:
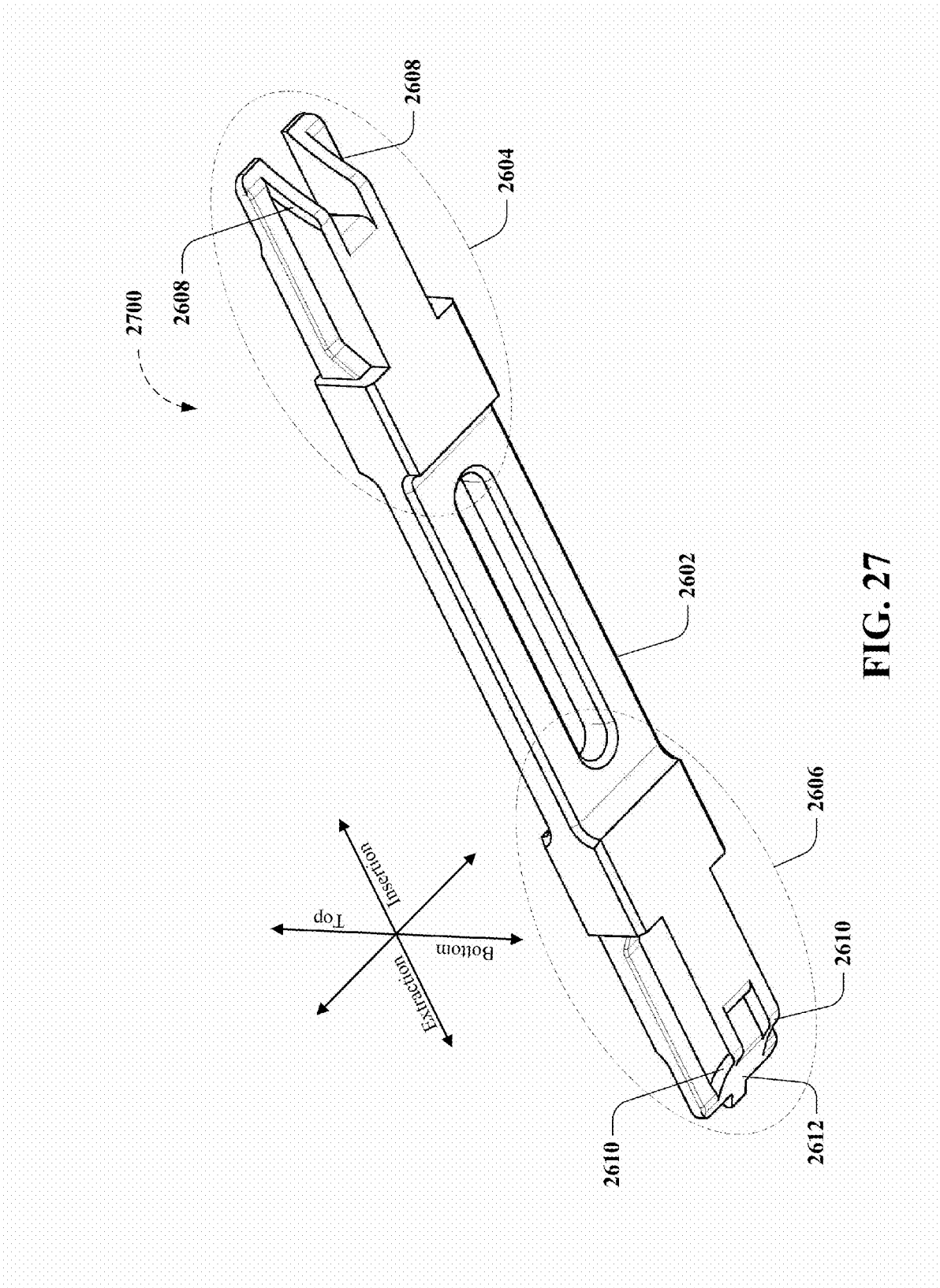
FIG. 27 depicts a perspective view further illustrating aspects of an exemplary removal tool or key for connecting and disconnecting a connected RJ-type plug using embodiments of an anti-tamper adapter.

FIG. 27 depicts a perspective view further illustrating aspects of an exemplary removal tool or key 2602 for connecting and disconnecting a connected RJ-type plug 308 using embodiments of anti-tamper adapter 2502. According to various embodiments, the disclosed subject matter provides a removal tool or key 2602. According to an aspect, as described above, removal tool or key 2602 can be comprised of a rigid or semi-rigid material, such as a moldable plastic or polymer, in addition to more rigid materials such as metals or ceramics. For example, removal tool or key 2602 (e.g., a molded plastic removal tool or key 2602) can include one or more of an insertion end 2604 and an extraction end 2606 that facilitates positioning or repositioning one or more of a plug release or release mechanism (e.g., resilient latch 210 or 312) of the plug 308 (or plug 208 of fiber optic cable 206), one or more blocking mechanism(s) 2528 (e.g., blocking arm(s) or blocking tab(s)), and so on when the removal tool or key 2602 is inserted into an anti-tamper adapter 2502 fitted to plug 308 as described above.

Note that FIG. 27 depicts a bottom view of removal tool or key 2602 according to the orientation as depicted. Note further that removal tool or key 2602 is depicted as having an insertion end 2604 and an extraction end 2606. As used herein regarding ends of the removal tool or key 2602, the terms "insertion" and "extraction" refer to the operation of inserting or connecting a plug 308 (or plug 208 of fiber optic cable 206) employing an embodiment of anti-tamper adapter 2502 into an associated outlet (e.g., outlet 302 or 202 for fiber optic cable 206, etc.) and extracting or disconnecting the plug 308 employing an embodiment of anti-tamper adapter 2502, respectively. Recall that the one or more blocking mechanism (s) 2528 (e.g., blocking arm(s) or blocking tab(s)) of anti-tamper adapter 2502 can prevent normal actuation of the plug release or release mechanism (e.g., resilient latch 210 or 312) of the plug 308 (or plug 208 of fiber optic cable 206) when plug 308 is inserted into anti-tamper adapter 2502.

Thus, when plug 308 employing anti-tamper adapter 2502 is to be inserted or connected into an associated outlet (e.g., outlet 302 or 202 for fiber optic cable 206, etc.), the one or more blocking mechanism(s) 2528 (e.g., blocking arm(s) or blocking tab(s)) can first be repositioned out of crevice or vertex formed by the plug release or release mechanism (e.g., resilient latch 210 or 312) of the plug 308 and plug body 402 of plug 308 by the insertion of the insertion end 2604 of removal tool or key 2602 into anti-tamper adapter 2502. Note that the insertion end 2604 can comprise one or more surfaces 2608 that can be adapted to engage, manipulate, or otherwise reposition the one or more blocking mechanism(s) 2528 (e.g., blocking arm(s) or blocking tab(s)), thereby allowing the plug release or release mechanism (e.g., resilient latch 210 or 312) of the plug 308 to be depressed or repositioned as the plug 308 is inserted or connected to an associated outlet (e.g., outlet 302 or 202 for fiber optic cable 206, etc.).

Similarly, extraction end 2606 can comprise one or more surfaces 2610 that can be adapted to engage, manipulate, or otherwise reposition the one or more blocking mechanism(s) 2528 (e.g., blocking arm(s) or blocking tab(s)) allowing the plug release or release mechanism (e.g., resilient latch 210 or 312) of the plug 308 to be depressed or repositioned as the plug 308 upon disconnection from an associated outlet (e.g., outlet 302 or 202 for fiber optic cable 206, etc.). Connection and disconnection (e.g., insertion and extraction, respectively) of a plug 308 are more fully described below regarding FIGS. 28-33.

According to further aspects, exemplary removal tool or key 2602 can further comprise a plug release region 2612 of extraction end 2606 adapted to selectively manipulate the plug release or release mechanism (e.g., resilient latch 210 or 312) of the plug 308 (or plug 208 of fiber optic cable 206), for example, when the extraction end 2606 is inserted into an anti-tamper adapter 2502 fitted to plug 308 as described above. Note that the configuration of the plug release region 2612 (e.g., construction, composition, shape of plug release region 2612, location of plug release region 2612 relative to one or more surfaces 2610) is adapted to first reposition any of the one or more blocking mechanism(s) 2528 prior to selectively manipulating the plug release or release mechanism (e.g., resilient latch 210 or 312) of the plug 308 as the extraction end 2606 is inserted into an anti-tamper adapter 2502 fitted to plug 308.

For instance, plug release region 2612 can comprise a ramped or inverted ramp profile in a semi-rigid material as described herein, where the profile can be selected and located relative to the one or more surfaces 2610, such that repositioning of the one or more blocking mechanisms 2528 (e.g., blocking arm(s) or blocking tab(s)) occurs prior to the profile engaging and selectively manipulating the plug release or release mechanism (e.g., resilient latch 210 or 312) of the plug 308. Thus, insertion of extraction end 2606 in the direction indicated in FIG. 30 below (e.g., a direction orthogonal to the direction of normal insertion of plug 308)

would cause plug release region 2612 to engage the plug release or release mechanism (e.g., resilient latch 210 or 312) of the plug 308. As extraction end 2606 of removal tool or key 2602 is further inserted into anti-tamper adapter 2502 fitted to plug 308, the ramped profile of plug release region 2612 is further pressed against the plug release or release mechanism (e.g., resilient latch 210 or 312) of the plug 308, the plug release mechanism is allowed to slide down the ramp and towards plug 308 body 402. Note that the one or more blocking mechanism(s) 2528 would have been repositioned by the one or more surfaces 2610 prior to selectively manipulating the plug release or release mechanism (e.g., resilient latch 210 or 312) of the plug 308 as the extraction end 2606 is inserted into an anti-tamper adapter 2502 fitted to plug 308.

In still other aspects, as described above, various embodiments of removal tool or key 2602 can be comprised of a rigid or semi-rigid material, such as a moldable plastic or polymer, in addition to more rigid materials such as metals or ceramics. In a further aspect, the moldable plastic or polymer can be selected based on a color scheme according to an intended use of the removal tool or key 2602 (e.g., a standardized color scheme), for example, to signify mission critical service connections, etc. In yet other aspects of the disclosed subject matter, due to the complementary structures of anti-tamper adapter 2502 and removal tool or key 2602, complementary variations in the shapes of anti-tamper adapter 2502 body 2512, removal tool or key 2602 insertion end 2604, and/or extraction end 2606, and the like, can be exploited to further effect cable tamper prevention or control schemes as further described above.

Figure 28:
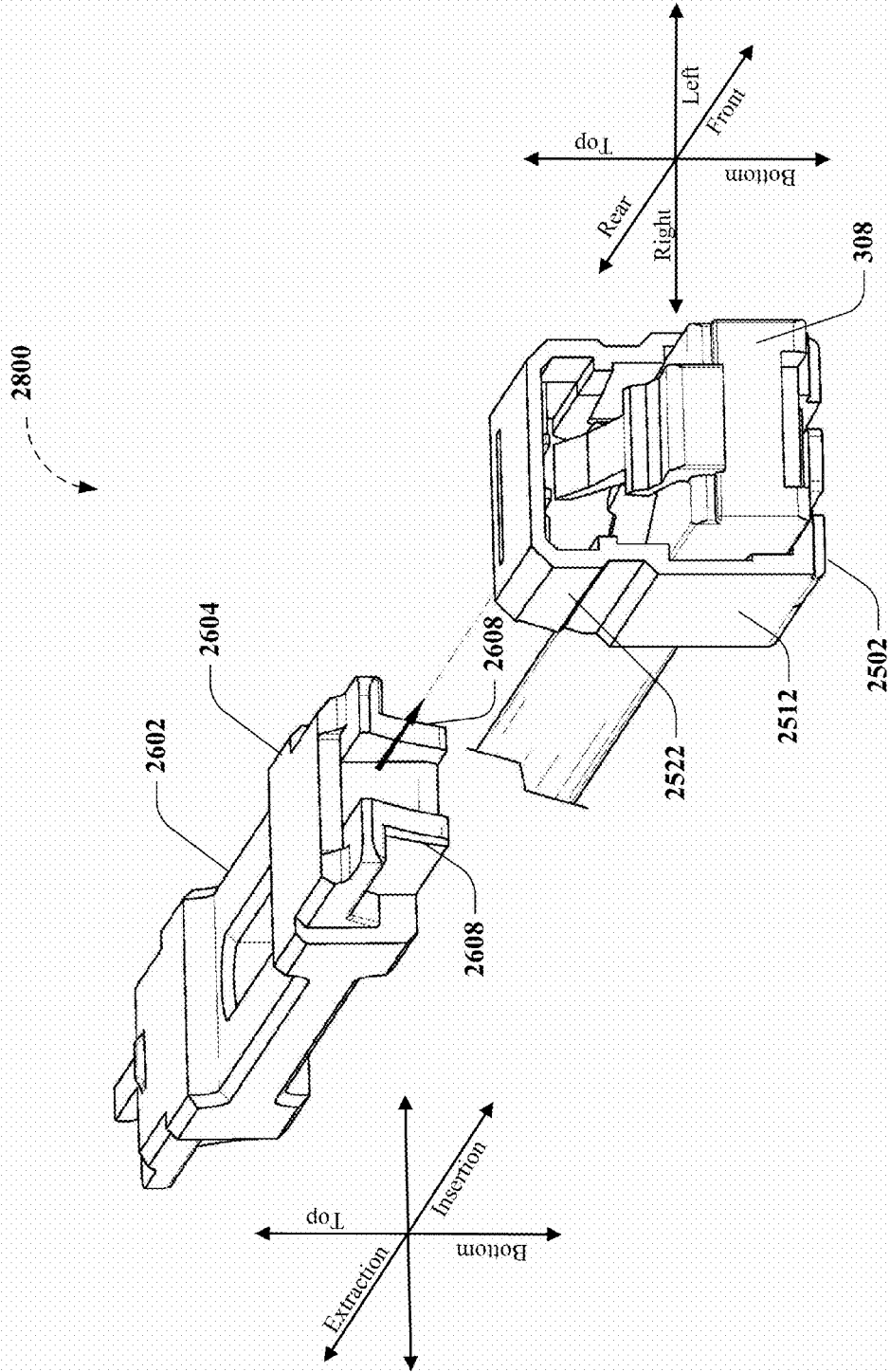
FIG. 28 illustrates an exploded view of an RJ-type plug and exemplary embodiments of an anti-tamper adapter and removal tool or key for connecting and disconnecting a connected RJ-type plug, where the removal tool or key for connecting and disconnecting a connected RJ-type plug is depicted with an insertion end of the removal tool or key adapted to be inserted into an exemplary anti-tamper adapter.

FIG. 28 illustrates an exploded view of an RJ-type plug 308 and exemplary embodiments of an anti-tamper adapter 2502 and removal tool or key 2602 for connecting and disconnecting a connected RJ-type plug 308, where the removal tool or key 2602 for connecting and disconnecting a connected RJ-type plug 308 is depicted with an insertion end 2604 of the removal tool or key 2602 adapted to be inserted into an exemplary anti-tamper adapter 2502. FIG. 29 depicts cross-sectional views 2900 for exemplary embodiments of an anti-tamper adapter 2502 suitable for use with RJ-type plugs 308, where the insertion end 2604 of the removal tool or key 2602 is illustrated at various positions with respect to aspects of an exemplary anti-tamper adapter 2502. For instance, in the top side view 2902, the one or more surfaces 2608 of insertion end 2604 can be observed to be adapted to engage the one or more blocking mechanism(s) 2528 (e.g., blocking arm(s) or blocking tab(s)) of anti-tamper adapter 2502 as described above. As removal tool or key 2602 is inserted into anti-tamper adapter 2502 fitted to plug 308 in top side view 2904 and right-side section view 2906, the one or more surfaces 2608 of insertion end 2604 can be observed to engage and reposition (e.g., to a non-blocking position) the one or more blocking mechanism(s) 2528 (e.g., blocking arm(s) or blocking tab(s)) of anti-tamper adapter 2502.

Figure 30:
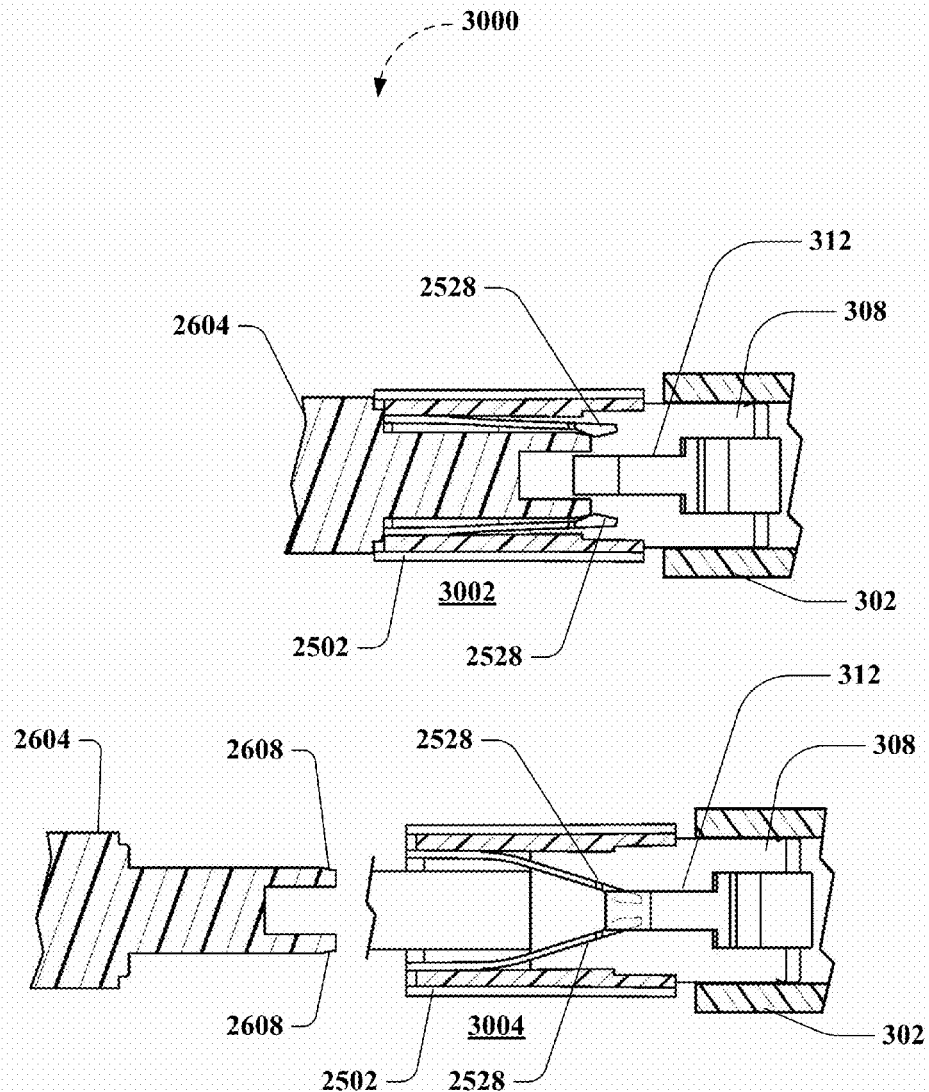
FIG. 30 depicts cross-sectional views for exemplary embodiments of an anti-tamper adapter, where an assembly comprising a removal tool or key and an exemplary anti-tamper adapter are depicted at various positions with respect to an exemplary outlet.

FIG. 30 depicts 3000 further cross-sectional views (3002, 3004) for exemplary embodiments of an anti-tamper adapter 2502, where an assembly comprising a removal tool or key 2602 and an exemplary anti-tamper adapter 2502 are depicted at various positions with respect to an exemplary outlet 302. For instance, whereas views 2904 and 2906 of FIG. 29 depicted anti-tamper adapter 2502 fitted to plug 308 with the one or more blocking mechanism(s) 2528 (e.g., blocking arm(s) or blocking tab(s)) repositioned in anticipation of connecting plug 308 to outlet 302, views 3002 depict the plug 308 employing anti-tamper adapter 2502 connected to outlet 302 (view 3002) and with removal tool or key 2602 removed (view 3004) thereby allowing the one or more blocking mechanism(s) 2528 (e.g., blocking arm(s) or blocking tab(s)) to be positioned to inhibit or prevent normal actuation (e.g., without a tool or key as described herein) of the plug release or release mechanism (e.g., resilient latch 210 or 312) of the plug 308 (or plug 208 of fiber optic cable 206).

Figure 31:
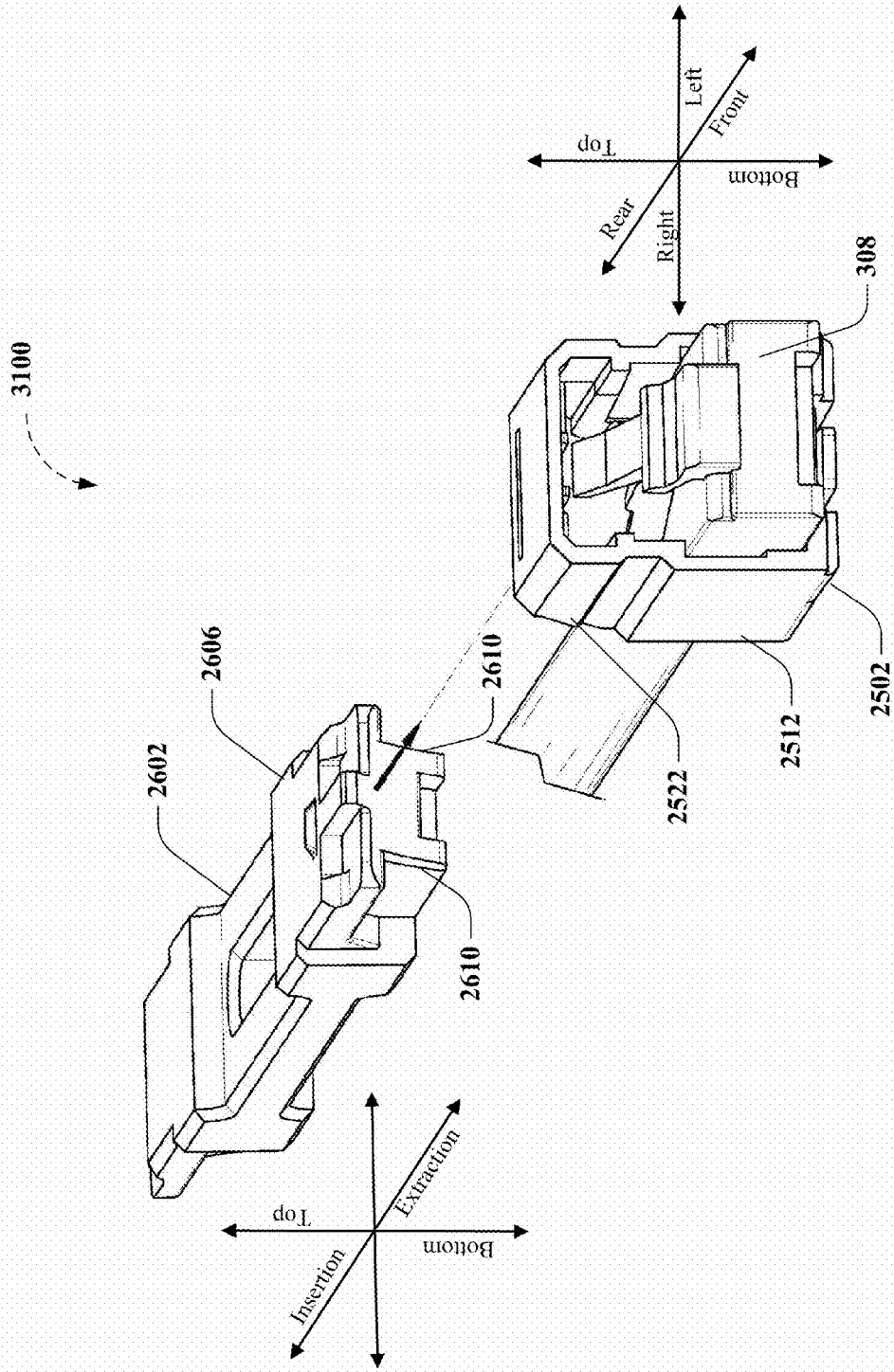
FIG. 31 illustrates an exploded view of an RJ-type plug and exemplary embodiments of an anti-tamper adapter and removal tool or key for connecting and disconnecting a connected RJ-type plug, where the removal tool or key for connecting and disconnecting a connected RJ-type plug is depicted with an extraction end of the removal tool or key adapted to be inserted into an exemplary anti-tamper adapter.

FIG. 31 illustrates an exploded view of an RJ-type plug 308 and exemplary embodiments of an anti-tamper adapter 2502 and removal tool or key 2602 for connecting and disconnecting a connected RJ-type plug 308, where the removal tool or key for connecting and disconnecting a connected RJ-type plug 308 is depicted with an extraction end 2606 of the removal tool or key 2602 adapted to be inserted into an exemplary anti-tamper adapter 2502. FIG. 32 depicts cross-sectional views 3200 for exemplary embodiments of an anti-tamper adapter 2502 suitable for use with RJ-type plugs 308, where the extraction end 2606 of the removal tool or key 2602 is illustrated at various positions with respect to aspects of an exemplary anti-tamper adapter 2502 fitted to plug 308 and connected to an exemplary outlet 302. For instance, in the top side view 3202, the one or more surfaces 2610 of extraction end 2606 can be observed to be adapted to engage the one or more blocking mechanism(s) 2528 (e.g., blocking arm(s) or blocking tab(s)) of anti-tamper adapter 2502 as described above. As removal tool or key 2602 is inserted into anti-tamper adapter 2502 fitted to plug 308 in top side view 3204, the one or more surfaces 2610 of extraction end 2604 can be observed to engage and reposition (e.g., to a non-blocking position) the one or more blocking mechanism(s) 2528 (e.g., blocking arm(s) or blocking tab(s)) of anti-tamper adapter 2502. As can be seen in FIG. 32, plug release region 2612 can comprise a ramped or an inverted ramp profile, where the profile can be selected and located relative to the one or more surfaces 2610, such that repositioning of the one or more blocking mechanism(s) 2528 (e.g., blocking arm(s) or blocking tab(s)) occurs prior to the profile engaging and selectively manipulating the plug release or release mechanism (e.g., resilient latch 210 or 312) of the plug 308.

Figure 33:
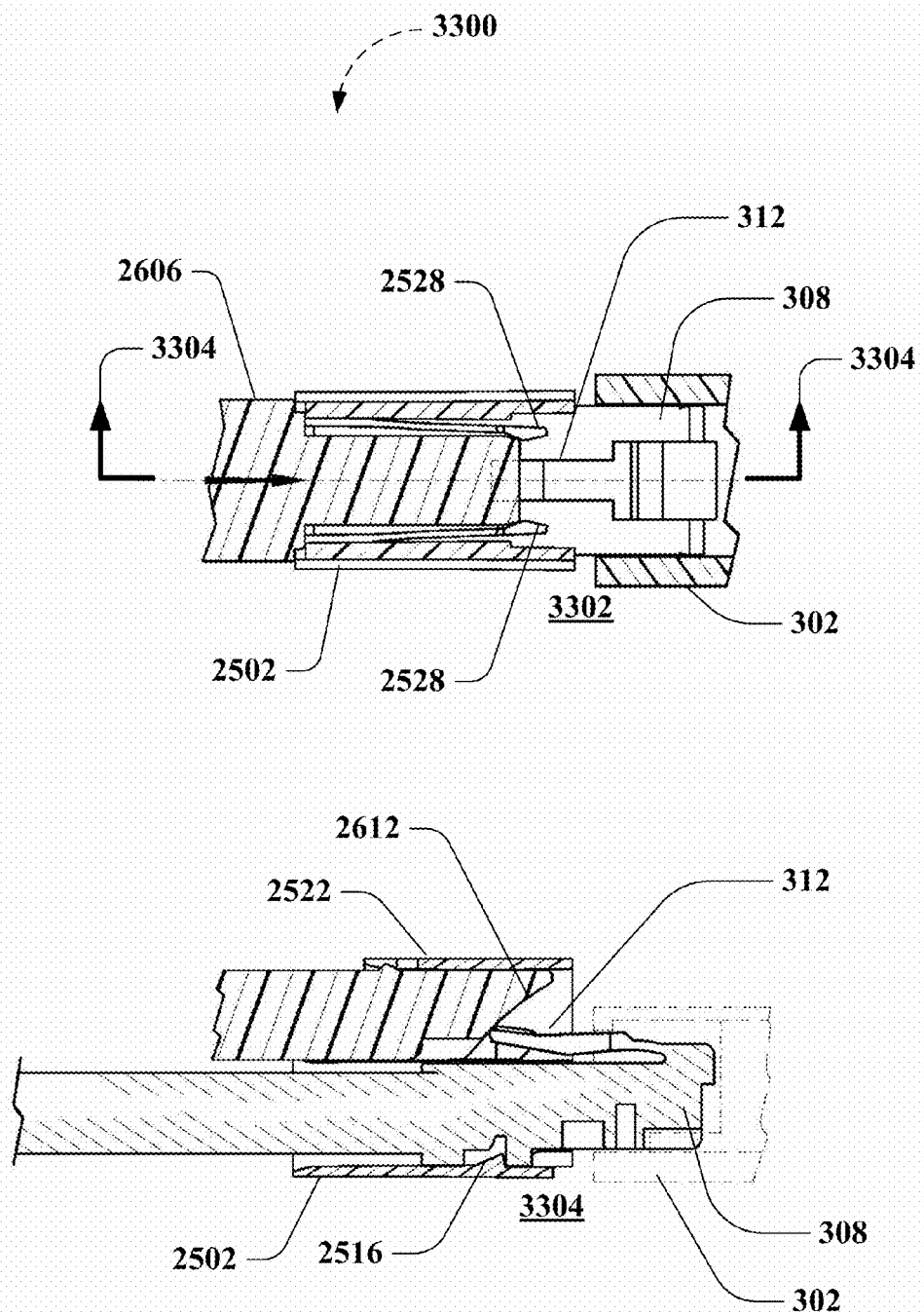
FIG. 33 depicts cross-sectional views for exemplary embodiments of an anti-tamper adapter, where aspects of a removal tool or key are depicted at various extents of insertion with respect to an exemplary anti-tamper adapter connected to an exemplary outlet.

FIG. 33 depicts 3300 cross-sectional views (3302, 3304) for exemplary embodiments of an anti-tamper adapter 2502, where aspects of a removal tool or key 2602 are depicted at various extents of insertion with respect to an exemplary anti-tamper adapter 2502 connected to an exemplary outlet 302. For instance, whereas views 3202 and 3204 of FIG. 32 depicted anti-tamper adapter 2502 fitted to plug 308 with the one or more blocking mechanism(s) 2528 (e.g., blocking arm(s) or blocking tab(s)) positioned to inhibit or prevent normal actuation (e.g., without a tool or key as described herein) of the plug release or release mechanism (e.g., resilient latch 210 or 312) of the plug 308 (or plug 208 of fiber optic cable 206), views 3302 and 3304 depict plug 308 employing anti-tamper adapter 2502 connected to outlet 302 (view 3002) and with removal tool or key 2602 extraction end 2606 inserted thereby allowing the one or more blocking mechanism(s) 2528 (e.g., blocking arm(s) or blocking tab(s)) to be repositioned (e.g., to a non-blocking position) and allowing normal actuation (e.g., with removal tool or key 2602) of the plug release or release mechanism (e.g., resilient latch 210 or 312) of the plug 308 (or plug 208 of fiber optic cable 206).

Figure 34:
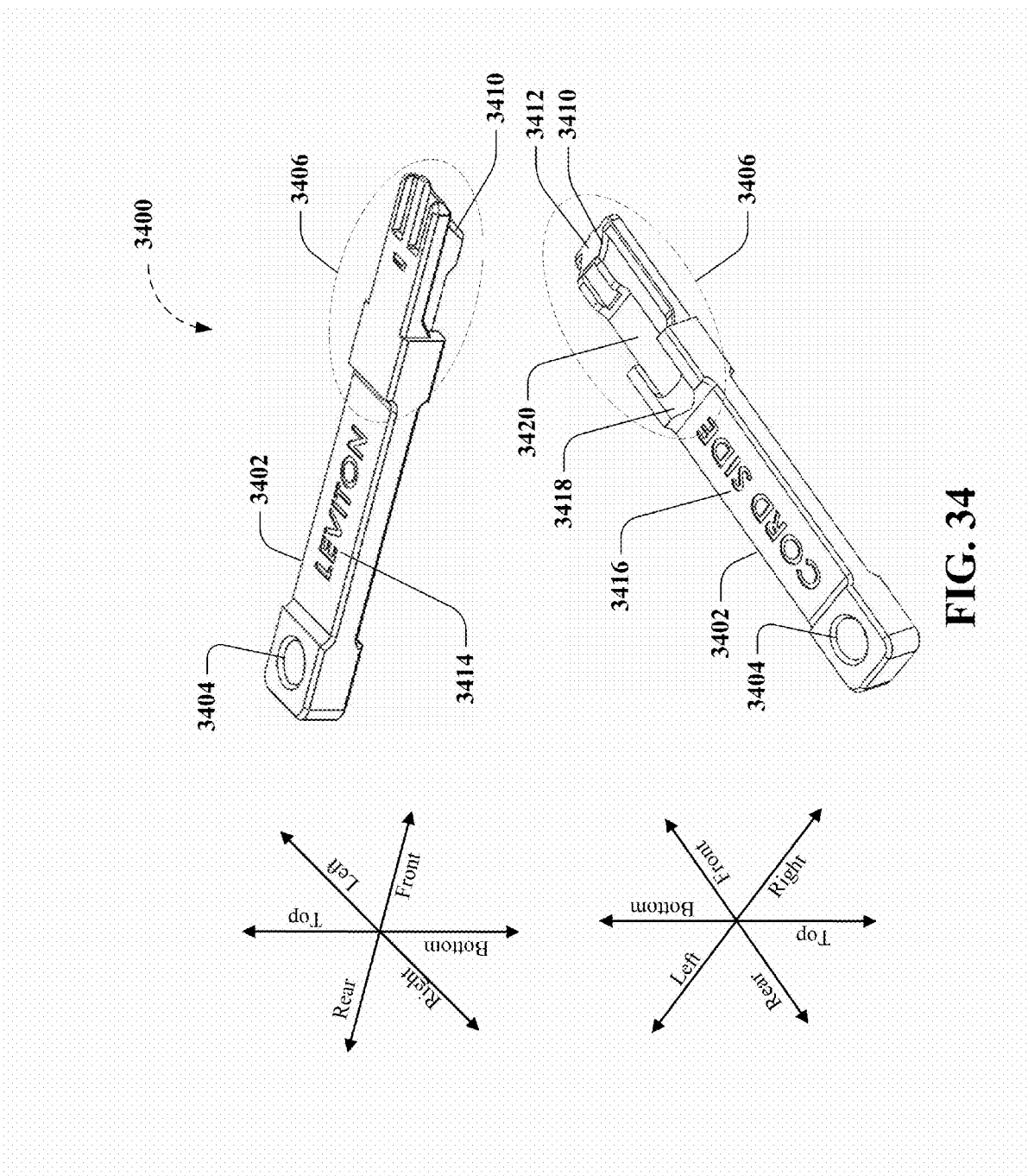
FIG. 34 depicts perspective views of further non-limiting embodiments of a removal tool or key suitable for use with an exemplary anti-tamper adapter connected as described.

It can be understood various modifications can be made to the disclosed prevention or control schemes as a result of the flexibility afforded by various non-limiting implementations as described herein. For instance, for the purpose of illustration and not limitation, FIGS. 34-36 demonstrate further non-limiting aspects of exemplary anti-tamper adapter. For example, FIG. 34 depicts perspective views 3400 of further non-limiting embodiments of a removal tool or key 3402 for connecting and disconnecting a connected RJ-type plug 308 using embodiments of anti-tamper adapter (e.g., anti-tamper adapter 2502, anti-tamper adapter 3502 as further described below, etc.).

As a non-limiting example, exemplary removal tool or key 3402 can comprise a hole 3404 adapted to allow connection of the removal tool or key 3402 to a keychain, lanyard, and so on. As further described above regarding FIG. 27, removal tool or key 3402 can be comprised of a rigid or semi-rigid material, such as a moldable plastic or polymer, in addition to more rigid materials such as metals or ceramics. As a further example, removal tool or key 3402 (e.g., a molded plastic removal tool or key 3402) can include extraction end 3406 that facilitates positioning or repositioning one or more of a plug release or release mechanism (e.g., resilient latch 210 or 312) of the plug 308 (or plug 208 of fiber optic cable 206), one or more blocking mechanism(s) (e.g., one or more blocking mechanism(s) 2528, blocking arm(s) or blocking tab(s)), and so on when the removal tool or key 3402 is inserted into an anti-tamper adapter 2502 (or anti-tamper adapter 3502 as further described below, etc.) fitted to plug 308 as described above.

Note that FIG. 27 depicts one or more of an insertion end 2604 and an extraction end 2606 that facilitates positioning or repositioning one or more of a plug release or release mechanism (e.g., resilient latch 210 or 312) of the plug 308 (or plug 208 of fiber optic cable 206), one or more blocking mechanism(s) 2528 (e.g., blocking arm(s) or blocking tab(s)), and so on when the removal tool or key 2602 is inserted into an anti-tamper adapter 2502 fitted to plug 308 as described above. However, as can be understood from FIG. 34, removal tool or key 3402 extraction end 3406 can be adapted to provide the disparate functions provided by the insertion end 2604 and extraction end 2606 of removal tool or key 2602 in FIG. 27.

As a further illustration, note that removal tool or key 3402 extraction end 3406 can comprise one or more surfaces 3410 that can be adapted to engage, manipulate, or otherwise reposition the one or more blocking mechanism(s) 2528 (e.g., one or more blocking mechanism(s) 2528, blocking arm(s) or blocking tab(s)) allowing the plug release or release mechanism (e.g., resilient latch 210 or 312) of the plug 308 to be depressed or repositioned as the plug 308 upon disconnection from an associated outlet (e.g., outlet 302 or 202 for fiber optic cable 206, etc.). However, note further that the one or more surfaces 3410 (likewise for one or more surfaces 2610) can allow connection and disconnection (e.g., insertion and extraction, respectively) of a plug 308 as more fully described above regarding FIGS. 28-33.

According to further aspects, exemplary removal tool or key 3402 can further comprise a plug release region 3412 of extraction end 3406 adapted to selectively manipulate the plug release or release mechanism (e.g., resilient latch 210 or 312) of the plug 308 (or plug 208 of fiber optic cable 206), for example, when the extraction end 3406 is inserted into an anti-tamper adapter (e.g., anti-tamper adapter 2502, anti-tamper adapter 3502 as further described below, etc.) fitted to plug 308 as described above. Note that the configuration of the plug release region 3412 (e.g., construction, composition, shape of plug release region 3412, location of plug release region 3412 relative to one or more surfaces 3410) is adapted to first reposition any of the one or more blocking mechanism(s) (e.g., one or more blocking mechanism(s) 2528) prior to selectively manipulating the plug release or release mechanism (e.g., resilient latch 210 or 312) of the plug 308 as the extraction end 2606 is inserted into an anti-tamper adapter (e.g., anti-tamper adapter 2502, anti-tamper adapter 3502 as further described below, etc.) fitted to plug 308.

For instance, plug release region 3412 can comprise a ramped or inverted ramp profile in a semi-rigid material as described herein, where the profile can be selected and located relative to the one or more surfaces 3410, such that repositioning of the one or more blocking mechanisms (e.g., one or more blocking mechanisms 2528, blocking arm(s) or blocking tab(s)) occurs prior to the profile engaging and selectively manipulating the plug release or release mechanism (e.g., resilient latch 210 or 312) of the plug 308. Thus, insertion of extraction end 3406 in the direction indicated in FIG. 30 above (e.g., a direction orthogonal to the direction of normal insertion of plug 308) would cause plug release region 3412 to engage the plug release or release mechanism (e.g., resilient latch 210 or 312) of the plug 308.

As further described above regarding FIG. 27, as extraction end 3406 of removal tool or key 3402 is further inserted into anti-tamper adapter (e.g., anti-tamper adapter 2502, anti-tamper adapter 3502 as further described below, etc.) fitted to plug 308, the ramped profile of plug release region 3412 is further pressed against the plug release or release mechanism (e.g., resilient latch 210 or 312) of the plug 308, the plug release mechanism is allowed to slide down the ramp and towards plug 308 body 402. Note that the one or more blocking mechanism(s) 2528 would have been repositioned by the one or more surfaces 3410 prior to selectively manipulating the plug release or release mechanism (e.g., resilient latch 210 or 312) of the plug 308 as the extraction end 3406 is inserted into an anti-tamper adapter (e.g., anti-tamper adapter 2502, anti-tamper adapter 3502 as further described below, etc.) fitted to plug 308.

Referring again to FIG. 34, it can be appreciated that various aspects regarding other exemplary implementations disclosed herein can be included in exemplary removal tool or key (e.g., removal tool or key 3402, 2602, 1100, etc.) and vice versa. For instance, exemplary removal tool or key (e.g., removal tool or key 3402, 2602, 1100, etc.) can further comprise one or more annotations 3414 and 3416 depicting information about the exemplary removal tool or key (e.g., removal tool or key 3402, 2602, 1100, etc.), such as for example, manufacturer names, instructions for use, etc.

In a further aspect, exemplary removal tool or key (e.g., removal tool or key 3402, 2602, 1100, etc.) can comprise one or more inletted or recessed portions 3418, 3420, and so on to enhance compatibility, ease of use, ergonomics, etc. For instance, exemplary removal tool or key (e.g., removal tool or key 3402, 2602, 1100, etc.) can comprise one or more inletted or recessed portions 3418 that can accept a portion of a specific type of cable (e.g., twisted pair, coaxial, fiber, etc.) intended for use with the anti-tamper adapter exemplary removal tool or key (e.g., removal tool or key 3402, 2602, 1100, etc.) to provide alignment of exemplary removal tool or key (e.g., removal tool or key 3402, 2602, 1100, etc.) with its associated anti-tamper adapter. In yet another aspect, exemplary removal tool or key (e.g., removal tool or key 3402, 2602, 1100, etc.) can comprise one or more inletted or recessed portions 3420 that can facilitate use with a specific (e.g., proprietary or otherwise) implementation of plug, for example, as further demonstrated below regarding FIG. 35.

Figure 35:
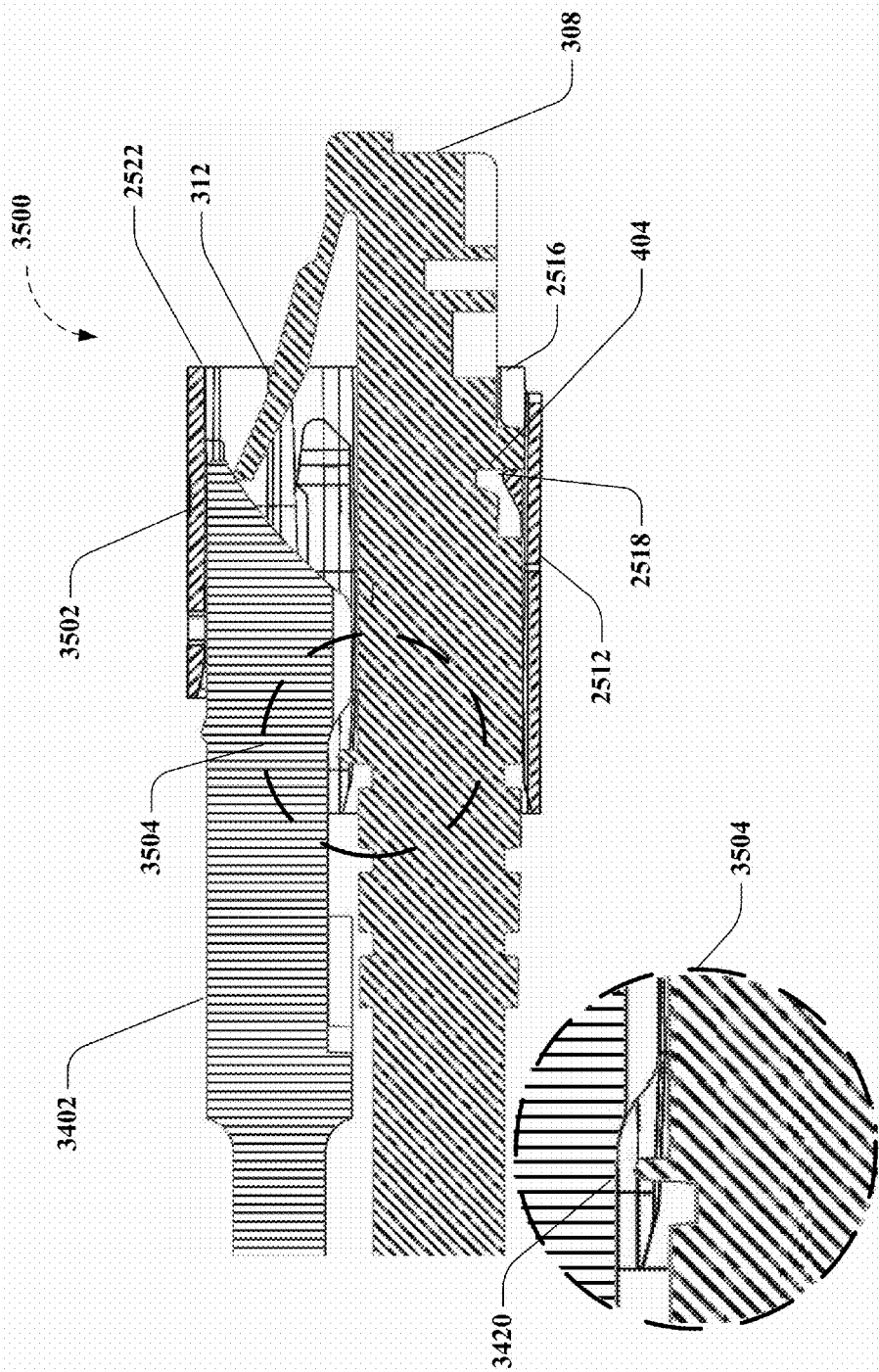
FIG. 35 depicts a cross-sectional view of exemplary embodiments of an anti-tamper adapter, where aspects of a removal tool or key are depicted with respect to an exemplary anti-tamper fitted to an RJ-type plug.

FIG. 35 depicts a cross-sectional view 3500 of exemplary embodiments of an anti-tamper adapter 3502, where aspects of removal tool or key 3402 are further depicted with respect to exemplary anti-tamper adapter 3502 fitted to an RJ-type plug 308. For the purposes of illustration and not limitation, exemplary anti-tamper adapter 3502 can comprise features and allow functions similar to exemplary anti-tamper adapter 2502 as described above regarding FIG. 25. Thus, similar reference characters as for anti-tamper adapter 2502 are used in describing anti-tamper adapter 3502. As described above, exemplary removal tool or key (e.g., removal tool or key 3402, 2602, 1100, etc.) can comprise one or more inletted or recessed portions 3420 as depicted in detail 3504 that can facilitate use of removal tool or key (e.g., removal tool or key 3402, 2602, 1100, etc.) with a specific (e.g., proprietary or otherwise) implementation of plug, for example, RJ-type plug 308. For instance, RJ-type plug 308 can comprise slimline boots suitable for high-density applications, where the one or more inletted or recessed portions 3420 can facilitate use of and anti-tamper adapter (e.g., anti-tamper adapter 2502, anti-tamper adapter 3502, etc.) fitted to a specific implementation of plug 308.

Figure 36:
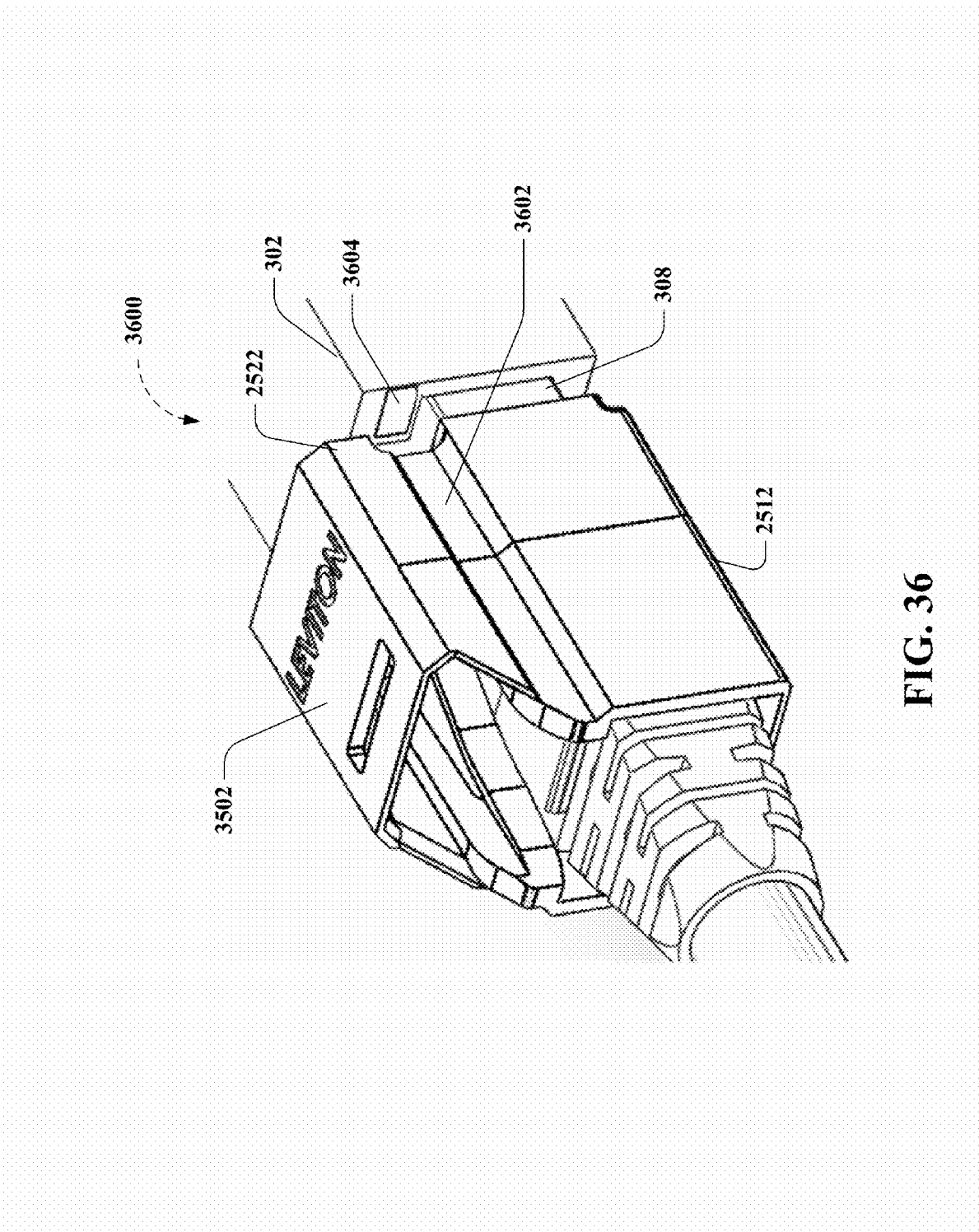
FIG. 36 illustrates further aspects of exemplary embodiments of an anti-tamper adapter, where an anti-tamper adapter is depicted in the context of a plug connected to an exemplary outlet.

FIG. 36 illustrates further aspects of exemplary embodiments of an anti-tamper adapter 3502, where anti-tamper adapter 3502 is depicted in the context of a plug 308 connected to an exemplary outlet 302. In various implementations, outlet 302 can comprise one or more status lights 3602 associated with outlet 302. To that end, exemplary non-limiting implementations of anti-tamper adapter (e.g., anti-tamper adapter 2502, anti-tamper adapter 3502, etc.) can comprise one or more inletted or recessed portions (e.g., holes, channels, cutouts, windows, doors, and the like, fixed or otherwise, etc.) in body 2512 adapted to allow observation of one or more status lights 3602 associated with outlet 302 when a plug 308 employing exemplary anti-tamper adapter (e.g., anti-tamper adapter 2502, anti-tamper adapter 3502, etc.). As described above, various other modifications can be implemented to one or more of anti-tamper adapters, removal tool or keys, and so on without departing from the scope of the disclosed subject matter.

In other non-limiting implementations, a dummy plug, a blocking plug, etc. can be adapted to employ disclosed apparatuses, devices, systems, and methodologies for tamper prevention that can facilitate blocking ports or outlets that are intended to remain undisturbed for a period of time. For instance, FIGS. 37-40 depict further exemplary embodiments of an anti-tamper adapter (e.g., anti-tamper adapter 702, anti-tamper adapter 2502, anti-tamper adapter 3502, etc.), where aspects of a dummy or blocking plug 3702 (e.g., an RJ-type dummy plug, blocking plug, etc.) are illustrated. As described above, a dummy plug or a blocking plug can be a facsimile of a plug, and can comprise features and spatial relations that provide a form complementary to an outlet associated with the plug. That is, a dummy plug or a blocking plug can comprise the minimum features that allow it to be plugged into an outlet associated with the plug in addition to having features that allow the dummy plug or blocking plug to employ disclosed apparatuses, devices, systems, and methodologies for tamper prevention.

For example, FIGS. 37-40 depict an exemplary RJ-type dummy or blocking plug 3702 employing anti-tamper adapter 3502 to facilitate blocking ports or outlets that are intended to remain undisturbed for a period of time. For the purposes of illustration and not limitation, exemplary RJ-type dummy or blocking plug 3702 and exemplary anti-tamper adapter 3502 can comprise features and allow functions similar to that described above regarding FIGS. 25, 35, etc. Thus, similar reference characters as for anti-tamper adapter 3502, plug 308, and so on, are used in describing exemplary RJ-type dummy or blocking plug 3702 and exemplary anti-tamper adapter 3502. As further described below a dummy plug or a blocking plug (e.g., exemplary RJ-type dummy or blocking plug 3702, etc.) can be adapted to the form of an associated standard plug or a standard communications plug (e.g., such as an RJ-Type, fiber optic, audio, video, power, etc.) outlet or plug. For instance, as described above regarding FIGS. 3-5, an exemplary RJ-type dummy or blocking plug 3702 can be adapted to the form of the associated outlet or port. For example, exemplary RJ-type dummy or blocking plug 3702 can comprise resilient latch 312, and can be plugged into and retained to an outlet or port (e.g., outlet 302, etc.). As described above, until such time as resilient latch 312 is depressed or otherwise manipulated to disengage latch protrusions from the corresponding recesses 314 in outlet 302, exemplary RJ-type dummy or blocking plug 3702 can remain connected to outlet 302.

Figure 37:
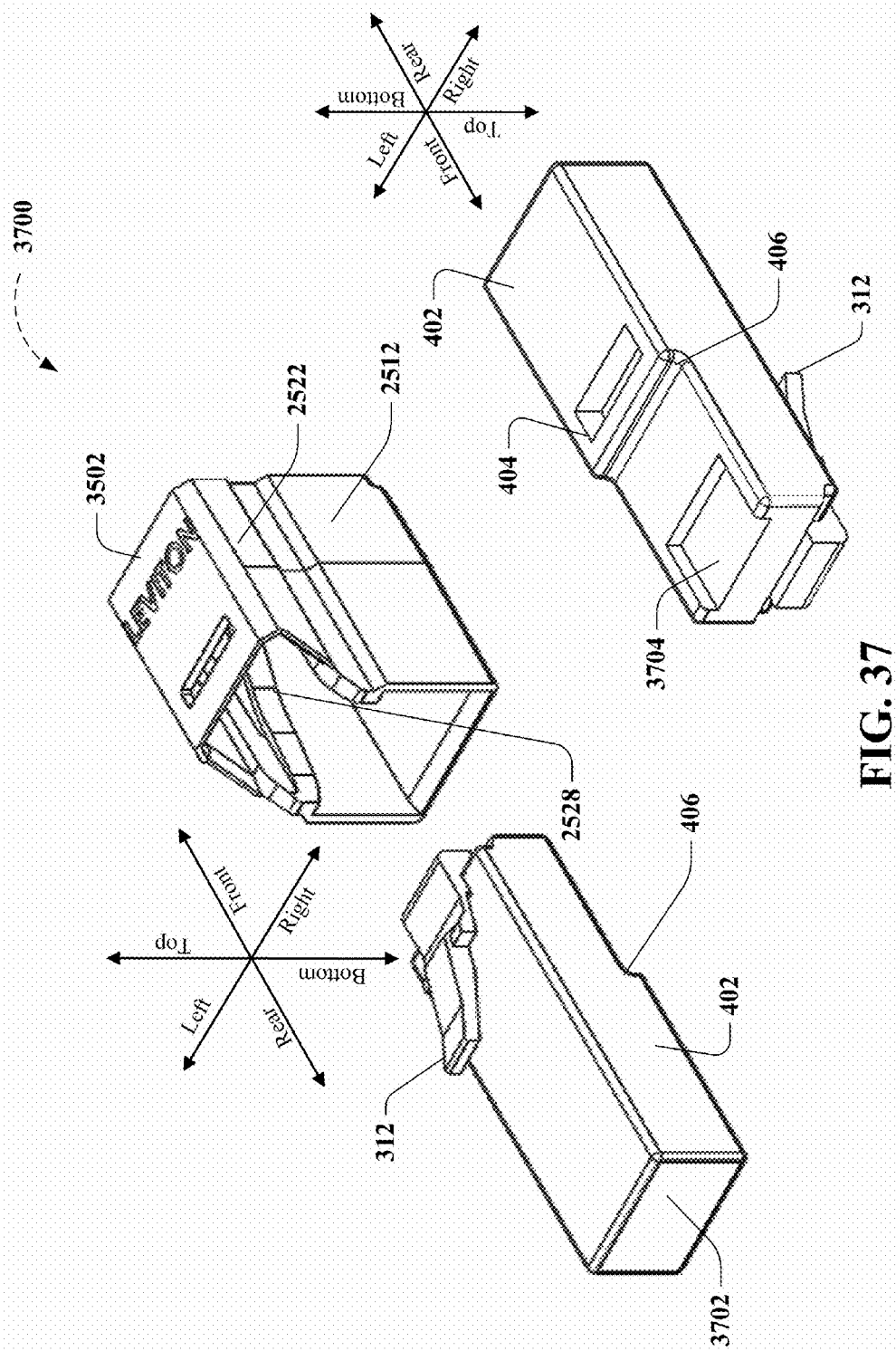
FIGS. 37-39 depict further exemplary embodiments of an anti-tamper adapter, where aspects of a dummy or blocking RJ-type plug are illustrated.

As can be seen in FIG. 37, for example, exemplary RJ-type dummy or blocking plug 3702 can further comprise a plug body 402 having standardized external dimensions, as well as a recess 404 molded into plug body 402, and shoulder 406. According to convention exemplary RJ-type dummy or blocking plug 3702 can follow the direction of insertion (e.g., direction of normal insertion) for connection of plug 308 into outlet 302 as described. In addition, exemplary RJ-type dummy or blocking plug 3702 can be described as having a front portion (e.g., facing outlet 302) facing the direction of insertion 408 (not shown) and a rear portion (opposite the front portion), where FIG. 37 depicts exemplary RJ-type dummy or blocking plug 3702 as being viewed from respective directions as indicated.

In addition, as described for plug 308, exemplary RJ-type dummy or blocking plug 3702 can further comprise a recess 3704 that, in lieu of an array 516 of conductors of plug 308 in FIG. 5, can limit or otherwise avoid contacting the corresponding array of conductors in outlet 302. For instance, it can be understood that for a dummy plug or a blocking plug (e.g., exemplary RJ-type dummy or blocking plug 3702, etc.) used in conjunction with an anti-tamper adapter (e.g., anti-tamper adapter 702, anti-tamper adapter 2502, anti-tamper adapter 3502, etc.) to block a port or outlet that is intended to remain undisturbed for a period of time, electrical connections between a dummy plug or a blocking plug and an outlet could be undesirable. Thus, recess 3704 of exemplary RJ-type dummy or blocking plug 3702 is provided. Accordingly, an RJ-45 outlet 302, for example, can receive an exemplary RJ-type dummy or blocking plug 3702 to block usage of outlet 302. Used alone, it can be seen that exemplary RJ-type dummy or blocking plug 3702 can simply be removed when it is no longer desirable to block outlet 302. However, without more, exemplary RJ-type dummy or blocking plug 3702 can be removed from its associated outlet or port without regard for authorization. In other words, further anti-tamper prevention is desired.

Thus, as a further advantage, because exemplary RJ-type dummy or blocking plug 3702 can be adapted to the form of the associated outlet or port as described above, exemplary RJ-type dummy or blocking plug 3702 can employ an anti-tamper adapter (e.g., anti-tamper adapter 702, anti-tamper adapter 2502, anti-tamper adapter 3502, etc.) to facilitate blocking ports or outlets that are intended to remain undisturbed for a period of time.

Figure 38:
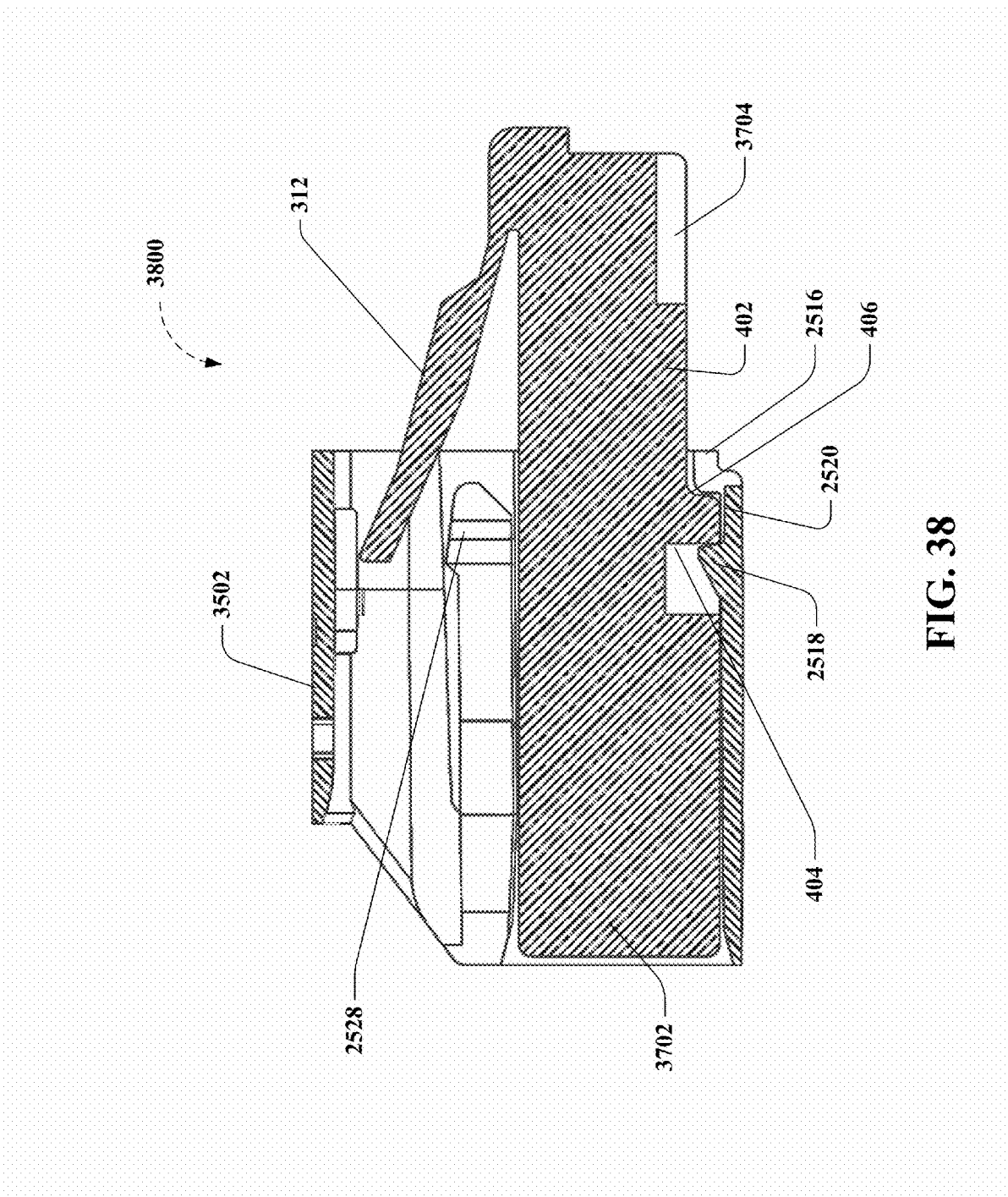
Figure 39:
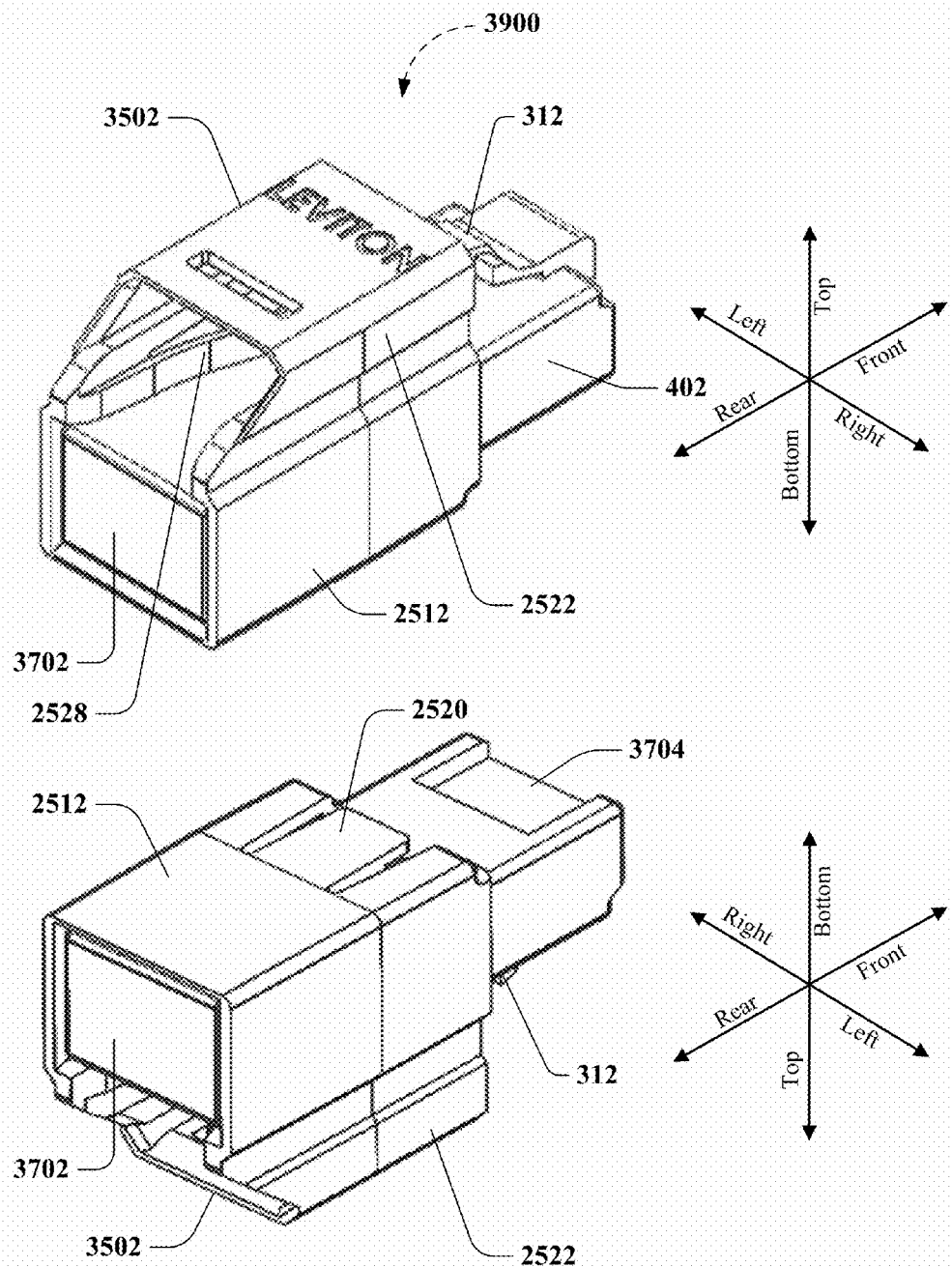

For example, as described above regarding FIGS. 16, 25, etc., FIGS. 38-39 depicts anti-tamper adapter 3502 comprising a body 2512 that can comprise one or more shoulder(s) or protrusion(s) 2516. The one or more shoulder(s) or protrusion(s) 2516 can extend into the channel located proximate the front portion of the channel (e.g., the portion of the body 2512 opposite the rear portion). The one or more shoulder(s) or protrusion(s) 2516 can limit exemplary RJ-type dummy or blocking plug 3702 travel in the direction coincident with the direction of normal insertion. For instance, shoulders 2516 can engage shoulder 406 of exemplary RJ-type dummy or blocking plug 3702 as exemplary RJ-type dummy or blocking plug 3702 is inserted into body 2512. Thus, the one or more shoulder(s) or protrusion(s) 2516 in the channel can limit the maximum travel of exemplary RJ-type dummy or blocking plug 3702 into body 2512 in the direction of normal insertion.

In a further aspect, body 2512 can comprise one or more resilient catches or protrusion(s) 2518 in the channel that can reversibly engage one or more recesses 404 in exemplary RJ-type dummy or blocking plug 3702. Accordingly, resilient catches or protrusion(s) 2518 can limit exemplary RJ-type dummy or blocking plug 3702 travel within the body 2512 at least in the direction opposite the direction of normal insertion. For instance, as exemplary RJ-type dummy or blocking plug 3702 is inserted into body 2512, resilient catches or protrusion(s) 2518 can extend outward from the channel, allowing one or more recesses 404 to be positioned under the resilient catches or protrusion(s) 2518. As the one or more recesses 404 pass under the one or more resilient catches or protrusion(s) 2518, the one or more resilient catches or protrusion(s) 2518 can at first spring away from the channel, and then can return to a resting position in the one or more recesses 404 of exemplary RJ-type dummy or blocking plug 3702.

As a result, the one or more resilient catches or protrusion(s) 2518, in conjunction with the one or more recesses 404 of exemplary RJ-type dummy or blocking plug 3702, can reversibly or releasably lock or fix the exemplary RJ-type dummy or blocking plug 3702 into a predetermined position in the anti-tamper adapter 2502. Thus, in cooperation with the one or more shoulder(s) or protrusion(s) 2516, or standing alone with the one or more recesses 404 of exemplary RJ-type dummy or blocking plug 3702, the one or more resilient catches or protrusion(s) 2518 can reversibly or releasably lock or fix the exemplary RJ-type dummy or blocking plug 3702 into a predetermined position in the anti-tamper adapter 2502.

Thus, as yet another advantage, because exemplary RJ-type dummy or blocking plug 3702 can be adapted to a form complementary to the associated outlet or port as described above, exemplary anti-tamper adapters (e.g., anti-tamper adapters 702, anti-tamper adapters 2502, anti-tamper adapters 3502, etc.) can be used either to facilitate port blocking as described using exemplary RJ-type dummy or blocking plug 3702, or to limit cable tampering using plug 308. Thus, as further described above, exemplary RJ-type dummy or blocking plug 3702 can be removed from its associated outlet or port, because release shroud (e.g., plug release guard or release shroud 2522, etc.) can be arranged to permit insertion of a removal tool (not shown) (e.g., removal tool or key 2602, 3402, etc.) in proximity to the release mechanism (e.g., plug release or release mechanism such as resilient latch 210, 312, and so on) for selective manipulation of the release mechanism. As yet another advantage, for embodiments of anti-tamper adapters that do not contemplate being employed with plugs attached to cables, (e.g., for port blocking purposes only, etc.), exemplary RJ-type dummy or blocking plug 3702 can be integrated (e.g., molded with or otherwise formed integral to) with an associated anti-tamper adapter or anti-tamper means (e.g., anti-tamper adapter 700, 2302, 2400, 2502, 3502, etc.) as desired.

Accordingly, in various embodiments, the disclosed subject matter provides tamper prevention systems (e.g., cable tamper prevention systems, etc.), anti-tamper adapters, and cable tamper prevention apparatuses as described above. For instance, exemplary tamper prevention systems can comprise a molded body (e.g., body 712, 2404, 2512, etc.) adapted to accept a standard communications plug (e.g., a standard communications plug such as a fiber optic plug, and RJ type plug, or communications cable plug, audio plug, video plug, etc.), such as plug 308 (or plug 208 of fiber optic cable 206, etc.) and/or a dummy plug or a blocking plug (e.g., exemplary RJ-type dummy or blocking plug 3702, etc.). For example, molded body (e.g., body 712, 2404, 2512, etc.) can be configured to accept a standard communications plug, such as plug 308 (or plug 208 of fiber optic cable 206, etc.), at a rear portion of the molded body (e.g., body 712, 2404, 2512, etc.) and/or a dummy plug or a blocking plug (e.g., exemplary RJ-type dummy or blocking plug 3702, fiber optic, audio, video, power, and so on dummy or blocking plug, etc.).

In addition, the molded body can comprise one or more protrusion(s) (e.g., one or more catches or protrusion(s) 718 (2518), resilient or otherwise, combinations thereof and so on) that can be adapted to engage a recess (e.g., one or more recesses 404 in plug 308) in the standard communications plug and/or the dummy or blocking plug to reversibly fix a position of the standard communications plug and/or the dummy or blocking plug in the molded body (e.g., body 712, 2404, 2512, etc.) as the standard communications plug and/or the dummy or blocking plug is inserted into the molded body in a longitudinal direction along an axis of the molded body. As a further example, the molded body (e.g., body 712, 2404, 2512, etc.) can be configured to reversibly fix the position of the standard communications plug and/or the dummy or blocking plug as it is positioned toward a front portion of the molded body. In yet other exemplary implementations, the disclosed systems can comprise one or more protrusion(s) (e.g., one or more shoulder(s) or protrusion(s) 716 (2516)) on the molded body (e.g., body 712, 2404, 2512, etc.) that can be adapted to engage a shoulder (e.g., shoulder 406 of plug 308, etc.) of the standard communications plug to further fix the position of the standard communications plug in the molded body.

Further non-limiting embodiments of exemplary tamper prevention systems can include a release shroud (e.g., plug release guard or release shroud 722, 2402, 2522, etc.) on the molded body (e.g., body 712, 2404, 2512, etc.). According to an aspect, the release shroud can be adapted to at least partially shroud a release mechanism (e.g., plug release or release mechanism such as resilient latch 210, 312, and so on) of the standard communications plug 308 (or plug 208 of fiber optic cable 206, etc.) to inhibit actuation of the release mechanism when the standard communications plug and/or the dummy or blocking plug is attached to an associated outlet (e.g., outlet 302 or 202 for fiber optic cable 206, etc.). According to still further aspects, the release shroud can comprise an access aperture (e.g., access aperture 2406, etc.) adapted to permit insertion of a removal tool into the release shroud allowing the removal tool to actuate the release mechanism (e.g., plug release or release mechanism such as resilient latch 210, 312, and so on).

In other non-limiting embodiments of exemplary tamper prevention systems, the systems can further comprise a housing (e.g., housing 724) on the molded body (e.g., body 712, etc.) that can be adapted to at least partially surround the release shroud (e.g., plug release guard or release shroud 722, etc.). In addition, the housing (e.g., housing 724) can further shroud the release mechanism (e.g., plug release or release mechanism such as resilient latch 210, 312, and so on) to prevent actuation of the release mechanism when the standard communications plug (e.g., plug 308 or plug 208 of fiber optic cable 206, etc.) and/or the dummy or blocking plug (e.g., exemplary RJ-type dummy or blocking plug 3702, etc.) is attached to an associated outlet (e.g., outlet 302 or 202 for fiber optic cable 206, etc.).

In yet other exemplary implementations, the housing (e.g., housing 724) and release shroud (e.g., plug release guard or release shroud 722, etc.) can be arranged to permit insertion (e.g., via an access aperture 726 of front and rear end views 708 and 710, respectively, between the housing 724 and the plug release guard or release shroud 722) of a key (e.g., removal tool or key 1100, 2602, etc.) in proximity to the release mechanism (e.g., plug release or release mechanism such as resilient latch 210, 312, and so on) for selective manipulation of the release mechanism when the key is actuated.

In still other exemplary implementations, tamper prevention systems can comprise one or more blocking mechanism (s) 2528 (e.g., blocking arm(s) or blocking tab(s)) located proximate the release shroud and adapted to inhibit actuation of the release mechanism (e.g., plug release or release mechanism such as resilient latch 210, 312, and so on) when the standard communications plug 308 (or plug 208 of fiber optic cable 206, etc.) and/or the dummy or blocking plug (e.g., exemplary RJ-type dummy or blocking plug 3702, etc.) is inserted into the molded body (e.g., body 712, 2404, 2512, etc.).

As a further example, the disclosed subject matter, in various aspects, provides exemplary non-limiting cable anti-tamper and port blocking adapters (e.g., anti-tamper adapter 700, 2302, 2400, 2502, 3502, etc.). For instance, in an aspect, exemplary cable anti-tamper adapters can comprise a body (e.g., body 712, 2404, 2512, etc.) having a channel that accepts a plug (e.g., a standard communications plug such as a fiber optic plug, and RJ type plug, or communications cable plug, audio plug, video plug, etc.), such as plug 308 (or plug 208 of fiber optic cable 206, etc.) and/or a dummy plug or a blocking plug adapted to a form complementary to an associated outlet (e.g., exemplary RJ-type dummy or blocking plug 3702, fiber optic, audio, video, power, and so on dummy or blocking plug, etc.).

For instance, as described above, a dummy plug or a blocking plug can be a facsimile of a plug, and which can comprise features and spatial relations that provide a form complimentary to an outlet associated with the plug. That is, a dummy plug or a blocking plug can comprise the minimum features that allow it to be plugged into an outlet associated with the plug, in addition to having features that allow the dummy plug or blocking plug to employ disclosed apparatuses, devices, systems, and methodologies for tamper prevention. Accordingly, in a further aspect, the channel can comprise a rear portion and a front portion, in which the rear portion can be sized to allow the plug (e.g., plug 308) and/or the dummy or blocking plug to pass into the body (e.g., body 712, 2404, 2512, etc.) in a direction coincident with a direction of normal insertion of the plug and/or the dummy or blocking plug into an associated outlet (e.g., outlet 302 or 202 for fiber optic cable 206, etc.), as described above regarding FIGS. 7, 16, 25, 34, 37, etc.

In addition, the channel can include one or more shoulder (s) (e.g., one or more shoulder(s) or protrusion(s) 716 (2516)) in the channel located proximate the front portion that can limit travel of plug (e.g., plug 308) in the direction coincident with the direction of normal insertion as further described above. In further aspects of exemplary anti-tamper adapters (e.g., anti-tamper adapter 700, 2302, 2400, etc.), the anti-tamper and port blocking adapters can comprise one or more catches (e.g., one or more catches or protrusion(s) 718 (2518), resilient or otherwise, combinations thereof and so on) in the channel. According to another aspect, the one or more catches can reversibly engage one or more recesses (e.g., one or more recesses 404 in plug 308) in the plug and/or the dummy or blocking plug. According to other aspects, the one or more catches can limit plug travel and/or the dummy or blocking plug travel in the direction opposite the direction of normal insertion as described above, for example, regarding FIGS. 7 16, 25, 34, 37, etc.

In still further non-limiting implementations of anti-tamper and port blocking adapters (e.g., anti-tamper adapter 700, 2302, 2400, 2502, 3502, etc.), the anti-tamper adapters can comprise a plug release guard (e.g., plug release guard or release shroud 722, 2402, 2522, etc.) located on the body proximate to the front portion of the channel. According to various embodiments, the plug release guard can at least partially surround the plug release (e.g., plug release or release mechanism such as resilient latch 210, 312, and so on) of the plug 308 (or plug 208 of fiber optic cable 206, etc.) and/or the dummy or blocking plug (e.g., exemplary RJ-type dummy or blocking plug 3702, etc.) when the plug and/or the dummy or blocking plug is inserted into the associated outlet (e.g., outlet 302 or 202 for fiber optic cable 206, etc.). In further embodiments, the plug release guard can inhibit actuation of the plug release when the plug and/or the dummy plug is inserted into the associated outlet.

In yet other exemplary embodiments, plug release guard (e.g., plug release guard or release shroud 722, 2402, 2522, etc.) can extend proximate to a plane defined by a panel (e.g., panel 204, 304, etc.) containing the associated outlet (e.g., outlet 302 or 202 for fiber optic cable 206, etc.) when the plug and/or the dummy or blocking plug is inserted into the associated outlet. By extending to such a proximity, the plug release guard can prohibit actuation of the plug release (e.g., plug release or release mechanism such as resilient latch 210, 312, and so on). Moreover, in a further aspect of anti-tamper and port blocking adapters (e.g., anti-tamper adapter 2302, 2400, 2502, 3502, etc.) the plug release guard (e.g., plug release guard or release shroud 722, 2402, 2522, etc.) can include an access aperture (e.g., access aperture 726, 2406, etc.) that can permit insertion of a key (e.g., removal tool or key) in proximity to the plug release (e.g., plug release or release mechanism such as resilient latch 210, 312, and so on) for selective manipulation of the plug release when the key is actuated as described above, for example, regarding FIG. 24.

Thus, in an aspect of exemplary anti-tamper and port blocking adapters (e.g., anti-tamper adapter 700, 2302, 2406, etc.), a key can comprise an arm that permits a plug release region of the key (e.g., a plug release arm 1114 and a plug release region 1116 of the removal tool or key 1100) to be placed in proximity to the plug release (e.g., plug release or release mechanism such as resilient latch 210, 312, and so on) when the key is inserted into the access aperture. According to various embodiments, the arm can permit the plug release region to selectively manipulate the plug release when the arm is manipulated in a direction orthogonal to the direction of normal insertion as further described above, for example, regarding FIGS. 11, 23, and 24.

In addition, other exemplary embodiments of anti-tamper and port blocking adapters (e.g., anti-tamper adapter 700, 2302, etc.) can include a housing (e.g., housing 724) on the body (e.g., body 712, etc.). The housing, according to an aspect, can at least partially surround the plug release guard (e.g., plug release guard or release shroud 722, etc.). According to a further aspect, the housing can be positioned relative to the plug release guard to permit a removal tool (e.g., removal tool or key 1100) to be positioned proximate to the plug release (e.g., plug release or release mechanism such as resilient latch 210, 312, and so on) when the removal tool is inserted into the cable anti-tamper adapter. For example, the removal tool or key 1100, according to an aspect can comprise a tool body (e.g., body 1112) and a plug release extension (e.g., collectively a plug release arm 1114 and a plug release region 1116 of the removal tool or key 1100). In a further aspect, the plug release extension can actuate the plug release when the plug release extension is manipulated in a direction orthogonal to the direction of normal insertion as further described above, for example, regarding FIGS. 7 and 16, etc.

In still other non-limiting implementations, cable anti-tamper and port blocking adapters can comprise one or more blocking tab(s) 2528 (e.g., blocking arms or mechanisms) located proximate the release guard 2522 and adapted to inhibit actuation of the plug release (e.g., plug release or release mechanism such as resilient latch 210, 312, and so on) when the standard communications plug 308 (or plug 208 of fiber optic cable 206, etc.) and/or the dummy or blocking plug (e.g., exemplary RJ-type dummy or blocking plug 3702, etc.) is inserted into the body (e.g., body 712, 2404, 2502, 3502, etc.). In addition, according to a further aspect, a key 2602 for selective manipulation of the plug release can comprise at least one surface (e.g., one of surfaces 2608, one of surfaces 2610, etc.) adapted to reposition the at least one blocking tab to allow selective manipulation of the plug release by a second surface (e.g., surface or profile 2612, etc.) adapted to engage and selectively manipulate the plug release. In yet other implementations, a key 3402 for selective manipulation of the plug release can comprise at least one surface (e.g., one of surfaces 3410, etc.) adapted to reposition the at least one blocking tab to allow selective manipulation of the plug release by a second surface (e.g., surface or profile 3412, etc.) adapted to engage and selectively manipulate the plug release.

As yet another example, an exemplary non-limiting cable tamper prevention apparatus, according to aspects of the disclosed subject matter, can comprise an anti-tamper means (e.g., anti-tamper adapter 700, 2302, 2400, 2502, 3502, etc.) for installing on an existing plug (e.g., an existing standard communications plug such as a fiber optic plug, and RJ type plug, or communications cable plug, audio plug, video plug, etc.), such as plug 308 (or plug 208), of an associated cable (e.g., cable 306, fiber optic cable 206, etc.) and/or a dummy plug or a blocking plug adapted to a form complementary to an associated outlet (e.g., exemplary RJ-type dummy or blocking plug 3702, fiber optic, audio, video, power, and so on dummy or blocking plug, etc.). In a further aspect, the anti-tamper means can be installable on an existing plug without requiring re-termination (e.g., cutting off the old plug and reinstalling a new plug on the cable) of the associated cable. As described above, it can be understood that for embodiments of anti-tamper adapters or anti-tamper means that do not contemplate being employed with plugs attached to cables, (e.g., for port blocking purposes only, etc.), exemplary RJ-type dummy or blocking plug 3702 can be integrated (e.g., molded with or otherwise formed integral to) with an associated anti-tamper adapter or anti-tamper means (e.g., anti-tamper adapter 700, 2302, 2400, 2502, 3502, etc.) as desired.

According to another aspect, the anti-tamper means can be configured to allow passage of a removal tool (e.g., removal tool or key 1100, 2602, 3402, etc.) for manipulation of the release mechanism (e.g., resilient latch 210 or 312) on the existing plug, such as plug 308 (or plug 208 of fiber optic cable 206, etc.) and/or the dummy or blocking plug (e.g., exemplary RJ-type dummy or blocking plug 3702, etc.). For instance, the removal tool for removing the existing plug and/or the dummy or blocking plug can be further configured to manipulate the release mechanism on the existing plug and/or the dummy or blocking plug by applying an external force (e.g., manual manipulation by a user, technician, etc.) to the removal tool in a direction orthogonal to the direction of normal insertion of the existing plug and/or the dummy or blocking plug as further described above regarding, for example, FIGS. 7, 16, 24, etc. In yet another aspect, the anti-tamper means can be further configured to allow passage of a removal tool (e.g., removal tool or key 2602, 3402, etc.) for manipulation of the release mechanism on the existing plug and/or the dummy or blocking plug and for repositioning one or more blocking tab(s) 2528 (e.g., blocking arm(s), blocking mechanisms(s), etc.) adapted to inhibit actuation of the release mechanism.

In further aspects, an exemplary cable tamper prevention apparatus can comprise a locking means for fixing a longitudinal position of the existing plug and/or the dummy or blocking plug within the anti-tamper means. For example, as described above regarding FIGS. 7, 16, 23, 24, 37-39, etc., one or more catches or protrusion(s) 718 (2518), resilient or otherwise, combinations thereof, and so on) can engage a recess (e.g., one or more recesses 404 in plug 308, one or more recesses 404 in exemplary RJ-type dummy or blocking plug 3702, etc.) in the existing plug and/or the dummy or blocking plug to fix (e.g., reversibly or otherwise) a position of the existing plug and/or the dummy or blocking plug in the molded body (e.g., body 712, 2404, 2512, etc.). In addition, as further described above, one or more protrusion(s) (e.g., one or more shoulder(s) or protrusion(s) 716 (2516)) on the molded body (e.g., body 712, 2404, 2512, etc.) can engage a shoulder (e.g., shoulder 406 of plug 308, shoulder 406 of exemplary RJ-type dummy or blocking plug 3702, etc.) of the existing plug and/or the dummy or blocking plug to further fix the position of the existing plug and/or the dummy or blocking plug in the molded body.

Thus, in cooperation with the one or more shoulder(s) or protrusion(s) 716 (2516), or standing alone with the one or more recesses 404 of the existing plug and/or the dummy or blocking plug, the one or more catches or protrusion(s) 718 (2518) can lock or fix (e.g., reversibly, releasably, or otherwise) the existing plug and/or the dummy or blocking plug into a predetermined position (e.g., in a predetermined longitudinal positions) within the anti-tamper means (e.g., anti-tamper adapter 700, 2302, 2400, 2502, 3502, etc.). In addition, the anti-tamper means can be further configured to be installed on the existing plug and/or the dummy or blocking plug by inserting a front portion of the existing plug and/or the dummy or blocking plug, through a rear portion of the anti-tamper means, and in a direction coincident with a direction of normal insertion of the existing plug as further described above regarding FIGS. 7, 16, 24, 37-39, etc.

Accordingly, in further non-limiting implementations of a cable tamper prevention apparatus, the apparatus can comprise a means for preventing unaided manipulation of a release mechanism on the existing plug and/or the dummy or blocking plug. As described above, regarding for example, FIGS. 7, 11, 16, 23, 24, 25, 35, 37, etc., means for preventing unaided manipulation of a release mechanism on the existing plug and/or the dummy or blocking plug can comprise any of a plug release guard or release shroud 722, 2402, 2522, a housing 724, portions or combinations thereof, and so on.

In yet other exemplary implementations, tamper prevention systems can comprise a molded body (e.g., body 2512, etc.) adapted to accept a standard communications plug (e.g., a standard communications plug such as a fiber optic plug, and RJ type plug, or communications cable plug, audio plug, video plug, etc.), such as plug 308 (or plug 208 of fiber optic cable 206, etc.) and/or a dummy or blocking plug adapted to a form complementary to an outlet (e.g., exemplary RJ-type dummy or blocking plug 3702, fiber optic, audio, video, power, and so on dummy or blocking plug, etc.) associated with the standard communications plug. As described above, a dummy plug or a blocking plug can be a facsimile of a plug, and which can comprise features and spatial relations that provide a form complimentary to an outlet associated with the plug. That is, a dummy plug or a blocking plug can comprise the minimum features that allow it to be plugged into an outlet associated with the plug, as well as having features that allow the dummy plug or the blocking plug to employ disclosed apparatuses, devices, systems, and methodologies for tamper prevention For example, molded body (e.g., body 2512, etc.) can be configured to accept a standard communications plug, such as plug 308 (or plug 208 of fiber optic cable 206, etc.), at a rear portion of the molded body (e.g., body 2512, etc.) and/or a dummy or blocking plug (e.g., exemplary RJ-type dummy or blocking plug 3702, etc.).

In addition, the molded body can comprise one or more protrusion(s) (e.g., one or more catches or protrusion(s) 2518, resilient or otherwise, combinations thereof and so on) that can be adapted to engage a recess (e.g., one or more recesses 404 in plug 308, one or more recesses 404 in dummy or blocking plug 3702, etc.) in the standard communications plug and/or the dummy or blocking plug (e.g., exemplary RJ-type dummy or blocking plug 3702, etc.) to reversibly fix a position of the standard communications plug and/or the dummy or blocking plug in the molded body (e.g., body 2512, etc.) as the standard communications plug and/or the dummy or blocking plug is inserted into the molded body in a longitudinal direction along an axis of the molded body. As a further example, the molded body (e.g., body 2512, etc.) can be configured to reversibly fix the position of the standard communications plug and/or the dummy or blocking plug as the standard communications plug and/or the dummy or blocking plug is positioned toward a front portion of the molded body. In yet other exemplary implementations, the disclosed systems can comprise one or more protrusion(s) (e.g., one or more shoulder(s) or protrusion(s) 2516) on the molded body (e.g., body 2512, etc.) that can be adapted to engage a shoulder (e.g., shoulder 406 of plug 308, etc.) of the standard communications plug and/or the dummy plug to further fix the position of the standard communications plug and/or the dummy plug in the molded body.

Further non-limiting embodiments of exemplary tamper prevention systems can include a release shroud (e.g., plug release guard or release shroud 2522, etc.) on the molded body (e.g., body 2512, etc.). According to an aspect, the release shroud can be adapted to at least partially shroud a release mechanism (e.g., plug release or release mechanism such as resilient latch 210, 312, and so on) of the standard communications plug 308 (or plug 208 of fiber optic cable 206, etc.) and/or the dummy or blocking plug (e.g., exemplary RJ-type dummy or blocking plug 3702, etc.) to inhibit actuation of the release mechanism when the standard communications plug and/or the dummy or blocking plug is attached to an associated outlet (e.g., outlet 302 or 202 for fiber optic cable 206, etc.). According to still further aspects, the release shroud can comprise an access aperture (e.g., access aperture 2406, etc.) adapted to permit insertion of a removal tool into the release shroud allowing the removal tool to actuate the release mechanism (e.g., plug release or release mechanism such as resilient latch 210, 312, and so on).

In yet other exemplary implementations, release shroud (e.g., plug release guard or release shroud 2522, etc.) can be arranged to permit insertion of a removal tool (e.g., removal tool or key 2602, etc.) in proximity to the release mechanism (e.g., plug release or release mechanism such as resilient latch 210, 312, and so on) for selective manipulation of the release mechanism.

In still other exemplary implementations, tamper prevention systems can comprise one or more blocking mechanism(s) 2528 (e.g., blocking arm(s) or blocking tab(s)) located proximate the release shroud and adapted to inhibit actuation of the release mechanism (e.g., plug release or release mechanism such as resilient latch 210, 312, and so on) when the standard communications plug 308 (or plug 208 of fiber optic cable 206, etc.) and/or the dummy or blocking plug (e.g., exemplary RJ-type dummy or blocking plug 3702, etc.) is inserted into the molded body (e.g., body 712, 2404, 2502, etc.).

Figure 40:
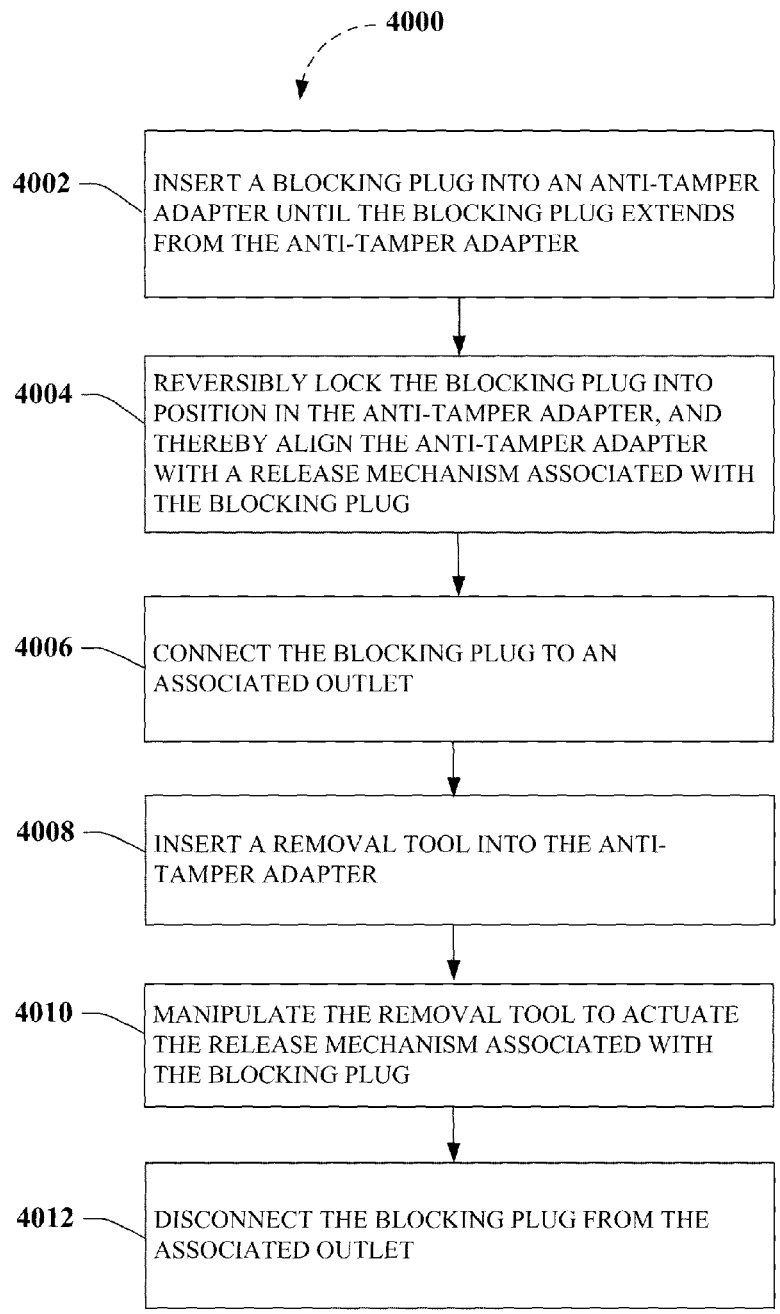
FIG. 40 depicts a block diagram demonstrating methodologies for cable tamper prevention in accordance with aspects of the disclosed subject matter.

In view of the structures and devices described supra, methodologies that can be implemented in accordance with the disclosed subject matter will be better appreciated with reference to the flowchart of FIG. 40. While, for purposes of simplicity of explanation, the methodologies are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and orders of the blocks, can be implemented which achieve the same or a similar result. Moreover, not all illustrated blocks may be required to implement the methodologies described hereinafter.

Exemplary Methodologies for Cable Tamper Prevention

FIG. 40 depicts a block diagram demonstrating methodologies 4000 for cable tamper prevention in accordance with aspects of the disclosed subject matter. For instance, methodologies 4000 can comprise, at 4002, inserting a plug 308 (e.g., a standard communications plug such as a fiber optic plug, and RJ type plug, or communications cable plug, audio plug, video plug, etc.) and/or a dummy or blocking plug (e.g., exemplary RJ-type dummy or blocking plug 3702, fiber optic, audio, video, power, and so on dummy or blocking plugs, etc.) into an anti-tamper adapter (e.g., anti-tamper adapter 700, 2302, 2400, 2502, 3502, etc.) in a direction coincident with a direction of normal insertion of the plug until the plug 308 and/or the dummy or blocking plug (e.g., exemplary RJ-type dummy or blocking plug 3702, etc.) extends from the anti-tamper adapter (e.g., anti-tamper adapter 700, 2302, 2400, etc.). For example, at 4002, a plug 308 and/or a dummy or blocking plug (e.g., exemplary RJ-type dummy or blocking plug 3702, etc.) can be inserted into a rear portion of an anti-tamper adapter (e.g., anti-tamper adapter 700, 2302, 2400, 2502, 3502, etc.) until the plug 308 and/or exemplary RJ-type dummy or blocking plug 3702 extends from a front portion of the anti-tamper adapter (e.g., anti-tamper adapter 700, 2302, 2400, 2502, 3502, etc.).

In addition, methodologies 4000 can include locking (e.g., reversibly, releasably, or otherwise) the plug 308 and/or exemplary RJ-type dummy or blocking plug 3702 into a predetermined position (e.g., as determined by one or more shoulder(s) or protrusion(s) 716 (2516), one or more catches or protrusion(s) 718 (2518), resilient or otherwise, combinations thereof and so on) in the anti-tamper adapter (e.g., anti-tamper adapter 700, 2302, 2400, 2502, 3502, etc.) at 4004. Thus, at 4004, methodologies 4000 can include aligning a portion (e.g., a plug release guard or release shroud 722, 2402, 2522, a housing 724, portions or combinations thereof, and so on) of the anti-tamper adapter that inhibits actuation of a release mechanism (e.g., resilient latch 210 or 312) associated with the plug 308 (or plug 208 of fiber optic cable 206, etc.) and/or exemplary RJ-type dummy or blocking plug 3702.

Methodologies 4000 can further include connecting the plug 308 and/or exemplary RJ-type dummy or blocking plug 3702 to an associated outlet (e.g., outlet 302 or 202 for fiber optic cable 206, etc.) at 4006. In further non-limiting embodiments of methodologies 4000, at 4008, a removal tool or key (e.g. a connector removal tool or key 1100, etc.) can be inserted into the anti-tamper adapter (e.g., anti-tamper adapter 700, 2302, 2400, 2502, 3502, etc.). For instance, at 4008, methodologies 4000 can further include inserting the removal tool (e.g., removal tool or key 1100, etc.) proximate to the rear portion of an anti-tamper adapter (e.g. removal tool or key 1100 into anti-tamper adapter 700, 2502, 3502, etc.). In yet other non-limiting embodiments of methodologies 4000, the removal tool (e.g. a removal tool or key) can be inserted on a side of the anti-tamper adapter (e.g., anti-tamper adapter 2302, 2400, etc.).

Accordingly, at 4010, a portion of the removal tool (e.g., a plug release arm 1114 of the removal tool or key 1100) can be manipulated in a direction orthogonal to the direction of normal insertion of the plug 308 and/or exemplary RJ-type dummy or blocking plug 3702 to actuate the release mechanism plug release or release mechanism (e.g., resilient latch 210 or 312, etc.) associated with plug 308 (or plug 208 of fiber optic cable 206) and/or exemplary RJ-type dummy or blocking plug 3702. In addition, methodologies 4000 can further include disconnecting the plug 308 (or plug 208 of fiber optic cable 206, etc.) and/or exemplary RJ-type dummy or blocking plug 3702 from the associated outlet (e.g., outlet 302 or 202 for fiber optic cable 206, etc.) at 4012.

In still other exemplary implementations of methodologies 4000, connecting the plug 308 and/or exemplary RJ-type dummy or blocking plug 3702 to an associated outlet (e.g., outlet 302 or 202 for fiber optic cable 206, etc.) at 4006 can alternately include inserting a first portion (e.g., one or more surfaces 2608, one or more surfaces 2610, one or more surfaces 3410, etc.) of the removal tool (e.g., removal tool or key 2602, 3402, etc.) thereby repositioning one or more blocking mechanism(s) (e.g., blocking arm(s), blocking tab(s), etc.) located proximate to, and inhibiting actuation of, the release mechanism (e.g., resilient latch 210 or 312, etc.) associated with plug 308 (or plug 208 of fiber optic cable 206) and/or exemplary RJ-type dummy or blocking plug 3702. In yet other non-limiting embodiments, methodologies 4000 for cable tamper prevention can include actuating the release mechanism (e.g., resilient latch 210 or 312, etc.) with a second portion (e.g., surface 2612, surface 3412, etc.) of the removal tool (e.g., removal tool or key 2602, removal tool or key 3402, etc.) associated with the plug (e.g., surface 2612, surface 3412, etc.) and disconnecting the plug 308 (or plug 208 of fiber optic cable 206, etc.) and/or exemplary RJ-type dummy or blocking plug 3702 from the associated outlet (e.g., outlet 302 or 202 for fiber optic cable 206, etc.) at 4012.

In further non-limiting implementations of methodologies 4000, the plug 308 (e.g., a standard communications plug such as a fiber optic plug, and RJ type plug, or communications cable plug, audio plug, video plug, etc.) and/or a dummy or blocking plug (e.g., exemplary RJ-type dummy or blocking plug 3702, fiber optic, audio, video, power, and so on dummy or blocking plug, etc.) can be unlocked (not shown) from its predetermined position in the anti-tamper adapter (e.g., anti-tamper adapter 700, 2302, 2400, 2502, 3502, etc.), as described above, for example, regarding FIGS. 7, 16, etc. In addition, as further described above, the plug 308 and/or exemplary RJ-type dummy or blocking plug 3702 can be removed (not shown) from the anti-tamper adapter (e.g., anti-tamper adapter 700, 2302, 2400, 2502, 3502, etc.) in a reusable condition (e.g., in its original condition, same condition as before installation of the anti-tamper adapter, substantially the same condition, or readily usable to accomplish substantially the same purpose as before installation of the anti-tamper adapter), for example when it is determined that cable tamper prevention is no longer desired for a particular plug 308 (or plug 208 of fiber optic cable 206, etc.) and/or exemplary RJ-type dummy or blocking plug 3702.

While the disclosed subject matter has been described in connection with the preferred embodiments of the various figures, it is to be understood that other similar embodiments may be used with, or modifications and additions may be made to, the described embodiments for performing the same function of the disclosed subject matter without deviating therefrom. For example, one skilled in the art will recognize that aspects of the disclosed subject matter as described in the various embodiments of the present application may apply to other types of cable tamper prevention and control applications.

As a further example, variations of process or apparatus parameters (e.g., dimensions, configurations, removal tool or key locations, arrangements, or motions required to selectively manipulate a plug release or release mechanism, application of dummy or blocking plugs with other anti-tamper adapters, process step order, etc.) may be made to further optimize the provided structures, devices and methodologies, as shown and described herein. In any event, the structures and devices, as well as the associated methodologies, described herein have many applications in cable tamper prevention and control. Therefore, the disclosed subject matter should not be limited to any single embodiment described herein, but rather should be construed in breadth and scope in accordance with the appended claims.

In addition, a variety of implementation specific details and/or exemplary alternatives to such details are provided in further support and description of the various embodiments set forth herein. Where such details or alternatives are not specifically represented in a figure, such figures nonetheless are intended to embrace all of such details since such details or alternatives as described can be appreciated by one of ordinary skill in the art in the context of such figures and embodiments as add-on(s) to and/or representative details, alternatives and/or substitutes for various element(s) of the figures.

What is claimed is:

1. A tamper prevention system comprising:
 a molded body adapted to accept a blocking plug, the molded body having at least one protrusion adapted to engage a recess in the blocking plug to reversibly fix a position of the blocking plug in the molded body as the blocking plug is inserted into the molded body in a longitudinal direction along an axis of the molded body; and
 a release shroud on the molded body adapted to at least partially shroud a release mechanism of the blocking plug to inhibit actuation of the release mechanism when the blocking plug is attached to an associated outlet.

2. The tamper prevention system of claim 1, further comprising:

at least a second protrusion on the molded body adapted to engage a shoulder of the blocking plug to further reversibly fix the position of the blocking plug in the molded body.

3. The tamper prevention system of claim 1, the release shroud comprising an access aperture adapted to permit insertion of a removal tool into the release shroud allowing the removal tool to actuate the release mechanism.

4. The tamper prevention system of claim 1, the blocking plug and associated outlet comprise at least one set of a blocking fiber optic plug and associated outlet or a blocking Registered Jack (RJ) plug and associated outlet.

5. The tamper prevention system of claim 1, the molded body further configured to accept the blocking plug at a rear portion of the molded body and reversibly fix the position of the blocking plug as it is positioned toward a front portion of the molded body.

6. The tamper prevention system of claim 1, further comprising:
   a housing on the molded body adapted to at least partially surround the release shroud and further adapted to shroud the release mechanism to prevent actuation of the release mechanism when the blocking plug is attached to the associated outlet.

7. The tamper prevention system of claim 6, the housing and release shroud are arranged to permit insertion of a key in proximity to the release mechanism for selective manipulation of the release mechanism when the key is actuated.

8. The tamper prevention system of claim 1, further comprising:
   at least one blocking mechanism located proximate the release shroud and adapted to inhibit actuation of the release mechanism when the blocking plug is inserted into the molded body.

9. The tamper prevention system of claim 8, the release shroud is adapted to permit insertion of a removal tool in proximity to the release mechanism for selective manipulation of the release mechanism when the removal tool is actuated.

10. A cable anti-tamper and port blocking adapter comprising:
   a body having a channel that accepts at least one of a plug or a dummy plug adapted to a form complementary to an associated outlet, the channel having a rear portion and a front portion, the rear portion is sized to allow the at least one of the plug or the dummy plug to pass into the body in a direction coincident with a direction of normal insertion of the at least one of the plug or the dummy plug into the associated outlet;
   at least a first shoulder in the channel located proximate the front portion that limits at least one of plug or dummy plug travel in the direction coincident with the direction of normal insertion;
   at least one resilient catch in the channel that reversibly engages at least one recess in at least one of the plug or the dummy plug and limits at least one of plug or dummy plug travel in the direction opposite the direction of normal insertion; and
   a plug release guard located on the body proximate to the front portion that at least partially surrounds and inhibits actuation of a plug release of at least one of the plug or the dummy plug when the at least one of the plug or the dummy plug is inserted into the associated outlet.

11. The cable anti-tamper and port blocking adapter of claim 10, further comprising:
   at least a second shoulder in the channel located proximate the front portion that limits at least one of plug or dummy plug travel in the direction coincident with the direction of normal insertion.

12. The cable anti-tamper and port blocking adapter of claim 10, further comprising:
   a housing on the body that at least partially surrounds the plug release guard, the housing positioned relative to the plug release guard to permit a removal tool to be positioned proximate to the plug release when the removal tool is inserted into the cable anti-tamper adapter.

13. The cable anti-tamper and port blocking adapter of claim 10, the removal tool comprising a tool body and a plug release extension that actuates the plug release when the plug release extension is manipulated in a direction orthogonal to the direction of normal insertion.

14. The cable anti-tamper and port blocking adapter of claim 10, the plug release guard extends proximate to a plane defined by a panel containing the associated outlet to prohibit actuation of the plug release when the at least one of the plug or the dummy plug is inserted into the associated outlet.

15. The cable anti-tamper and port blocking adapter of claim 10, the dummy plug and associated outlet comprise at least one set of a dummy fiber optic plug and associated outlet or a dummy Registered Jack (RJ) plug and associated outlet.

16. The cable anti-tamper and port blocking adapter of claim 15, the dummy plug comprises a dummy RJ-45 plug having a latch as a plug release.

17. The cable anti-tamper and port blocking adapter of claim 14, the plug release guard further comprising an access aperture that permits insertion of a key in proximity to the plug release for selective manipulation of the plug release when the key is actuated.

18. The cable anti-tamper and port blocking adapter of claim 17, the key comprises an arm that permits a plug release region of the key to be placed in proximity to the plug release when the key is inserted into the access aperture, the arm permits the plug release region to selectively manipulate the plug release when the arm is manipulated in a direction orthogonal to the direction of normal insertion.

19. The cable anti-tamper and port blocking adapter of claim 17, further comprising:
   at least one blocking tab located proximate the plug release guard and adapted to inhibit actuation of the plug release when the plug is inserted into the body.

20. The cable anti-tamper and port blocking adapter of claim 19, the key comprises at least one surface adapted to reposition the at least one blocking tab to allow selective manipulation of the plug release by a second surface adapted to engage and selectively manipulate the plug release.

21. A cable tamper prevention apparatus, comprising:
   an anti-tamper means for installing on a dummy plug;
   a locking means for fixing a longitudinal position of the dummy plug within the anti-tamper means; and
   a means for preventing unaided manipulation of a release mechanism on the dummy plug.

22. The cable tamper prevention apparatus of claim 21, the anti-tamper means is configured to accept at least one of a fiber optic plug, a Registered Jack (RJ) plug, a dummy fiber optic plug, or a dummy RJ plug.

23. The cable tamper prevention apparatus of claim 21, the anti-tamper means is further configured to be installed on the dummy plug by inserting a front portion of the dummy plug through a rear portion of the anti-tamper means and in a direction coincident with a direction of normal insertion of the dummy plug.

24. The cable tamper prevention apparatus of claim 21, the anti-tamper means is further configured to allow passage of a removal tool for manipulation of the release mechanism on the dummy plug.

25. The cable tamper prevention apparatus of claim 24, further comprising:
the removal tool for removing the dummy plug configured to manipulate the release mechanism on the dummy plug by applying an external force to the removal tool in a direction orthogonal to the direction of normal insertion of the existing plug.

26. The cable tamper prevention apparatus of claim 24, the anti-tamper means further configured to allow passage of a removal tool for manipulating the release mechanism on the dummy plug and for repositioning at least one blocking tab adapted to inhibit actuation of the release mechanism.

27. A tamper prevention system comprising:
a molded body adapted to accept a standard communications plug or a blocking plug adapted to a form complementary to an outlet associated with the standard communications plug, the molded body having at least one protrusion adapted to engage a recess in the standard communications plug or the blocking plug to reversibly fix a position of the standard communications plug or the blocking plug in the molded body as the standard communications plug or the blocking plug is inserted into the molded body in a longitudinal direction along an axis of the molded body;
a release shroud on the molded body adapted to at least partially shroud a release mechanism of the standard communications plug or the blocking plug to inhibit actuation of the release mechanism when the standard communications plug or the blocking plug is attached to the outlet associated with the standard communications plug; and
at least one blocking mechanism located proximate the release shroud and adapted to inhibit actuation of the release mechanism when the standard communications plug or the blocking plug is inserted into the molded body.

28. The tamper prevention system of claim 27, further comprising:
at least a second protrusion on the molded body adapted to engage a shoulder of the standard communications plug or the blocking plug to further reversibly fix the position of the standard communications plug or the blocking plug in the molded body.

29. The tamper prevention system of claim 27, the release shroud comprising an access aperture adapted to permit insertion of a removal tool into the release shroud allowing the removal tool to at least one of actuate the release mechanism or reposition the at least one blocking mechanism.

30. The tamper prevention system of claim 27, the molded body further configured to accept the standard communications plug or the blocking plug at a rear portion of the molded body and reversibly fix the position of the standard communications plug or the blocking plug as the standard communications plug or the blocking plug is positioned toward a front portion of the molded body.

* * * * *